United States Patent
Hosseini et al.

(10) Patent No.: US 10,959,251 B2
(45) Date of Patent: Mar. 23, 2021

(54) PARALLEL PROCESSING OF UPLINK AND DOWNLINK TRANSMISSIONS

(71) Applicant: QUALCOMM Incorporated, San Diego, CA (US)

(72) Inventors: Seyedkianoush Hosseini, San Diego, CA (US); Amir Farajidana, Sunnyvale, CA (US); Wanshi Chen, San Diego, CA (US); Peter Gaal, San Diego, CA (US); Brian Clarke Banister, San Diego, CA (US); Aamod Khandekar, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 388 days.

(21) Appl. No.: 15/872,658

(22) Filed: Jan. 16, 2018

(65) Prior Publication Data
US 2018/0206258 A1    Jul. 19, 2018

Related U.S. Application Data

(60) Provisional application No. 62/447,412, filed on Jan. 17, 2017, provisional application No. 62/544,698, filed on Aug. 11, 2017.

(51) Int. Cl.
*H04W 72/12*    (2009.01)
*H04W 28/02*    (2009.01)
(Continued)

(52) U.S. Cl.
CPC ... *H04W 72/1252* (2013.01); *H04W 28/0257* (2013.01); *H04W 72/1268* (2013.01);
(Continued)

(58) Field of Classification Search
CPC ......... H04W 28/0257; H04W 72/0446; H04W 72/1252; H04W 72/1268; H04W 72/1289; H04W 72/14
(Continued)

(56) References Cited

U.S. PATENT DOCUMENTS

2010/0074230 A1    3/2010  Ishii et al.
2014/0226607 A1    8/2014  Holma et al.
(Continued)

OTHER PUBLICATIONS

HTD: "E-PDCCH Design Considerations on Multiplexing with POSCH", 3GPP Draft; R1-120266, 3rd Generation Partnership Project (3GPP), Mobile Competence Centre; 650, Route Des Lucioles; F-06921 Sophia-Antipolis Cedex; France, vol. RAN WG1, No. Dresden, Germany; Feb. 6, 2016-Feb. 10, 2012, Feb. 1, 2012 (Feb. 1, 2012), 4 Pages, XP050563176, [retrieved on Feb. 1, 2012].

(Continued)

*Primary Examiner* — Omar J Ghowrwal
*Assistant Examiner* — Kokou R Detse
(74) *Attorney, Agent, or Firm* — Procopio, Cory, Hargreaves & Savitch LLP

(57) ABSTRACT

A UE may determine a number of resources granted for uplink or downlink communication in a processing window. The resources may include uplink resources or downlink resources and the processing windows may include a predetermined number of subframes. For uplink (UL) transmissions, this may include determining a number of transport block bits, resource blocks, or other resources scheduled in one or more first UL channel grants for a first UL channel, and determining a number of such resources scheduled in a second UL grant for a second UL channel. For downlink (DL) transmissions, the determining may include determining a number of resources received on a first DL channel in each subframe of a set of subframes, and determining a number of resources received on a second DL (Continued)

channel. The determined number of UL or DL resources may be compared to a corresponding threshold which his based on the UE capabilities and processed in accordance a result of the comparison. These and additional aspects are described herein.

30 Claims, 17 Drawing Sheets

(51) Int. Cl.
*H04W 72/14* (2009.01)
*H04W 72/04* (2009.01)
(52) U.S. Cl.
CPC .... *H04W 72/0446* (2013.01); *H04W 72/1289* (2013.01); *H04W 72/14* (2013.01)
(58) Field of Classification Search
USPC .......................................................... 370/230
See application file for complete search history.

(56) References Cited

U.S. PATENT DOCUMENTS

| | | | |
|---|---|---|---|
| 2016/0013897 A1 | 1/2016 | Sun et al. | |
| 2016/0095105 A1 | 3/2016 | Chen et al. | |
| 2016/0150437 A1* | 5/2016 | Vannithamby | H04W 28/0215 370/330 |
| 2016/0164643 A1* | 6/2016 | Loehr | H04L 1/1854 370/336 |
| 2016/0212649 A1* | 7/2016 | Chen | H04L 5/0055 |
| 2016/0255646 A1 | 9/2016 | Bergman et al. | |
| 2016/0360550 A1 | 12/2016 | Chen et al. | |
| 2017/0013618 A1 | 1/2017 | Shin | |
| 2017/0048886 A1 | 2/2017 | Sun et al. | |
| 2017/0142743 A1* | 5/2017 | Yoon | H04W 56/00 |
| 2018/0131490 A1* | 5/2018 | Patel | H04W 72/042 |

OTHER PUBLICATIONS

International Search Report and Written Opinion—PCT/US2018/014079—ISA/EPO—Apr. 11, 2018.
Nokia, et al., "Simultaneous Transmissions of UL Signals for Shortened TTI Operation", 3GPP Draft; R1-167019 Simultaneous UL Signals for STTI, 3rd Generation Partnership Project (3GPP), Mobile Competence Centre; 650, Route Des Lucioles; F-06921 Sophia-Antipolis Cedex; France, vol. RAN WG1, No. Gothenburg, Sweden; Aug. 22, 2016-Aug. 26, 2016, Aug. 21, 2016 (Aug. 21, 2016), 5 Pages, XP051125670, Retrieved from the Internet: URL: http://www.3gpp.org/ftp/Meetings_3GPPSYNC/RAN1/Docs/ [retrieved on Aug. 21, 2016].
NTT DOCOMO, et al., "Mini-Slot for Latency Reduction", 3GPP Draft; R1-1700628, 3rd Generation Partnership Project (3GPP), Mobile Competence Centre; 650, Route Des Lucioles; F-06921 Sophia Antipolis Cedex; France, vol. RAN WG1, No. Spokane, USA; 20170116-20170120016, Jan. 2017 (Jan. 16, 2017), 7 Pages, XP051208153, Retrieved from the Internet: URL: http://www.3gpp.org/ftp/Meetings_3GPP_SYNC/RAN1/Docs/ [retrieved on Jan. 16, 2017].
NTT DOCOMO, et al., "sPDSCH for Shortened TTI", 3GPP Draft; R1-167369, 3rd Generation Partnership Project (3GPP), Mobile Competence Centre; 650, Route Des Lucioles; F-06921 Sophia-Antipolis Cedex; France, vol. RAN WG1, No. Gothenburg, Sweden; Aug. 22, 2016-Aug. 26, 2016, Aug. 13, 2016 (Aug. 13, 2016), 5 Pages, XP051142554, Retrieved from the Internet: URL: http://www.3gpp.org/ftp/tsg_ran/WG1_RL1/TSGR1_86/Docs/ [retrieved on Aug. 13, 2016].
Samsung: "L1 UE Capability Handling for Dual Connectivity", 3GPP Draft; R2-141752 L1 Capability Handling for DC, 3rd Generation Partnership Project (3GPP), Mobile Competence Centre; 650, Route Des Lucioles; F-06921 Sophia-Antipolis Cedex; France, vol. RAN WG2, No. Valencia, Spain; Mar. 31, 2014-Apr. 4, 2014, Mar. 27, 2014 (Mar. 27, 2014), 4 Pages, XP050792883, Retrieved from the Internet: URL: http://www.3gpp.org/ftp/Meetings_3GPP_SYNC/RAN2/Docs/ [retrieved on Mar. 27, 2014].

* cited by examiner

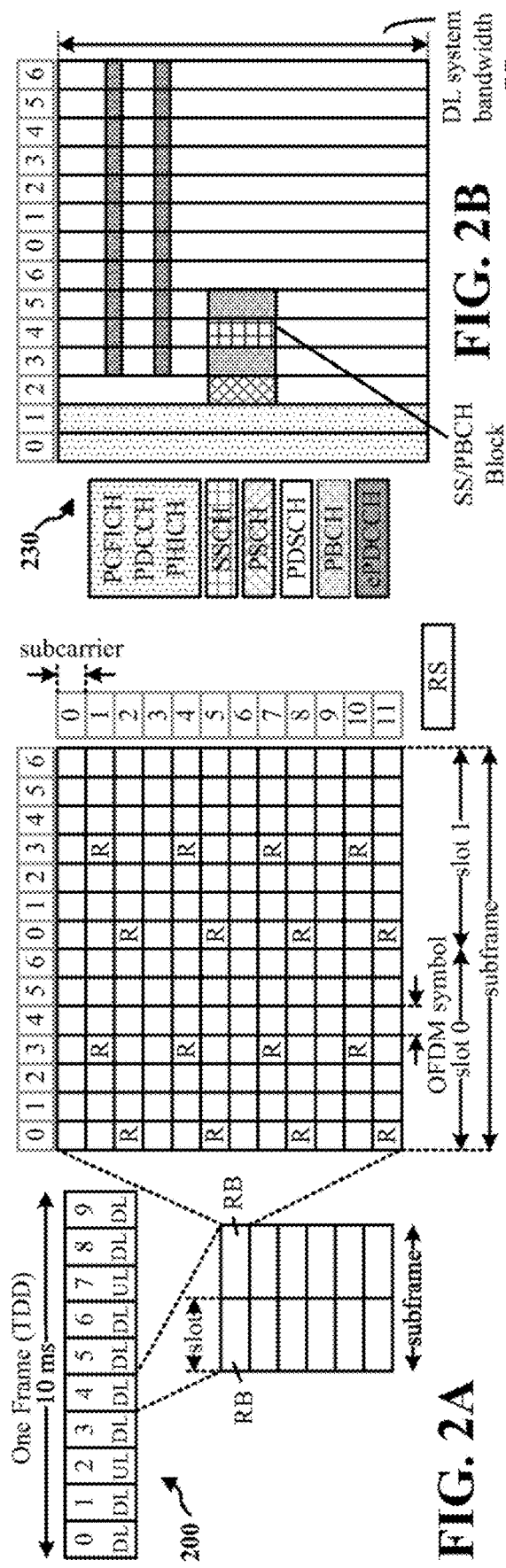
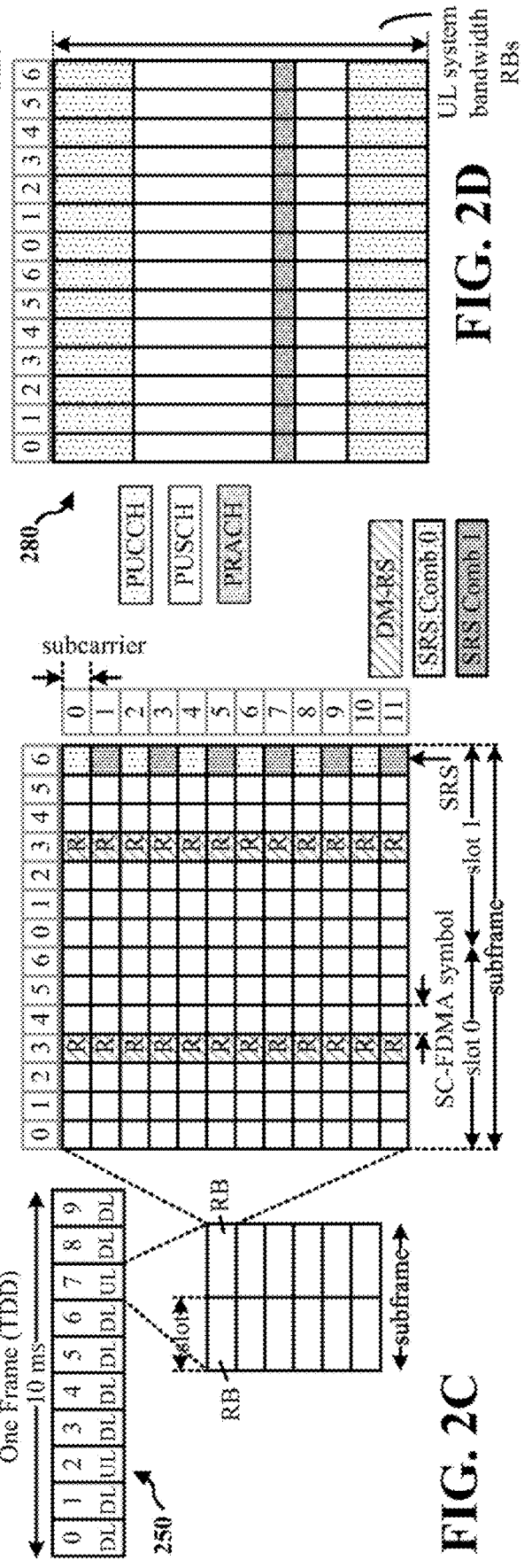
FIG. 2A  FIG. 2B  FIG. 2C  FIG. 2D

812 — Determine whether a bit threshold is surpassed based on the determined number of bits scheduled in each first uplink channel grant of the one or more first uplink channel grants received for the first uplink channel in the set of subframes and based on the determined number of bits scheduled in the second uplink channel grant received for the second uplink channel

842 — Compare, for each component carrier of the UE, a maximum of the determined number of bits scheduled in each first uplink channel grant of the one or more first uplink channel grants received on the first uplink channel in the set of subframes for the component carrier and the bits scheduled in the second uplink channel grant for the component carrier to a maximum number of UL-SCH bits associated with the component carrier

844 — Compare a maximum of the determined number of bits scheduled in each first uplink channel grant of the one or more first uplink channel grants received on the first uplink channel in the set of subframes and the bits scheduled in the second uplink channel grant for the second uplink channel to a defined maximum number of UL-SCH bits

846 — Compare a maximum of the determined number of bits scheduled in each first uplink channel grant of the one or more first uplink channel grants received on the first uplink channel in the set of subframes and the bits scheduled in the second uplink grant for the second uplink channel to one of: a sum of all maximum of a number of UL-SCH bits associated with each of the $x$ component carriers; or a sum of a maximum of a number of UL-SCH bits associated with each of the $y$ component carriers

FIG. 8C

PARALLEL PROCESSING OF UPLINK AND DOWNLINK TRANSMISSIONS

CROSS-REFERENCE TO RELATED APPLICATION(S)

This application claims the benefit of U.S. Provisional Application Ser. No. 62/447,412, entitled "PARALLEL PROCESSING OF UNICAST DOWNLINK TRANSMISSIONS WITH DIFFERENT NUMEROLOGIES" and filed on Jan. 17, 2017, and U.S. Provisional Application Ser. No. 62/544,698, entitled "PARALLEL PROCESSING of DOWNLINK TRANSMISSIONS" and filed on Aug. 11, 2017, the disclosures of which are expressly incorporated by reference herein in their entireties.

BACKGROUND

Field

The present disclosure relates generally to communication systems, and more particularly, to a communications system configured for parallel processing of downlink transmissions.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In various aspects, a user equipment (UE) may indicate, to a base station, a capability of the UE to decode both a first downlink channel, such as a physical downlink shared channel (PDSCH), and a second downlink channel, such as a short PDSCH (sPDSCH). Accordingly, the base station may dynamically schedule the UE with the first downlink channel and the second downlink channel.

When the UE informs the base station of the capability of the UE to decode both the first downlink channel and the second downlink channel, the UE may be scheduled with both channels during a subframe duration for a given component carrier. Thus, the UE may attempt to decode both first data carried on the first downlink channel during a subframe and second data carried on the second downlink channel during a short transmission time interval (TTI) (sTTI) that overlaps with the first data in a window of the UE, even when subframe and the sTTI are not contemporaneously scheduled (e.g., do not overlap or only partially overlap).

When the UE is incapable of decoding both the first data carried on the first downlink channel during the subframe and the second data carried on the second downlink channel during the sTTI that overlaps with the subframe, the UE may refrain from processing (e.g., decoding) the first data carried on the first downlink channel or the second data carried on the second downlink channel.

In various aspects, the UE may include a first window, which may include a processing pipeline in which bits of the first data and bits of the second data may be processed. In some aspects, the first window may be referred to as an "exclusion window" (e.g., a downlink exclusion window), although any terminology referring to a window (e.g., processing pipeline for downlink) may be used without departing from the present disclosure. In some aspects, the first window may be associated with a UE capability. For example, the length of the first window (e.g., corresponding to a set of subframes and/or sTTI(s) to be processed) may be associated with a UE capability. The UE may be able to process a threshold amount of bits in the window. In some aspects, the UE may send characteristics of the first window to a base station, such as by indicating a UE capability to a base station from which the base station may derive characteristics of the first window at the UE (e.g., length of the first window).

Based on bits that are processed or unprocessed in the first window, the UE may provide hybrid automatic repeat request (HARQ) feedback for both the data carried on the first downlink channel during the subframe and the data carried on the second downlink channel during the sTTI. For example, the UE may send an acknowledgement (ACK) to the base station when the data carried on the second downlink channel is processed, but may send a negative ACK (NACK) to the base station when the UE refrains from processing the data carried on the first downlink channel.

With respect to uplink, a UE may receive a first uplink grant for first data to be carried on a first uplink channel and a second uplink grant for second data to be carried on a second uplink channel. Based on the first uplink grant and the second uplink grant, the UE may attempt to encode both first data to be carried on the first uplink channel during a subframe and second data to be carried on the second uplink channel during an sTTI. In some aspects, the UE may attempt to contemporaneously process (e.g., encode) the first data and the second data in a second window of the UE (e.g., even when first uplink grant and second uplink grant do not indicate contemporaneous uplink scheduling.

Accordingly, the UE may include a second window, which may include a processing pipeline in which bits of the first data and bits of the second data may be processed for transmission according to the first and second uplink grants. In some aspects, the second window may be referred to as an "exclusion window" (e.g., an uplink exclusion window), although any terminology referring to a window (e.g., processing pipeline for uplink) may be used without departing from the present disclosure. The second window may be different from the first window (e.g., the first window for downlink processing may be of a different duration, length, or size than the second window for uplink processing). In some aspects, the second window may be associated with a UE capability. For example, the length of the second window (e.g., the number of bits that a UE may process in a second window) may be a function of a UE capability. In some aspects, the UE may send characteristics of the second window to a base station, such as by indicating a UE capability to a base station from which the base station may derive characteristics of the second window at the UE (e.g., length of the second window)

In an aspect of the disclosure, a first method, a first computer-readable medium, and a first apparatus are provided. The first apparatus may determine a number of bits scheduled in one or more first uplink channel grants received in a set of subframes for a first uplink channel. The first apparatus may determine a number of bits scheduled in a second uplink channel grant for a second uplink channel. The first apparatus may determine whether a bit threshold is surpassed based on the determined number of bits scheduled in each first uplink channel grant of the one or more first uplink channel grants received for the first uplink channel in the set of subframes and based on the determined number of bits scheduled in the second uplink channel grant received for the second uplink channel. The first apparatus may process for transmission, based on whether the bit threshold is surpassed, at least one of: the bits scheduled in at least one first uplink channel grant of the one or more first uplink channel grants received in the set of subframes, or the bits scheduled in the second uplink channel grant. In an aspect, the first apparatus may receive each of the one or more first uplink channel grants for the first uplink channel in a TTI within the set of subframes, and receive the second uplink channel grant for the second uplink channel in an sTTI within a subframe, the subframe following the set of subframes, the sTTI including fewer symbols than the TTI. In an aspect, the first apparatus may determine, based on whether the bit threshold is surpassed, whether to transmit the at least one of: the bits scheduled in the at least one first uplink channel grant of the one or more first uplink channel grants received in the set of subframes, or the bits scheduled in the second uplink channel grant. In an aspect, the first uplink channel is a physical uplink shared channel (PUSCH), each of the one or more first uplink channel grants is for an uplink transmission on the PUSCH, the second uplink channel is a short PUSCH (sPUSCH), and the second uplink channel grant is for an uplink transmission on the sPUSCH in a sTTI. The first apparatus may process for transmission, based on whether the bit threshold is surpassed, the at least one of: the bits scheduled in at least one first uplink channel grant of the one or more first uplink channel grants received in the set of subframes, or the bits scheduled in the second uplink channel grant by processing for transmission the bits scheduled in the second uplink channel grant, and refraining from processing for transmission the bits scheduled in the at least one first uplink channel grant of the one or more first uplink channel grants received in the set of subframes. The first apparatus may process for transmission, based on whether the bit threshold is surpassed, the at least one of: the bits scheduled in at least one first uplink channel grant of the one or more first uplink channel grants received in the set of subframes, or the bits scheduled in the second uplink channel grant by: refraining from processing for transmission the bits scheduled in the second uplink channel grant, and processing for transmission the bits scheduled in the at least one first uplink channel grant of the one or more first uplink channel grants received in the set of subframes. The first apparatus may determine whether the bit threshold is surpassed by comparing, for each component carrier of the UE, a maximum of the determined number of bits scheduled in each first uplink channel grant of the one or more first uplink channel grants received for the first uplink channel in the set of subframes for the component carrier and the bits scheduled in the second uplink channel grant for the second uplink channel for the component carrier to a maximum number of uplink shared channel (UL-SCH) bits associated with the component carrier. In an aspect, the maximum number of UL-SCH bits associated with the component carrier is based on a maximum number of UL-SCH bits for the first uplink channel. In an aspect, the first apparatus may determine whether the bit threshold is surpassed by comparing a maximum of the determined number of bits scheduled in each first uplink channel grant of the one or more first uplink channel grants received for the first uplink channel in the set of subframes and the bits scheduled in the second uplink channel grant for the second uplink channel to a defined maximum number of UL-SCH bits. In an aspect, the first apparatus has x configured component carriers and y active component carriers, where y≤x, and the first apparatus may determine whether the bit threshold is surpassed by comparing a maximum of the determined number of bits scheduled in each first uplink channel grant of the one or more first uplink channel grants received on the first uplink channel in the set of subframes and the bits scheduled in the second uplink channel grant for the second uplink channel to one of: a sum of a maximum of a number of UL-SCH bits associated with each of the x component carriers, or a sum of a maximum of a number of UL-SCH bits associated with each of the y component carriers. In an aspect, the first apparatus may receive a configuration from a base station indicating whether the bit threshold is the sum of the maximum of a number of UL-SCH bits associated with each of the x component carriers, or is the sum of the maximum of a number of UL-SCH bits associated with each of the y component carriers. In an aspect, the at least one of the bits scheduled in the at least one first uplink channel grant of the one or more first uplink channel grants, or the bits scheduled in the second uplink channel grant are processed for transmission based on whether the bit threshold is surpassed within a processing window comprising a number of subframes in the set of subframes. In an aspect, a length of the processing window is based on at least one of a UE capability of the UE, uplink scheduling information, or a duration of an sTTI associated with the second uplink channel. In an aspect, the first apparatus may further send, to a base station, information indicative of the length of the processing window for the UE.

In an aspect of the disclosure, a second method, a second computer-readable medium, and a second apparatus are provided. The second apparatus may determine a number of bits received on a first downlink channel in each subframe of a set of subframes. The second apparatus may determine a number of bits received on a second downlink channel. The second apparatus may determine whether a bit threshold is surpassed based on the determined number of bits received on the first downlink channel in each subframe of the set of subframes and based on the determined number of bits received on the second downlink channel. The second apparatus may process, based on whether the bit threshold is surpassed, at least one of: the bits received on the first downlink channel in each subframe of the set of subframes, or the bits received on the second downlink channel. In an aspect, the second apparatus may receive the bits on the first downlink channel within a TTI in each subframe of the set of subframes, and receive the bits on the second downlink channel in a sTTI within a subframe, the subframe following the set of subframes, the sTTI including fewer symbols than the TTI. The second apparatus may determine, based on whether the bit threshold is surpassed, whether to process at least one of: the bits received on the first downlink channel in each subframe of the set of subframes, or the bits received on the second downlink channel. In an aspect, the first downlink channel is a PDSCH and the second downlink channel is a sPDSCH. In an aspect, the second apparatus may process, based on whether the bit threshold is surpassed, at least one of: the bits received on the first downlink channel in each subframe of the set of subframes or the bits received on the second downlink channel by: processing the bits received on the second downlink channel, sending ACK/NACK feedback associated with the bits received on the second downlink channel based on the processing of the bits received on the second downlink channel, refraining from processing the bits received on the first downlink channel in one or more subframes of the set of subframes, and sending NACK feedback associated with the bits received on the first downlink channel in the one or more subframes of the set of subframes based on the refraining from the processing of the bits received on the first downlink channel in the one or more subframes of the set of subframes. In an aspect, the second apparatus may process, based on whether the bit threshold is surpassed, at least one of: the bits received on the first downlink channel in each subframe of the set of subframes or the bits received on the second downlink channel by: refraining from processing the bits received on the second downlink channel, sending NACK feedback associated with the bits received on the second downlink channel based on the refraining from the processing of the bits received on the second downlink channel, processing the bits received on the first downlink channel in each subframe of the set of subframes, and sending ACK/NACK feedback associated with the bits received on the first downlink channel in each subframe of the set of subframes based on the processing of the bits received on the first downlink channel in each subframe of the set of subframes. In an aspect, the second apparatus may determine whether the bit threshold is surpassed by comparing, for each component carrier of the UE, a maximum of the determined number of bits received on the first downlink channel in each subframe of the set of subframes and the bits received on the second downlink channel to a maximum number of downlink shared channel (DL-SCH) bits associated with the component carrier. In an aspect, the second apparatus may determine whether the bit threshold is surpassed by comparing a maximum of the determined number of bits received on the first downlink channel in each subframe of the set of subframes and the bits received on the second downlink channel to a defined maximum number of DL-SCH bits. In an aspect, the second apparatus has x configured component carriers and y active component carriers, where y≤x, and the second apparatus may determine whether the bit threshold is surpassed by comparing a maximum of the determined number of bits received on the first downlink channel in each subframe of the set of subframes and the bits received on the second downlink channel to one of: a sum of a maximum of a number of DL-SCH bits associated with each of the x component carriers, or a sum of a maximum of a number of DL-SCH bits associated with each of the y component carriers. In an aspect, the second apparatus may receive a configuration from a base station indicating whether the bit threshold is the sum of the maximum of a number of DL-SCH bits associated with each of the x component carriers, or is the sum of the maximum of a number of DL-SCH bits associated with each of the y component carriers. In an aspect, the at least one of the bits received on the first downlink channel, or the bits received on the second downlink channel are processed based on whether the bit threshold is surpassed within a processing window comprising a number of subframe in the set of subframes. In an aspect, a length of the processing window is based on at least one of a UE capability of the UE, a HARQ timing rule, or a duration of an sTTI associated with the second downlink channel. In an aspect, the second apparatus may send, to a base station, information indicative of the length of the processing window for the UE.

In an aspect of the disclosure, a third method, a third computer-readable medium, and a third apparatus are provided. The third apparatus may determine to send to a UE first data on a first downlink channel in each subframe of a set of subframes, and to send to the UE second data on a second downlink channel in a subframe, the subframe following the set of subframes. The third apparatus may determine, based on the determination to send to the UE the first data on the first downlink channel and the second data on the second downlink channel, at least one of to: limit a modulation and coding scheme (MCS) used for sending at least one of the first data or the second data, limit a spatial rank used for transmitting at least one of the first data or the second data, refrain from scheduling the UE with a transmission mode that is based on a demodulation reference signal (DMRS), or refrain from scheduling the UE using an enhanced physical downlink control channel (ePDCCH). The third apparatus may send, to the UE, the first data on the first downlink channel in each subframe of the set of subframes. The third apparatus may send, to the UE, the second data on the second downlink channel in the subframe. In an aspect, the first downlink channel is a PDSCH and the second downlink channel is a sPDSCH. In an aspect, the third apparatus may receive, from the UE, information indicating that the UE supports the second downlink channel, and determine to send to the UE the second data based on the received information indicating that the UE supports the second downlink channel. In an aspect, the first data on the first downlink channel in each subframe of the set of subframes is sent on a first component carrier, and the second data on the second downlink channel in the subframe is sent on a second component carrier. In an aspect, the first component carrier is a same component carrier as the second component carrier. In an aspect, the third apparatus may send, to the UE, a configuration associated with a bit threshold for processing the first data and the second data by the UE, the configuration indicating the bit threshold is to be based on x configured component carriers or y activated component carriers, wherein y≤x. In an aspect, the third apparatus may be configured to receive, from the UE, information indicating a UE capability of the UE, and the determination, based on the determination to send to the UE the first data on the first downlink channel and the second data on the second downlink channel, the at least one of to limit the MCS used for sending at least one of the first data or the second data, to limit the spatial rank used for transmitting at least one of the first data or the second data, to refrain from scheduling the UE with a transmission mode that is based on the DMRS, or to refrain from scheduling the UE using the ePDCCH is based on the information indicating the UE capability. In an aspect, the information indicating the UE capability is associated with a duration of an sTTI of the second downlink channel.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a DL frame structure, DL channels within the DL frame structure, an UL frame structure, and UL channels within the UL frame structure, respectively.

FIGS. 8A-8C are flowcharts of methods of wireless communication.

DETAILED DESCRIPTION

Figure 1:
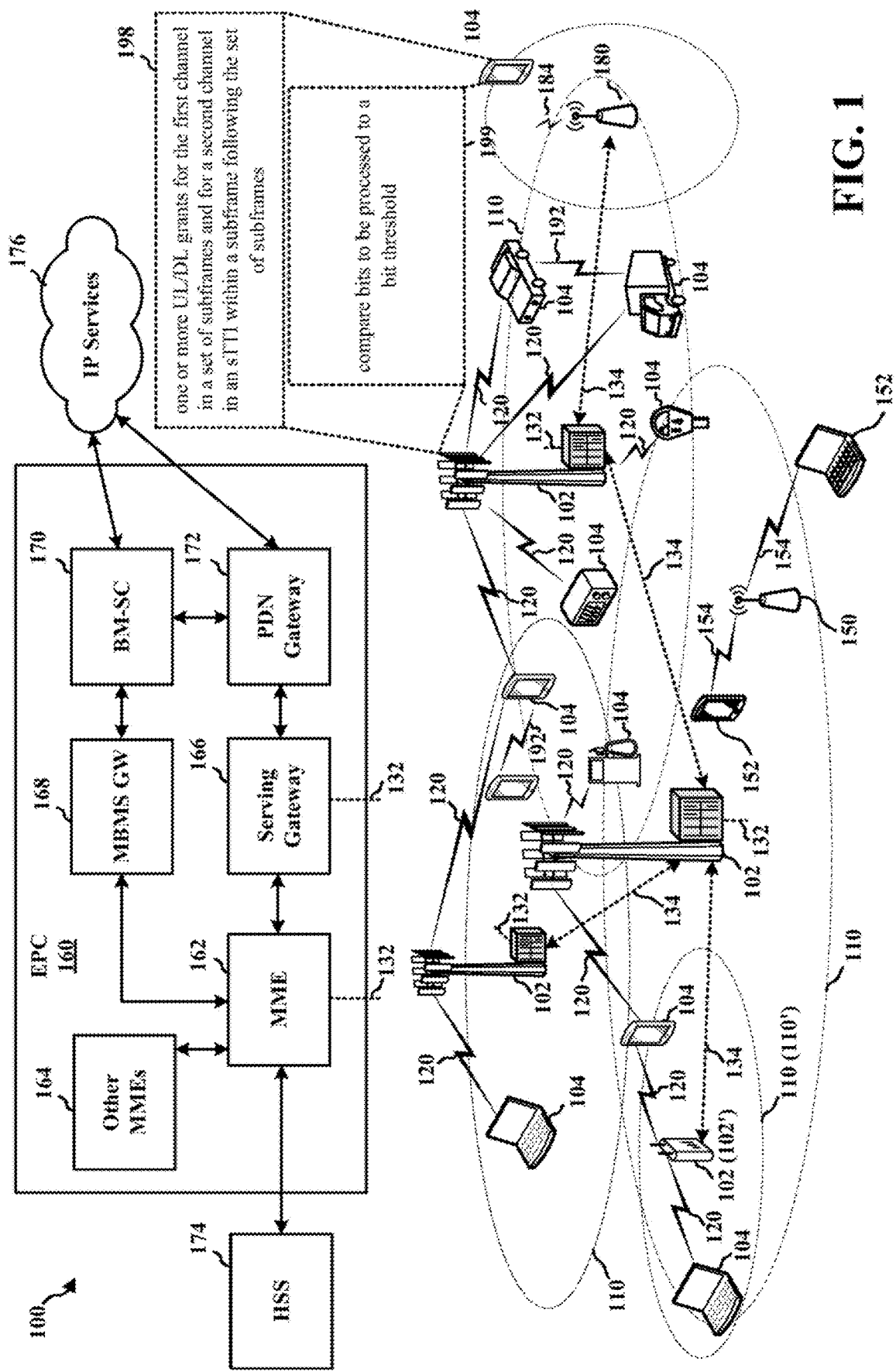
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include base stations. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 192. The D2D communication link 192 may use the DL/UL WWAN spectrum. The D2D communication link 192 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The gNodeB (gNB) 180 may operate in millimeter wave (mmW) frequencies and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 104 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a toaster, or any other similar functioning device. Some of the UEs 104 may be referred to as IoT devices (e.g., parking meter, gas pump, toaster, vehicles, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In various aspects, the UE 104 may receive each of one or more first uplink channel grants for the first uplink channel in a transmission time interval (TTI) within the set of subframes and a second uplink channel grant for the second uplink channel in a short transmission time interval (sTTI) within a subframe following the set of subframes (198). The UE 104 may determine a number of bits scheduled in one or more first uplink channel grants received in a set of subframes for a first uplink channel. The UE 104 may determine a number of bits scheduled in a second uplink channel grant for a second uplink channel. The UE 104 may determine (199) whether a bit threshold is surpassed based on the determined number of bits scheduled in each first uplink channel grant of the one or more first uplink channel grants received for the first uplink channel in the set of subframes and based on the determined number of bits scheduled in the second uplink channel grant received for the second uplink channel. The UE 104 may process for transmission, based on whether the bit threshold is surpassed, at least one of: the bits scheduled in at least one first uplink channel grant of the one or more first uplink channel grants received in the set of subframes, or the bits scheduled in the second uplink channel grant.

In one aspect, the UE 104 may receive bits on a first downlink channel within a TTI in each subframe of a set of subframes and bits on a second downlink channel in a sTTI within a subframe following the set of subframes (198). The UE 104 may determine a number of bits received on the first downlink channel in each subframe of the set of subframes. The UE 104 may determine a number of bits received on the second downlink channel. The UE 104 may determine (199) whether a bit threshold is surpassed based on the determined number of bits received on the first downlink channel in each subframe of the set of subframes and based on the determined number of bits received on the second downlink channel. The UE 104 may process, based on whether the bit threshold is surpassed, at least one of: the bits received on the first downlink channel in each subframe of the set of subframes, or the bits received on the second downlink channel.

In aspects, the base station 102 may determine to send to the UE 104 the first data on a first downlink channel in each subframe of a set of subframes and the second data on a second downlink channel in an sTTI within a subframe following the set of subframes (198). The base station 102 may determine, based on the determination to send to the UE 104 the first data on the first downlink channel and the second data on the second downlink channel, at least one of to: limit a modulation and coding scheme (MCS) used for sending at least one of the first data or the second data, limit a spatial rank used for transmitting at least one of the first data or the second data, refrain from scheduling the UE with a transmission mode that is based on a demodulation reference signal (DMRS), or refrain from scheduling the UE using an enhanced physical downlink control channel (ePDCCH). The base station 102 may send, to the UE 104, the first data on the first downlink channel in each subframe of the set of subframes. The base station 102 may send, to the UE 104, the second data on the second downlink channel in the subframe.

FIG. 2A is a diagram 200 illustrating an example of a DL subframe within a 5G/NR frame structure. FIG. 2B is a diagram 230 illustrating an example of channels within a DL subframe. FIG. 2C is a diagram 250 illustrating an example of an UL subframe within a 5G/NR frame structure. FIG. 2D is a diagram 280 illustrating an example of channels within an UL subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 a DL subframe and subframe 7 an UL subframe. While subframe 4 is illustrated as providing just DL and subframe 7 is illustrated as providing just UL, any particular subframe may be split into different subsets that provide both UL and DL. Note that the description infra applies also to a 5G/NR frame structure that is FDD.

Other wireless communication technologies may have a different frame structure and/or different channels. A frame (10 ms) may be divided into 10 equally sized subframes (1 ms). Each subframe may include one or more time slots. Each slot may include 7 or 14 symbols, depending on the slot configuration. For slot configuration 0, each slot may include 14 symbols, and for slot configuration 1, each slot may include 7 symbols. The number of slots within a subframe is based on the slot configuration and the numerology. For slot configuration 0, different numerologies 0 to 5 allow for 1, 2, 4, 8, 16, and 32 slots, respectively, per subframe. For slot configuration 1, different numerologies 0 to 2 allow for 2, 4, and 8 slots, respectively, per subframe. The subcarrier spacing and symbol length/duration are a function of the numerology. The subcarrier spacing may be equal to $2^{\mu}*15$ kKz, where $\mu$ is the numerology 0-5. The symbol length/duration is inversely related to the subcarrier spacing. FIGS. 2A, 2C provide an example of slot configuration 1 with 7 symbols per slot and numerology 0 with 2 slots per subframe. The subcarrier spacing is 15 kHz and symbol duration is approximately 66.7 µs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE (indicated as R). The RS may include demodulation RS (DM-RS) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) may be within symbol 6 of slot 0 within subframes 0 and 5 of a frame. The PSCH carries a primary synchronization signal (PSS) that is used by a UE 104 to determine subframe/symbol timing and a physical layer identity. The secondary synchronization channel (SSCH) may be within symbol 5 of slot 0 within subframes 0 and 5 of a frame. The SSCH carries a secondary synchronization signal (SSS) that is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DL-RS. The physical broadcast channel (PBCH), which carries a master information block (MIB), may be logically grouped with the PSCH and SSCH to form a synchronization signal (SS)/PBCH block. The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the base station. The UE may additionally transmit sounding reference signals (SRS) in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
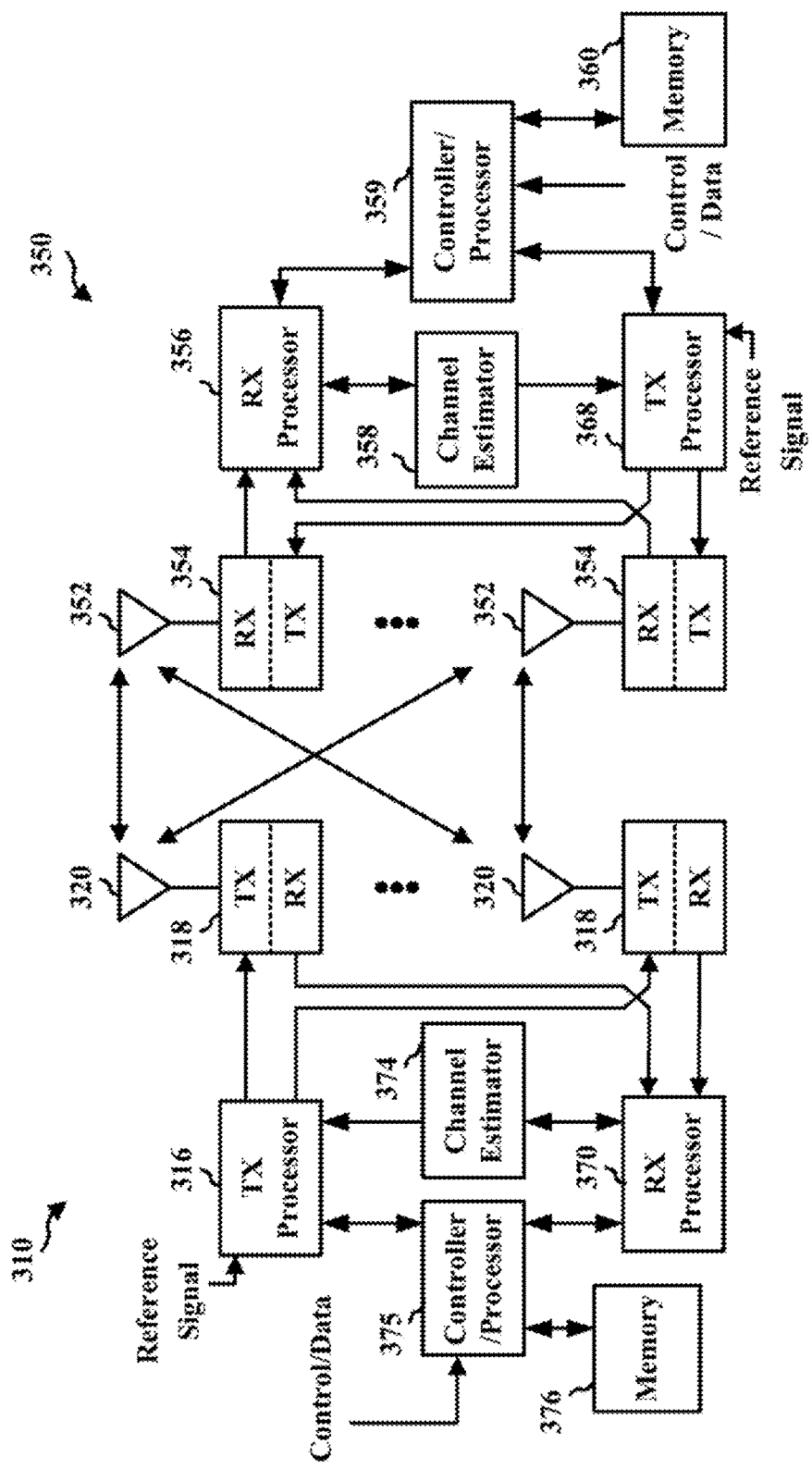
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4:
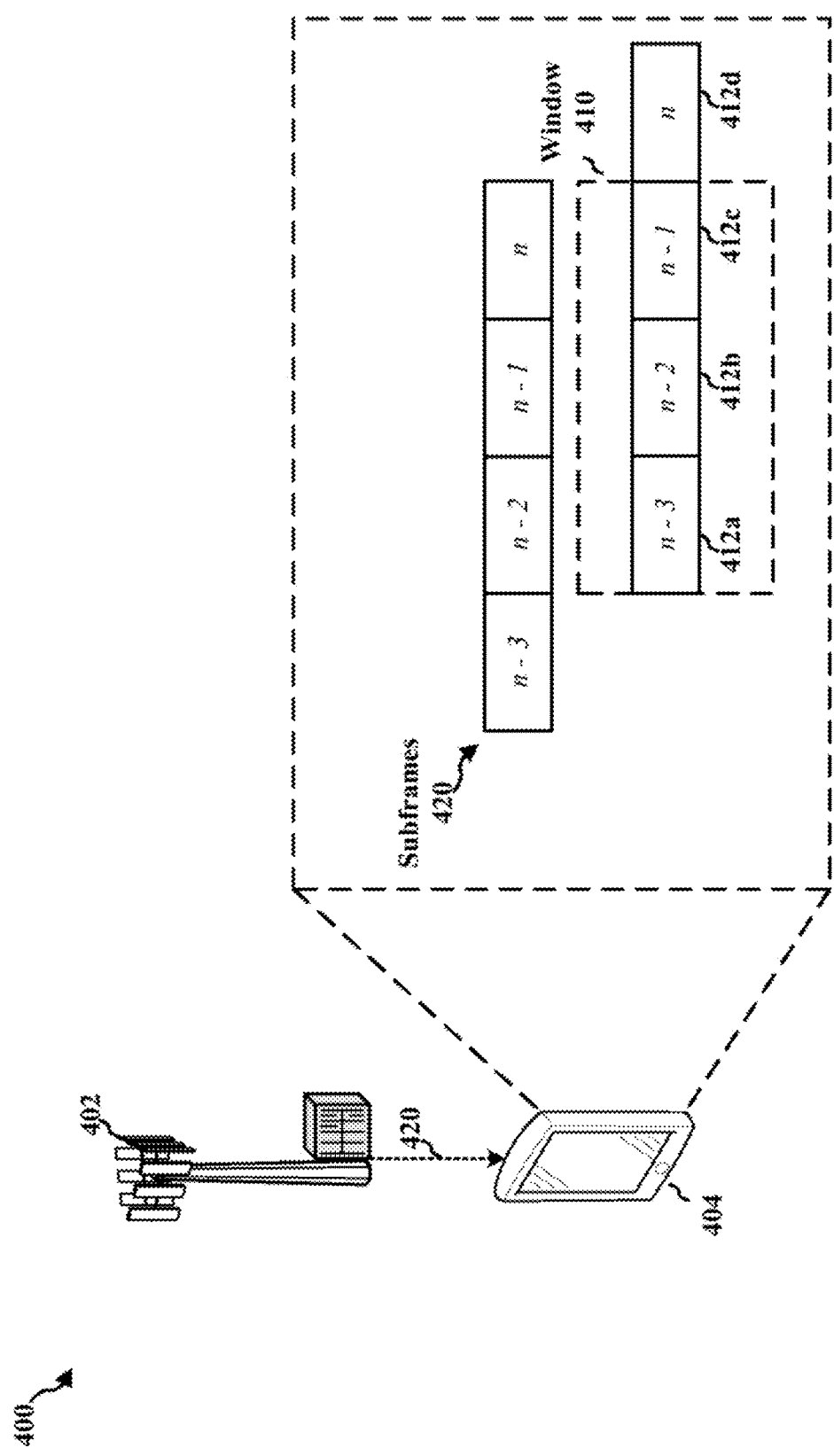
FIG. 4 is a diagram of a wireless communications system.

FIG. 4 illustrates a diagram of a wireless communications system 400. In the illustrated aspect, a base station 402 may send, to the UE 404, bits carried on a PDSCH in subframes 420.

The UE 404 may receive the subframes 420 and process the bits carried therein. As used herein, bits may include at least one of TB bits, one or more REs scheduled for downlink bits, one or more RBs scheduled for downlink bits, one or more REs scheduled for uplink bits, and/or one or more RBs scheduled for uplink bits. The UE 404 may be configured with a window 410. The window 410 may be a processing pipeline during which bits carried during subframes may be de-mapped and HARQ feedback may be generated to indicate reception status.

The UE 404 may be configured to provide HARQ feedback (e.g., ACK/NACK feedback) based on a HARQ timing rule. For example, for a HARQ timing rule of n+4, the UE 404 has at most 3 milliseconds (ms) to process data carried in a subframe of the subframes 420, and then send HARQ feedback based on the respective data on the respective one of the subframes 420. The base station 402 sending downlink data during a downlink subframe (e.g., on a PDSCH) expects HARQ feedback for that downlink data to be carried during an uplink subframe that is four subframes (e.g., 4 ms) after the downlink subframe.

The window 410 may have a duration, which is illustrated as 3 ms for the UE 404. However, the window 410 may have any duration, such as 2 ms, 2.5 ms, 3 ms, 4 ms, etc. In various aspects, the duration may be defined by different UE capabilities and/or UE processing power. Further, the duration may be tied to the HARQ timing rule (e.g., n+3, n+4, etc.). For example, under legacy timing (e.g., LTE), the UE may be under n+4 timing and, therefore, the window 410 may have a duration of 3 ms. However, under shortened timing (e.g., 5G NR), the HARQ timing may be n+3 and, therefore, the window 410 may have a duration of 2 ms. The window 410 may depend on other factors as well, such as whether DMRS-based scheduling transmission and/or ePDCCH-based scheduling is supported.

In the window 410, the UE 404 may process bits 412a-d carried on a PDSCH. The PDSCH bits 412a-d may correspond to bits carried in the n−3 through n subframes 420. Therefore, PDSCH bits 412a may include bits corresponding to the n−3 subframe of the received subframes 420, PDSCH bits 412b may include bits corresponding to the n−2 subframe of the received subframes 420, PDSCH bits 412c may include bits corresponding to the n−1 subframe of the received subframes 420, and the PDSCH bits 412d may include bits corresponding to then subframe of the received subframes 420. The UE 404 may process bits 412a-d, for example, by de-mapping, demodulating, and/or decoding data carried on bits of a subframe. The UE 404 may then generate HARQ feedback based on the processed bits. For example, according to a HARQ timing rule of n−4, the UE 404 may send, to the base station 402, ACK/NACK feedback at a time corresponding to n+1 subframe (i.e., the subframe following the n subframe).

The UE 404 may support processing (e.g., de-mapping) based on a threshold maximum amount of bits, for example, in order to adhere to the HARQ timing rule. Therefore, the number of PDSCH bits 412a-c in the window 410 of the UE 404 should not exceed a number of downlink shared channel (DL-SCH) bits that the UE 404 is capable of processing (e.g., for one or more component carriers). When the number of bits being processed by the UE 404 at each given time within the window 410 does not exceed the maximum amount of DL-SCH bits, the UE 404 may be able to process all PDSCH bits 412a-c. For example, max(#TBbits$_{legacy}$(−K+1:0))≤#TBbits_max, where (−K+1:0) may be the K most recent subframes in a pipelining state (e.g., n−3, n−2, n−1), #TBbits$_{legacy}$, may be the number of bits included in a legacy channel (e.g., PDSCH bits 412a-c), and #TBbits_max may be the threshold maximum amount of bits. Therefore, as long as the preceding equation is satisfied, the UE 404 may process all bits in the window 410 while adhering to the HARQ timing rule.

Figure 5:
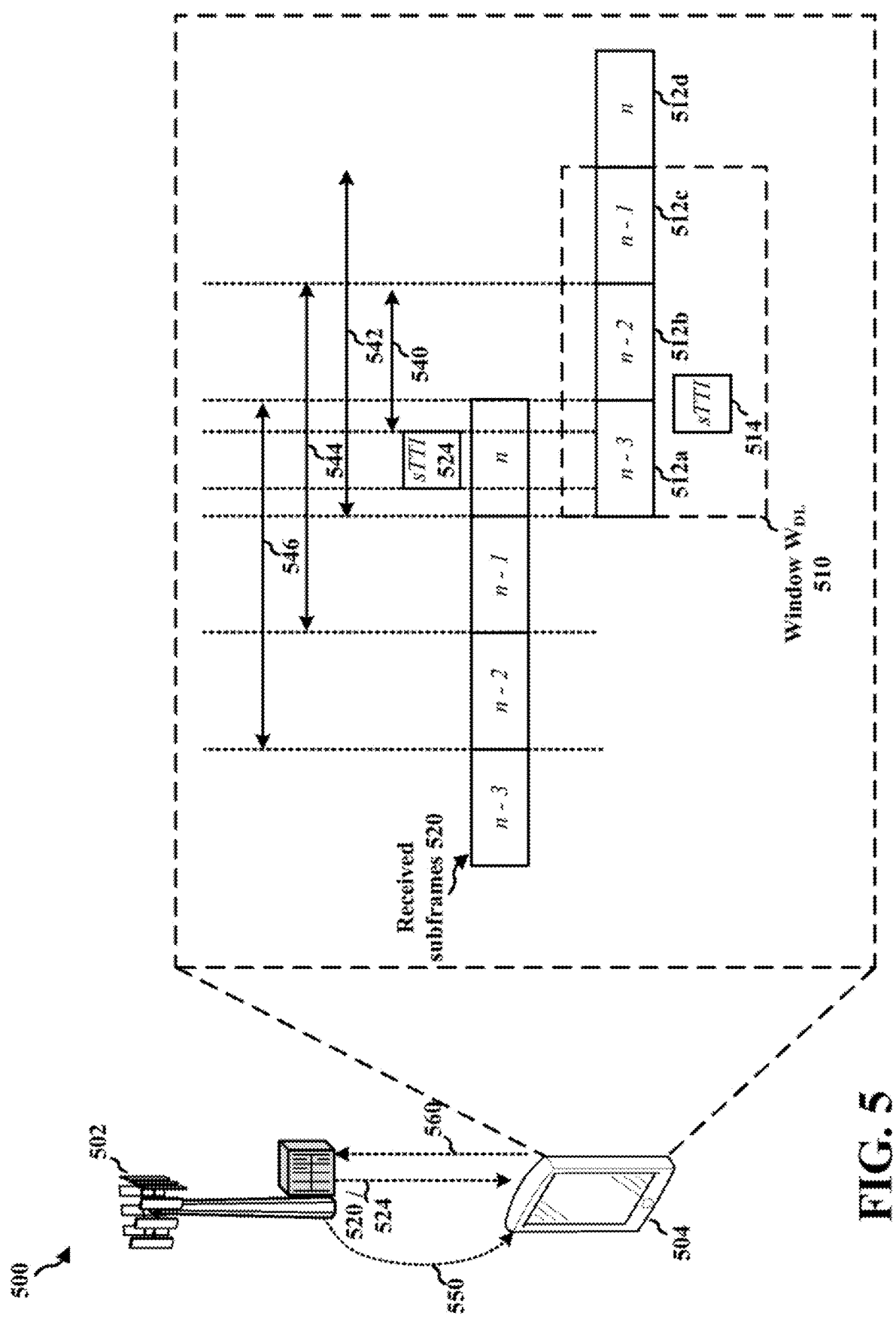
FIG. 5 is a diagram of a wireless communications system.

FIG. 5 is a diagram of a wireless communications system 500. The wireless communications system 500 may include a UE 504 in communication with a base station 502. In an aspect, the UE 504 may be an ultra-low-latency (ULL) UE, a delay-sensitive UE, and/or a mission critical (MiCr) UE.

The base station 502 may be configured to send downlink data to the UE 504 on a first downlink channel in the n−3 to n subframes 520. In an aspect, the first downlink channel may be a PDSCH. Each of the subframes 520 may be a TTI having a duration corresponding to the PDSCH. For example, each subframes of the subframes may have a duration of 1 ms.

Additionally, the base station 502 may be configured to send downlink data to the UE 504 on a second downlink channel in an sTTI 524. In an aspect, the second downlink channel may be a short PDSCH (sPDSCH). The sTTI 524 may have a duration that is shorter than each of the subframes 520, such as less than 1 ms (e.g., 1 or 2 symbols, 1 slot, 0.5 ms, etc.). In one aspect, downlink data carried on the second downlink channel may include ULL data, delay-sensitive data, and/or MiCr data.

In one aspect, the base station 502 may schedule the downlink data for the UE 504 over one or more component carriers (or cells). The component carriers (or cells) with which the UE 504 is configured may correspond to component carriers for which the UE 504 may monitor for control information. However, of those configured component carriers, the UE 504 may monitor for control information on component carriers which are activated for the UE 504. For example, the UE 504 may be configured with a set of 5 component carriers, but a subset of 2 of those 5 component carriers may be activated. The UE 504 may monitor for control information on each component carrier of the subset of 2 activated component carriers. The base station 502 may configure and/or activate the component carriers for the UE 504.

In an aspect, the base station 502 may schedule the UE 504 on all activated component carriers (e.g., for carrier aggregation). In another aspect, the base station 502 may assign the first downlink channel on a first component carrier and assign the second downlink channel on a second component carrier. Potentially, the first and second component carriers may be the same component carrier; that is, the base station 502 may assign the first downlink channel and the second downlink channel over one component carrier. This per-component carrier scheduling may prevent the UE 504 from receiving a greater number of bits than the UE 504 can process.

The UE 504 may receive bits on the first downlink channel within a TTI (e.g., subframe) in each of the n−3, n−2, n−1 subframes of the set of subframes 520. Further, the UE 504 may receive bits on the second downlink channel within an sTTI 524 within the n subframe of the set of subframes 520. Thus, the UE 504 may receive the n−3, n−2, and n−1 subframes of the set of subframes 520, and then may receive the n subframe as well as the sTTI 524 within the n subframe.

The UE 504 may include a window 510. In some aspects, the window 510 may be referred to as an "exclusion window," although any suitable terminology may be used without departing from the present disclosure. The window 510 may include a processing pipeline during which bits (e.g., TB bits, REs scheduled to carry bits, RBs scheduled to carry bits, etc.) carried in the subframes 520 may be processed so that HARQ feedback 560 may be generated to indicate reception status (e.g., acknowledged or non-acknowledged). Each of the first downlink channel bits 512a-d may correspond to bits carried in the n−3 through n subframes of the set of subframes 520. Therefore, first downlink channel bits 512a may include bits corresponding to the n−3 subframe of the received subframes 520, first downlink channel bits 512b may include bits corresponding to the n−2 subframe of the received subframes 520, first downlink channel bits 512c may include bits corresponding to the n−1 subframe of the received subframes 520, and the first downlink channel bits 512d may include bits corresponding to then subframe of the received subframes 520. Similarly, the second downlink channel bits 514 may include bits corresponding to the received sTTI 524 on the second downlink channel.

The UE 504 may be configured to provide HARQ feedback 560 (e.g., ACK/NACK feedback) based on a HARQ timing rule. For example, for a HARQ timing rule of n+4, the UE 504 may have at most 3 ms to process data carried in subframes 520 (e.g., on a PDSCH), and then send HARQ feedback based on the respective bits 512a-d in the channels corresponding to the received subframes 520. According to the HARQ timing rule, n may correspond to a subframe number, index, and/or time, e.g., so that an n+4 subframe would be a fourth subframe (e.g., 4 ms) after the n subframe. For an n+4 HARQ timing rule, when the base station 502 sends downlink data during a downlink subframe, the base station 502 expects HARQ feedback for that downlink subframe to be carried during an uplink subframe that is four subframes (e.g., 4 ms) after the downlink subframe.

According to the HARQ timing rule, the UE 504 may have at most a first duration 540 to process the second downlink channel bits 514 received in the sTTI 524 during n subframe of the subframes 520. To support the HARQ timing rule (e.g., n+4), the UE 504 may have a second duration 542 (e.g., 3 subframes) to process the first downlink channel bits 512c received during the n−1 subframe of the subframes 520, for example, so that the HARQ feedback 560 corresponding to the first downlink channel bits 512c may be sent at a time corresponding to an n+3 subframe. Similarly, the UE 504 may have a third duration 544 to process the first downlink channel bits 512b received during the n−2 subframe of the subframes 520, for example, so that the HARQ feedback 560 corresponding to the first downlink channel bits 512b may be sent at a time corresponding to an n+2 subframe. Similarly, the UE 504 may have a fourth duration 546 to process the first downlink channel bits 512a received during the n−3 subframe of the subframes 520, for example, so that the HARQ feedback 560 corresponding to the first downlink channel bits 512a may be sent at a time corresponding to an n+1 subframe.

In this example, the window 510 (e.g., $W_{DL}$, a length of the window 510) may correspond to a duration of 3 subframes so that the UE 504 may adhere to an n+4 HARQ timing rule. In aspects, a window $W_{DL} \in \{0, \ldots, k-1\}$, where k is the downlink HARQ timing (e.g., $W_{DL}$ may be equal to 3 for a HARQ timing rule of k=4).

In other aspects, the window 510 may have other durations, such as 2 ms, 2.5 ms, 3 ms, 4 ms, etc. In various aspects, a window may be defined based on different UE capabilities and/or UE processing power. Further, the duration may be tied to the HARQ timing rule (e.g., n+3, n+4, etc.). For example, under a legacy timing rule (e.g., LTE), the UE 504 may operate according to n+4 timing and, therefore, the window 510 may have a maximum duration of 3 subframes (e.g., 3 ms). However, under shortened timing (e.g., 5G NR), the HARQ timing may be n+3 and, therefore, the window 510 may have a maximum duration of 2 ms. The window 510 may depend on other factors as well, such as whether the UE 504 supports DMRS-based scheduling transmission and/or ePDCCH-based scheduling. In various aspects, the size or length of the window 510 may vary according to the duration of the sTTI 524 carried on the second downlink channel. For example, the size or length of the window 510 may be different for different durations of the sTTI 524 (e.g., the window 510 may be of a first length when the sTTI 524 has a duration of two symbols, but may be of a second length when the sTTI 524 has a duration of one slot).

In the window 510, the UE 504 may process bits (e.g., TB bits, bits carried on REs, bits, bits carried on RBs) carried in subframes 520 and/or sTTI 524. The UE 504 may process bits in the window 510, for example, by de-mapping, demodulating, and/or decoding data carried on bits carried on the first downlink channel and/or the second downlink channel. The UE 504 may then generate HARQ feedback 560 based on the processing.

For each sTTI received in subframe n (e.g., sTTI 524), the window 510 spans the past subframes included in the window 510 (e.g., $W_{DL}$), which may exclude subframe n. As described, infra, the UE 504 may determine whether to process at least a portion of the first downlink channel bits 512a-c and/or at least a portion of the second downlink channel bits 514 that at least partially overlap in the window 510. Once the UE 504 processes the first downlink channel bits 512a-d, the UE 504 may advance the window 510. For example, once the UE 504 processes the first downlink channel bits 512a corresponding to the n−3 subframe, the UE 504 may advance the first downlink channel bits 512a out of the window 510 (e.g., the UE 504 may provide at least a portion of the bits 512a to a higher layer), and the first downlink channel bits 512d corresponding to the n subframe would be advanced into the window 510. The UE 504 may then send HARQ feedback 560 for the first downlink channel bits 512a after the fourth duration 546 (e.g., at a time corresponding to an n+1 subframe).

In aspects, the UE 504 may be scheduled to receive the subframes 520. However, sTTI traffic may be scheduled at any time. For example, the UE 504 may receive sTTI traffic during the sTTI 524 carried on the second downlink channel (e.g., an sTTI channel, such as a unicast sPDSCH or sTTI unicast PDSCH).

While the sTTI 524 may be received within an n subframe, processing the second downlink channel bits 514 (e.g., carried in sTTI 524) may overlap in time with processing of one or more first downlink channel bits 512a-c corresponding to the n−3 to n−1 subframes. The operations of the second downlink channel (e.g., sTTI) may have a relatively faster processing time than the processing time of the operations of the first downlink channel, but processing of the second downlink channel bits 514 may still increase processing overhead in the window 510, e.g., when processing of the second downlink channel bits 514 overlaps with one or more first downlink channel bits 512a-c in the window 510. Consequently, the number of bits (e.g., number of TB bits, one or more REs scheduled to carry downlink bits, and/or one or more RBs scheduled to carry downlink bits) processed in the window 510 may be increased when sTTI traffic is introduced into the pipeline.

The UE 504 may support processing of a threshold maximum number of bits, for example, in order to adhere to the HARQ timing rule and/or due to the capability of the UE 504. Therefore, the number of bits in the window 510 of the UE 504 should not exceed a threshold maximum number of bits at any given time. The threshold maximum number of bits may be based on at least one of TB bits, a number of REs scheduled to carry bits, a number of RBs scheduled to carry bits, and/or any combination thereof. When the number of bits being processed by the UE 504 at each given time within the window 510 does not exceed the threshold maximum amount of bits, the UE 504 may be able to process bits carried on all downlink channels (e.g., both the first downlink channel bits 512a-c and the second downlink channel bits 514).

In various aspects, the UE 504 may determine a number of bits received on the first downlink channel in the n−3, n−2, and n−1 subframes of the set of subframes 520. Further, the UE 504 may determine the number of bits received on the second downlink channel in the sTTI 524, which may be received in the n subframe of the set of subframes 520. As illustrated, the processing of the second downlink channel bits 514 may overlap with the first downlink channel bits 512a-b in the window 510. The UE 504 may determine whether the threshold maximum number of bits (e.g., a bit threshold that is based on one or more of a maximum number of TB bits, a maximum number of REs scheduled to carry bits, a maximum number of RBs scheduled to carry bits, or any combination thereof) is surpassed based on the determined number of bits 512a-c received on the first downlink channel in each of the n−3 to n−1 subframes and based on the determined number of bits 514 received on the second downlink channel in the sTTI 524 (e.g., within the n subframe).

When the UE 504 is scheduled over all activated component carriers (e.g., for carrier aggregation), the UE may compare a maximum of the determined number of bits 512a-c received on the first downlink channel in each of the n−3, n−2, n−1 subframes and the bits 514 received on the second downlink channel in the sTTI 524 to Z (e.g., Z may be the maximum number of DL-SCH bits (e.g., maximum number of DL-SCH TB bits, a maximum number of DL-SCH REs scheduled to carry bits, a maximum number of DL-SCH RBs scheduled to carry bits, or any combination thereof) that the UE 504 is capable of receiving within a DL-SCH TTI if only a TTI (e.g., a 1 ms subframe) were scheduled). Accordingly, the UE 504 may expect:

$$\max(X_{n-1}, X_{n-2}, \ldots, X_{W_{DL}}) + Y_{j,n} \leq Z, \forall j, W_{DL} \geq 1. \qquad \text{Equation 1}$$

Here, $X_i$ may a number of bits (e.g., DL-SCH TB bits, DL-SCH REs scheduled to carry bits, DL-SCH RBs scheduled to carry bits, or any combination thereof) received within a TTI in subframe i. For example, $X_i$ may be each of the first downlink channel bits 512a-c (e.g., $X_{n-1}$ may be the first downlink channel bits 512c, $X_n$_2 may be the first downlink channel bits 512b, and $X_n$_3 may be the first downlink channel bits 512a). $Y_{j,n}$ may be the number of bits (e.g., DL-SCH TB bits, DL-SCH REs scheduled to carry bits, DL-SCH RBs scheduled to carry bits, or any combination thereof) received within an STTI j in subframe n. For example, $Y_{j,n}$ may be the second downlink channel bits 514, received in the sTTI 524 within the n subframe of the received subframes 520. As long as the preceding Equation 1 is satisfied, the UE 504 may process all bits in the window 510 while adhering to the HARQ timing rule. In an aspect, Z may be defined in one or more standards, such as a 3GPP technical specification (e.g., 3GPP technical specification 36.306, § 4.1 for different UE categories).

In other words, the UE 504 may determine whether a bit threshold Z is surpassed based on the determined number of bits 512a-c received on the first downlink channel in the n−3, n−2, and n−1 subframes of the set of subframes 520 and based on the determined number of bits 514 received on the second downlink channel in the sTTI 524 within the n subframe.

When the first downlink channel is assigned over a first component carrier and the second downlink channel is assigned over a second component carrier (potentially the same as the first component carrier), a bit threshold $Z_c$ may be correspond to the first and/or second component carriers. For example, for a component carrier, the UE 504 may compare a maximum of the determined number of bits 512*a*-*c* received on the first downlink channel in each of the n−3, n−2, and n−1 subframes and the bits 514 received on the second downlink channel to a maximum number of DL-SCH bits associated with that component carrier. In this per-component carrier aspect, the UE 504 may expect:

$$\max(X_{n-1,c}, X_{n-2,c}, \ldots, X_{W_{DL},c}) + Y_{j,n,c} \leq Z_c, \forall j, W_{DL} \geq 1.$$ Equation 2

Here, $X_{i,c}$ may be the each of the first downlink channel bits 512*a*-*c* on component carrier c (e.g., $X_{n-1,c}$ may be the first downlink channel bits 512*c* on component carrier c, $X_{n-2,c}$ may be the first downlink channel bits 512*b* on component carrier c, and $X_{n-3,c}$ may be the first downlink channel bits 512*a* on component carrier c). $Y_{j,n,c}$ may be the number of bits (e.g., DL-SCH TB bits, DL-SCH REs scheduled to carry bits, DL-SCH RBs scheduled to carry bits, or any combination thereof) received within an STTI j in subframe n on component carrier c. For example, $Y_{j,n,c}$ may be the second downlink channel bits 514, received in the sTTI 524 within the n subframe on component carrier c. $Z_c$ may be maximum the number of bits (e.g., DL-SCH TB bits, DL-SCH REs scheduled to carry bits, DL-SCH RBs scheduled to carry bits, or any combination thereof) that the UE 504 is capable of receiving within a DL-SCH TTI if only a TTI (e.g., a 1 ms subframe) were scheduled on component carrier c. As long as the preceding Equation 2 is satisfied, the UE 504 may process all bits in the window 510 while adhering to the HARQ timing rule for component carrier c.

The bit threshold Z (and $Z_c$) may be different according to different configurations of the UE 504. For example, the UE 504 may be configured with a number x of component carriers (or cells), and a number y of those x configured component carriers may be activated for the UE 504, where y≤x. In one aspect, Z may be a sum of a maximum of a number of bits (e.g., DL-SCH TB bits, DL-SCH REs scheduled to carry bits, DL-SCH RBs scheduled to carry bits, or any combination thereof) that the UE 504 is capable of receiving within a DL-SCH TTI over all x configured component carriers (or cells) if only a TTI were scheduled. Accordingly, the UE 504 may compare a maximum of the determined number of bits 512*a*-*c* received on the first downlink channel in each of the n−3, n−2, and n−1 subframes and the bits 514 received on the second downlink channel in the sTTI 524 to a sum of a maximum of a number of DL-SCH bits associated with each of the x configured component carriers. In another aspect, Z may be the maximum number of bits (e.g., DL-SCH TB bits, DL-SCH REs scheduled to carry bits, DL-SCH RBs scheduled to carry bits, or any combination thereof) that the UE 504 is capable of receiving within a DL-SCH TTI over all y activated component carriers (or cells) if only one TTI were scheduled. Accordingly, the UE 504 may compare a maximum of the determined number of bits 512*a*-*c* received on the first downlink channel in each of the n−3, n−2, and n−1 subframes and the bits 514 received on the second downlink channel in the sTTI 524 to a sum of a maximum of a number of DL-SCH bits associated with each of the y activated component carriers.

In an aspect, the UE 504 may receive information 550 from a base station indicating whether the UE 504 is to use the y activated component carriers or x configured component carriers when processing bits in the window 510. For example, the UE 504 may receive, from the base station 502, information 550 indicating that the UE 504 is to use processing capability for all x configured component carriers (or cells) when processing bits in the window 510 and, therefore, Z may be of a first value. Alternatively, the UE 504 may receive, from the base station, information 550 indicating that the UE 504 is to use processing capability for all y activated component carriers (or cells) when processing bits in the window 510 and, therefore, Z may be of a second value. Because the y activated component carriers are a subset of x configured component carriers, the second value may be less than the first value when y≤x or equal to the first value when y=x.

For carrier aggregation, the UE 504 may determine whether a bit threshold Z is surpassed based on the determined number of bits 512*a*-*c* received on the first downlink channel in the n−3, n−2, and n−1 subframes of the set of subframes 520 and based on the determined number of bits 514 received on the second downlink channel in the sTTI 524 within the n subframe. That is, the UE 504 may determine whether Equation 1 is satisfied for carrier aggregation. For a per-component carrier aspect, the UE 504 may determine whether a bit threshold $Z_c$ is surpassed based on the determined number of bits 512*a*-*c* received on the first downlink channel in the n−3, n−2, and n−1 subframes on component carrier c and based on the determined number of bits 514 received on the second downlink channel in the sTTI 524 within the n subframe on component carrier c. That is, the UE 504 may determine whether Equation 2 is satisfied for a per-component carrier aspect. If the UE 504 determines that Equation 1 or Equation 2 is satisfied (depending upon the aspect), then the UE may process all of the first downlink channel bits 512*a*-*c* and second downlink channel bits 514 in the window 510. In one aspect, if the UE 504 determines that Equation 1 or Equation 2 is unsatisfied for at least one component carrier c, then the UE 504 may refrain from processing bits of one or more other component carriers (e.g., in addition to refraining from processing at least a portion of the bits 512*a*-*c* and/or at least a portion of the bits 514). The UE 504 may provide HARQ feedback 560 for the first downlink channel bits 512*a*-*c* and second downlink channel bits 514—e.g., the UE 504 may provide ACK feedback for the first downlink channel bits 512*a*-*c* and provide ACK feedback for the second downlink channel bits 514.

In various aspects, the UE 504 may send, to the base station 502, an indication that the UE 504 supports sTTI traffic (e.g., data carried on an sTTI channel (e.g., sPDSCH) during an sTTI (e.g., a sub-1 ms TTI)). In one aspect, the indication that the UE 504 supports the sTTI traffic may include an indication of a UE category and/or UE capability. A UE category may indicate a capability of the UE for uplink and/or downlink traffic, such as a respective number of bits supported on a respective one of an uplink channel or a downlink channel. A UE capability may be associated with the window 510 (e.g., a size of the window 510). In various aspects, the UE 504 may send, to the base station 502, information indicating a size or length of the window 510. In some aspects, the UE 504 may indicate the size or length of the window 510 by sending information indicating the UE capability.

When the base station 502 receives the indication that the UE 504 supports sTTI traffic and/or information indicating a UE capability of the UE 504, the base station 502 may configure communication with the UE 504. For example, the base station 502 may assign channels and/or schedule communication with the UE 504 based on the UE category and/or capability. In one aspect, the base station 502 may configure the UE 504 so as to reduce the processing power needed to process the first downlink channel bits 512*a-c* and/or second downlink channel bits 514 in the window 510.

For example, the base station 502 may schedule the UE 504 without DMRS-based transmission (e.g., CRS-based transmission modes are used). A transmission mode may define a transmission scheme for the first downlink channel (e.g., a PDSCH), such as single-antenna port, transmit diversity, closed-loop spatial multiplexing, MIMO, and so forth. In one aspect, the base station 502 may select a transmission mode that is unassociated with a DMRS. For example, transmission mode 9 (e.g., single-user MIMO) may be used for DMRS-based transmission, and the DMRS may be used for demodulation at the UE 504. Due to the processing power commensurate with transmission mode 9, the base station 502 may select a lower transmission mode (e.g., transmission mode 1, or another transmission mode that is not DMRS-based) so that processing of the first downlink channel bits 512*a-d* may be completed faster.

In a second example, the base station 502 may configure the UE 504 without ePDCCH-based scheduling. The ePDCCH may carry control information (e.g., scheduling information) on first downlink channel (e.g., PDSCH) resources. In order to detect control information intended for the UE 504, the UE 504 may need to wait until the end of a subframe on the first downlink channel in order to detect the entire ePDCCH. This detection of the entire ePDCCH may increase the processing power needed to process the first downlink channel, for example, because the UE 504 may be need to wait until the end of the subframe (and process all bits of the subframe) to prepare HARQ feedback for the first downlink channel. Consequently, the probability that the threshold maximum number of bits Z may be surpassed may be increased. For example, there is a relatively higher probability that the processing the second downlink channel bits 514 overlaps with processing the first downlink channel bits 512*a-d* when ePDCCH-based scheduling is used, because processing the first downlink channel bits 512*a-d* takes more time than processing the second downlink channel bits 514. By refraining from ePDCCH-based scheduling in the first downlink channel, the base station 502 may reduce the amount of time needed to process the first downlink channel bits 512*a-d*.

In a third example, the base station 502 may limit the MCS used with the UE 504. For example, the base station 502 may limit the UE 504 to a certain data rate and/or MCS index that is below the maximum possible data rate and/or MCS index that the UE 504 is capable of using. For example, the base station 502 may configure communication with the UE 504 by selecting an MCS for the first downlink channel. For example, the base station 502 may configure communication with the UE 504 for a certain data rate and/or MCS index that is below a maximum possible data rate and/or MCS index for communication with the UE 504. By limiting the MCS, the base station 502 may effectively limit the TB size. A lower TB size may reduce the processing power needed by the UE 504 to process the first downlink channel bits 512*a-d*, e.g., because fewer bits may be received per symbol on the first downlink channel.

In a fourth example, the base station 502 may configure the UE 504 below a maximum spatial rank. For example, the UE 504 may send, to the base station 502, an RI indicating a spatial rank (e.g., a number of layers and a number of different signal streams to be utilized by the base station 502). However, the base station 502 may choose to limit the spatial rank, for example, to a corresponding maximum RI. In one aspect, the base station 502 may select the RI for the UE 504 as rank 1, regardless of the RI indicated by the UE 504. Accordingly, the base station 502 may limit, through the spatial rank, the number of layers and signal streams on which bits are conveyed to the UE 504 in order to reduce the processing power needed by the UE 504 to process the first downlink channel bits 512*a-d*, for example, because a fewer number of layers and/or signal streams may limit the number or bits per symbol on the first downlink channel. In another example, the UE 504 may send, to the base station 502, information indicating a MIMO capability of the UE 504. Such information may indicate a number of MIMO layers that the UE 504 is capable of supporting when the UE 504 is configured to receive data on the second downlink channel (e.g., sTTI traffic). When the UE 504 is configured to receive data on the second downlink channel, the number of MIMO layers supported by the UE 504 may be relatively fewer than if the UE 504 were configured to receive data on the first downlink channel and not the second downlink channel. Accordingly, the base station 502 may limit the number of layers on which bits are conveyed to the UE 504 based on the information indicating the MIMO capability.

With one or more of the aforementioned examples, the TB size may be relatively low and/or may reduce signaling overhead (e.g., spatial rank 1). In other words, the base station 502 may configure communication with the UE 504 in order to reduce processing power consumed by the UE when processing at least the first downlink channel bits 512*a-d*, which may prevent violation of Equation 1 or Equation 2.

In view of the foregoing, the UE 504 may still determine that the threshold maximum number of bits Z will be surpassed based on the determined number of first downlink channel bits 512*a-c* received in each of the n−3, n−2, and n−1 subframes and based on the determined number of second downlink channel bits 514 received in the sTTI 524 within the n subframe. When the UE 504 determines that the threshold maximum number of bits Z will be surpassed, the UE 504 may process at least one of the first downlink channel bits 512*a-c* or the second downlink channel bits 514.

In one aspect, the UE 504 may determine, based on whether the threshold maximum number of bits Z will be surpassed, whether to process at least one of the first downlink channel bits 512*a-c* or the second downlink channel bits 514. According to one aspect, the determination of whether to process the first downlink channel bits 512*a-c* or the second downlink channel bits 514 when the threshold maximum number of bits Z will be surpassed may implemented at the UE 504. For example, the UE 504 may have stored information indicating whether to prioritize bits of the first downlink channel or the second downlink channel. In another example, the UE 504 may receive, from the base station 502, information indicating whether to prioritize bits of the first downlink channel or the second downlink channel. The UE 504 may determine to process the first downlink channel bits 512*a-c* when the first downlink channel is prioritized over the second downlink channel, or may process the second downlink channel bits 514 when the second downlink channel is prioritized over the first downlink channel.

In one aspect, the UE 504 may determine to process the second downlink channel bits 514 (e.g., when the second downlink channel is prioritized over the first downlink channel). In such an aspect, the UE 504 may process the second downlink channel bits 514. Further, the UE 504 may send HARQ feedback 560 associated with the processing of the second downlink channel bits 514—e.g., the UE 504 may send ACK feedback to the base station 502 in order to acknowledge that the UE 504 processed the second downlink channel bits 514. So that Equation 1 or Equation 2 will not be violated, the UE 504 may refrain from processing one or more of the first downlink channel bits 512$a$-$c$ in the window 510. In one aspect, the UE 504 may refrain from processing all bits (e.g., TBs, REs carrying bits, RBs carrying bits) corresponding to the first downlink channel bits 512$a$-$c$ in the window. Accordingly, the UE 504 may send HARQ feedback 560 associated with the refraining from processing of the bits (e.g., TBs, REs carrying bits, RBs carrying bits) corresponding to the first downlink channel bits 512$a$-$c$—e.g., the UE 504 may send NACK feedback to the base station 502 in order to indicate that the UE 504 has not processed the bits (e.g., TBs, REs carrying bits, RBs carrying bits) corresponding to the first downlink channel bits 512$a$-$c$. In another aspect, the UE 504 may refrain from processing at least a portion of the first downlink channel bits 514$a$-$c$. For example, the UE 504 may refrain from processing the bits (e.g., TBs, REs carrying bits, RBs carrying bits) corresponding to the first downlink channel bits 512$a$-$b$, the processing of which may overlap with the processing of the second downlink channel bits 514 in the window 510. In such an example, the UE 504 may still process a TB corresponding to the first downlink channel bits 512$c$ corresponding to the n−1 subframe, e.g., because the processing of the first downlink channel bits 512$c$ corresponding to the n−1 subframe may not overlap with the processing of the second downlink channel bits 514 in the window 510. Accordingly, the UE 504 may send HARQ feedback 560 associated with the refraining from processing of the bits (e.g., TBs, REs carrying bits, RBs carrying bits) corresponding to the first downlink channel bits 512$a$-$b$ and the processing of the TB corresponding to the first downlink channel bits 512$c$—e.g., the UE 504 may send NACK feedback to the base station 502 in order to indicate that the UE 504 has not processed the bits (e.g., TBs, REs carrying bits, RBs carrying bits) corresponding to the first downlink channel bits 512$a$-$b$, but send ACK feedback to the base station 502 in order to indicate that the UE 504 processed the bits (e.g., TBs, REs carrying bits, RBs carrying bits) corresponding to the first downlink channel bits 512$c$.

In another aspect, the UE 504 may determine to process the first downlink channel bits 512$a$-$c$ (e.g., when the first downlink channel is prioritized over the second downlink channel). In such an aspect, the UE 504 may process the first downlink channel bits 512$a$-$c$. Further, the UE 504 may send HARQ feedback 560 associated with the processing of the first downlink channel bits 512$a$-$c$—e.g., the UE 504 may send ACK feedback to the base station 502 in order to acknowledge that the UE 504 processed the first downlink channel bits 512$a$-$c$. So that Equation 1 or Equation 2 will not be violated, the UE 504 may refrain from processing the second downlink channel bits 514 in the window 510. Accordingly, the UE 504 may send HARQ feedback 560 associated with the refraining from processing of the second downlink channel bits 514—e.g., the UE 504 may send NACK feedback to the base station 502 in order to indicate that the UE 504 has not processed the second downlink channel bits 514.

While the present disclosure describes aspects with respect to a first downlink channel (e.g., PDSCH) and a second downlink channel (e.g., sPDSCH), aspects described herein may be applicable to any number of standards and technologies. For example, in 5G NR, different numerologies may be considered—e.g., different subcarrier spacing values. Examples of different numerologies that may be implemented in 5G NR may include 15 kilohertz (KHz), 30 KHz, 60 KHz, etc. For varying numerologies, a respective TTI (e.g., slot length) may be of a different duration or length. With the standards of 5G NR, different NR component carriers may be configured to operate according to different TTIs. The UE 504 may be configured to concurrently process respective bits carried on different component carriers during different TTIs (e.g., shorter TTIs may require faster HARQ preparation and response). The configuration of different numerologies and different TTIs may be similar to the aforementioned simultaneous processing of first downlink channel bits 512$a$-$d$ and second downlink channel bits 514. In particular, the threshold maximum number of bits may be defined over all NR component carriers. For example, processing capability of a UE may be defined over all available component carriers, and may be flexibly shared over subsets of component carriers such that simultaneous processing of bits carried on different component carriers with different TTIs is possible without exceeding the threshold maximum number of bits.

Figure 6A:
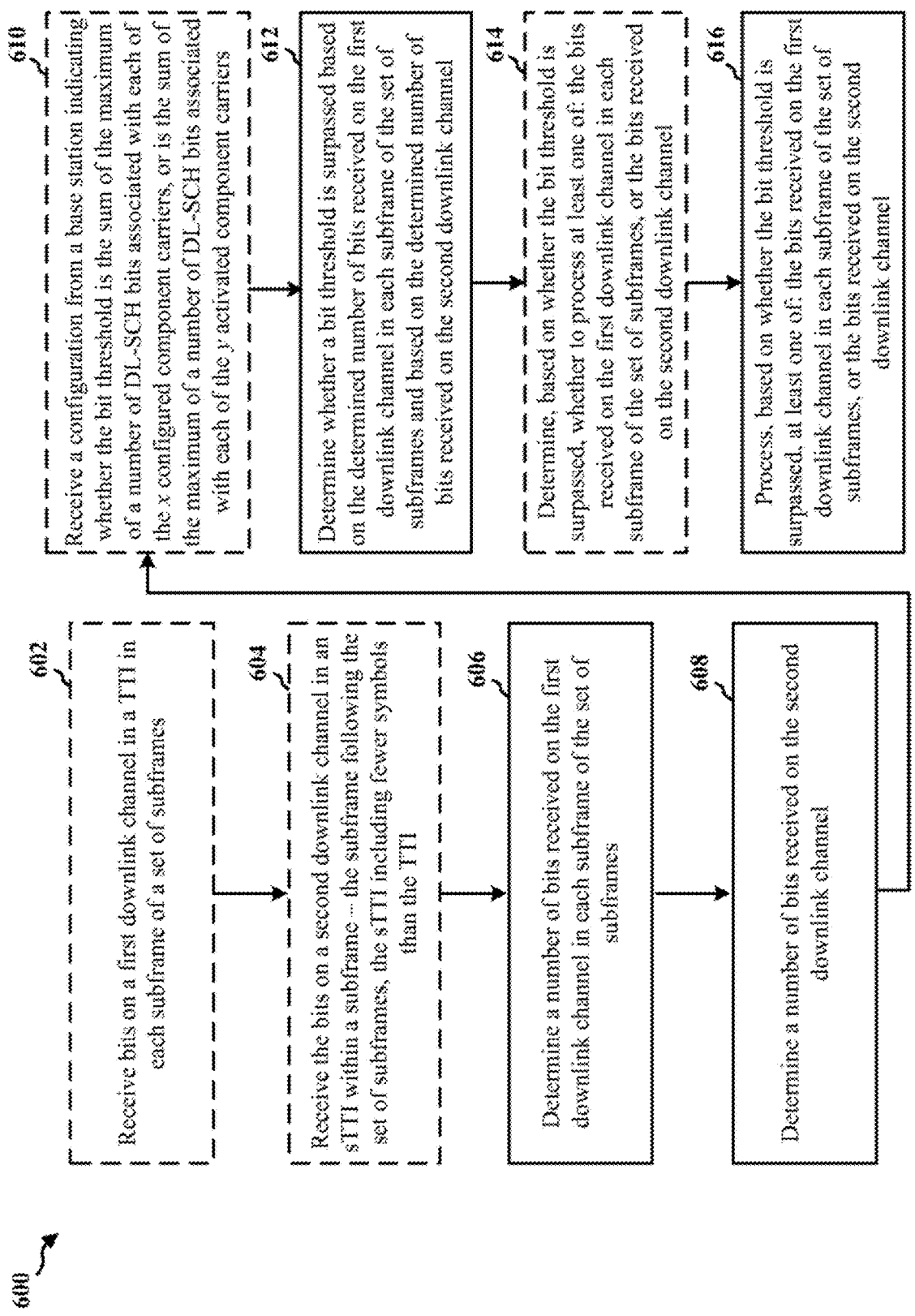
FIGS. 6A-6C are flowcharts of methods of wireless communication.
Figure 6B:
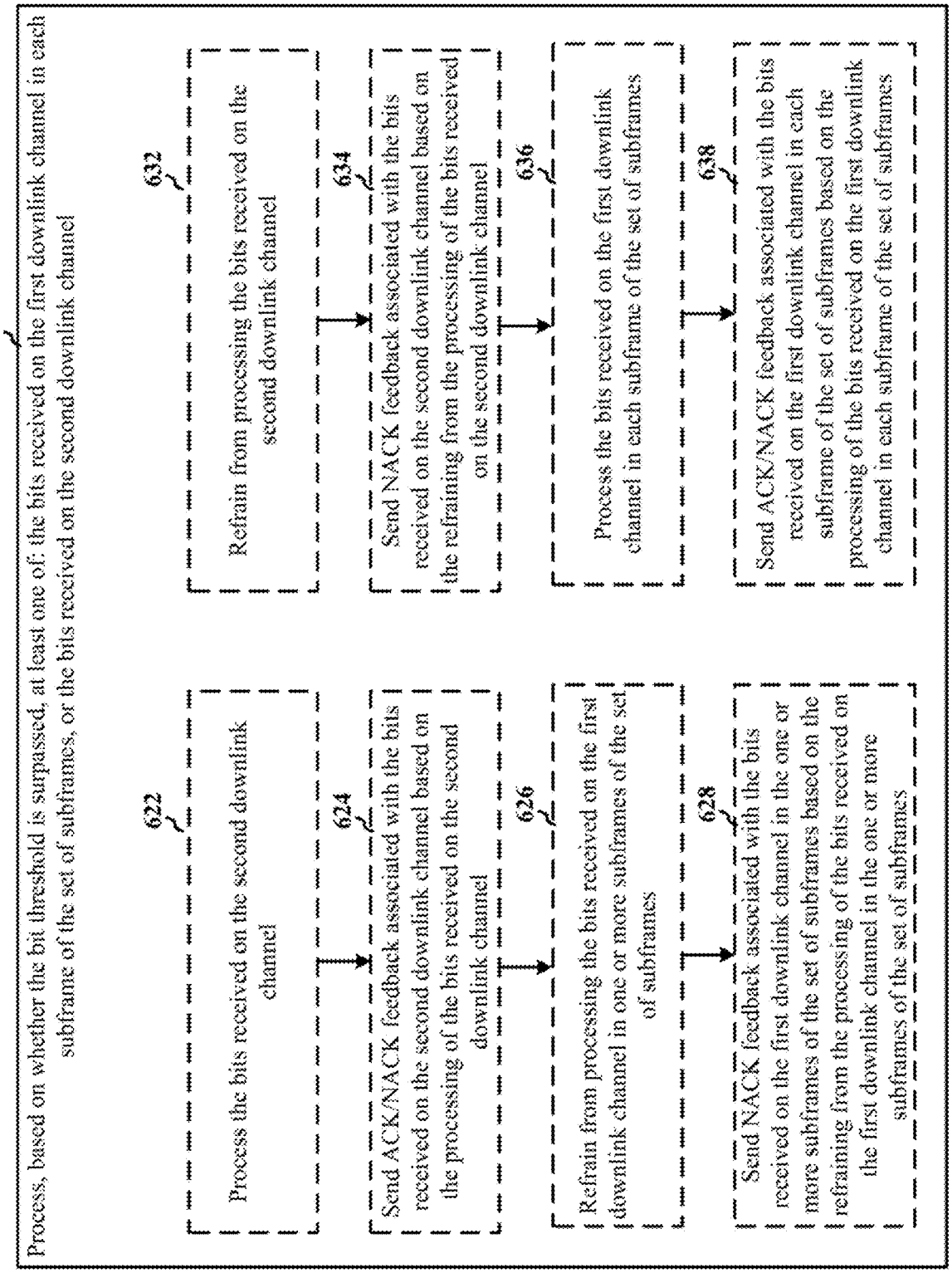
Figure 6C:
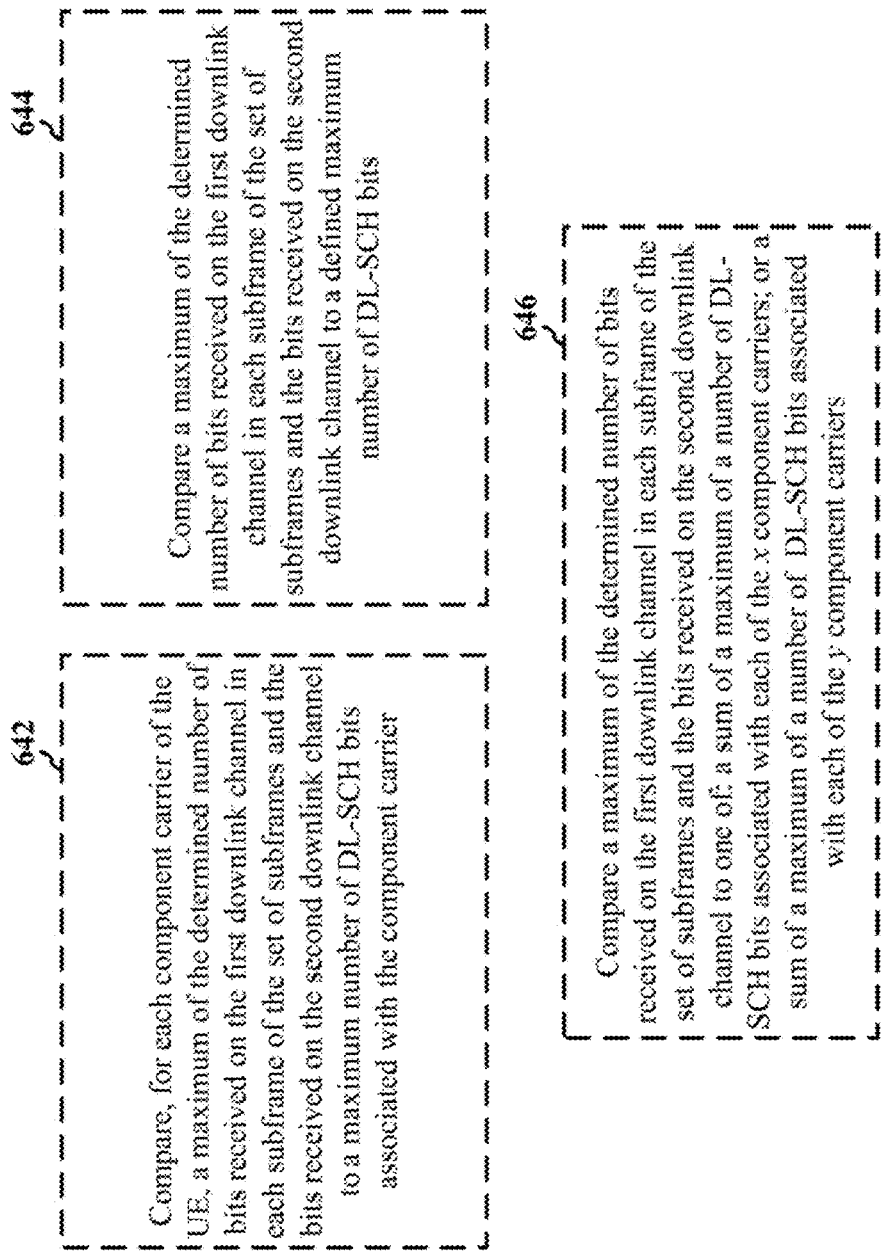

FIGS. 6A-6C illustrate flowcharts of methods 600, 620, 640 of wireless communication. The method may be performed by a UE (e.g., the UE 104, the UE 350, the UE 504, and/or the apparatus 1002/1002'). In various aspects, one or more operations may be omitted, transposed, and/or contemporaneously performed. For example, optional operations may be illustrated with dashed lines.

At operation 602, the UE may receive bits on a first downlink channel in a TTI in each subframe of a set of subframes. In aspects, the first downlink channel may be a PDSCH. In the context of FIG. 5, the UE 504 may receive bits (e.g., corresponding to bits 512$a$-$c$) on the first downlink channel within a TTI in the n−3, n−2, n−1 subframes of the set of subframes 520.

At operation 604, the UE may receive bits on a second downlink channel in an sTTI within a subframe. In aspects, the subframe which the sTTI is within may follow the set of subframes. In aspects, the sTTI may include fewer symbols than the TTI (e.g., subframe). In aspects, the second downlink channel may be an sPDSCH. In the context of FIG. 5, the UE 504 may receive the bits (e.g., corresponding to the bits 514) in the sTTI 524. As described, the UE 504 may receive the sTTI 524 within the n subframe following the n−3, n−2, n−1 subframes of the set of subframes 520.

At operation 606, the UE may determine a number of bits received on the first downlink channel in each subframe of the set of subframes. For example, the UE may identify the bits of each subframe, and the UE may calculate the number of identified bits of each subframe. In the context of FIG. 5, the UE 504 may determine the number of bits 512$a$-$c$ received in the first downlink channel in each of the n−3, n−2, n−1 subframes of the set of subframes 520.

At operation 608, the UE may determine a number of bits received on the second downlink channel. For example, the UE may identify the bits received in the sTTI within the subframe, and the UE may calculate the number of identified bits. In the context of FIG. 5, the UE 504 may determine a number of bits 514 received on the second downlink channel received in the sTTI 524 within the n subframe.

At operation 610, the UE may receive a configuration from a base station indicating whether a bit threshold is the sum of the maximum number of DL-SCH bits associated with each of x configured component carriers or y activated component carriers, y being less than or equal to x. The bit threshold (e.g., Z) may be the maximum number of DL-SCH bits that the UE is capable of receiving within a TTI if only one TTI were scheduled. In other words, the UE may be configured by the base station with a bit threshold that is the maximum number of DL-SCH bits either summed over all x configured component carriers or over all y activated component carriers that the UE is capable of receiving within a TTI if only one TTI were scheduled. In the context of FIG. 5, the UE 504 may receive, from the base station 502, the information 550 indicating whether the UE 504 is to use the y activated component carriers or x configured component carriers when processing bits in the window 510.

At operation 612, the UE may determine whether the bit threshold is surpassed based on the determined number of bits received on the first downlink channel in each subframe of the set of subframes and based on the determined number of bits received on the second downlink channel. For example, the UE may add the determined number of bits received on the first downlink channel in each subframe of the set of subframes and the determined number of bits received on the second downlink channel, and the UE may determine whether the sum is greater than the bit threshold. In the context of FIG. 5, the UE 504 may determine whether a bit threshold (e.g., Z or $Z_c$) is surpassed based on the determined number of bits 512a-c received on the first downlink channel in the n−3, n−2, and n−1 subframes and based on the determined number of bits 514 received on the second downlink channel.

At operation 614, the UE may determine, based on whether the bit threshold is surpassed, whether to process at least one of: the bits received on the first downlink channel in each subframe of the set of subframes, or the bits received on the second downlink channel. If the bit threshold is unsurpassed, the UE may determine to process both the bits received on the first downlink channel in each subframe of the set of subframes, and the bits received on the second downlink channel. If the bit threshold is surpassed, the UE may identify a first priority of the first downlink channel and a second priority of the second downlink channel, and the UE may determine whether the first priority is higher than the second priority or the second priority is higher than the first priority. The UE may determine that bits of the downlink channel having the higher priority are to be processed and the bits of the downlink channel having the lower priority are not to be processed. In the context of FIG. 5, the UE 504 may determine, based on whether the bit threshold is surpassed, whether to process at least one of: the bits 512a-c received on the first downlink channel in each of the n−3, n−2, n−1 subframes, or the bits 514 received on the second downlink channel in the sTTI 524.

At operation 616, the UE may process, based on whether the bit threshold is surpassed, at least one of: the bits received on the first downlink channel in each subframe of the set of subframes, or the bits received on the second downlink channel. The UE may process both the bits received on the first downlink channel in each subframe of the set of subframes, and the bits received on the second downlink channel. If the bit threshold is surpassed, the UE may process the bits received on the first downlink channel in each subframe of the set of subframes, or the bits received on the second downlink channel, for example, as determined from which downlink channel has the higher priority. In an aspect, the UE may process the bits by de-mapping, de-modulating, and/or decoding the bits, and providing at least a portion of those bits to a higher layer. In the context of FIG. 5, the UE 504 may process, based on whether the bit threshold is surpassed, at least one of: the bits 512a-c received on the first downlink channel in each of the n−3, n−2, and n−1 subframes and/or the bits 514 received on the second downlink channel in the sTTI 524.

FIG. 6B illustrates various aspects of operation 616, at which the UE may process, based on whether the bit threshold is surpassed, at least one of: the bits received on the first downlink channel in each subframe of the set of subframes, or the bits received on the second downlink channel.

In one aspect of operation 616, the UE may perform one or more operations 622, 624, 626, 628, for example, when the second downlink channel is determined to have a higher priority than the first downlink channel and the bit threshold is determined to be surpassed. At operation 622, the UE may process the bits received on the second downlink channel. For example, the UE may de-map, demodulate, and/or decode the bits received on the second downlink channel, and the UE may provide at least a portion of those bits to a higher layer (e.g., PDCP layer, RLC layer, etc.). In the context of FIG. 5, the UE 504 may process the bits 514 received on the second downlink channel in the sTTI 524.

At operation 624, the UE may send ACK/NACK feedback associated with the bits received on the second downlink channel based on the processing of the bits received on the second downlink channel. For example, the UE may generate an ACK message to indicate that the bits received on the second downlink channel were successfully processed, and the UE may send the ACK message to the base station. In the context of FIG. 5, the UE 504 may send HARQ feedback 560 to the base station 502 based on the processing of the bits 514 of the second downlink channel.

At operation 626, the UE may refrain from processing the bits received on the first downlink channel in one or more subframes of the set of subframes. For example, the UE may identify one or more bits (e.g., TBs, REs carrying bits, RBs carrying bits) of the first downlink channel, the processing of which may overlap with the processing of the bits of the second downlink channel, and the UE may discard or delete the one or more identified bits (e.g., TBs, REs carrying bits, RBs carrying bits) of the first downlink channel. In the context of FIG. 5, the UE 504 may refrain from processing one or more bits (e.g., TBs, REs carrying bits, RBs carrying bits) corresponding to the bits 512a-c received on the first downlink channel in one or more of the n−3, n−2, n−1 subframes. For example, the UE 504 may discard the bits 512a-b that overlap with the bits 514 in the window 510.

At operation 628, the UE may generate ACK/NACK feedback associated with the bits received on the first downlink channel in the one or more subframes of the set of subframes based on the refraining from processing of the bits. For example, the UE may generate a NACK message for each TB corresponding to the bits that are unprocessed (e.g., discarded), and the UE may send the NACK message(s) to the base station to indicate which bits (e.g., TBs, REs carrying bits, RBs carrying bits) are unprocessed. In the context of FIG. 5, the UE 504 may send the HARQ feedback 560 to indicate one or more bits (e.g., TBs, REs carrying bits, RBs carrying bits) corresponding to one or more of the bits 512a-c were unprocessed.

In one aspect of operation 616, the UE may perform one or more operations 632, 634, 636, 638, for example, when the first downlink channel is determined to have a higher priority than the second downlink channel and the bit threshold is determined to be surpassed. At operation 632, the UE may refrain from processing the bits received on the second downlink channel. For example, the UE may identify bits (e.g., TBs, REs carrying bits, RBs carrying bits) corresponding to bits received on the second downlink channel, and the UE may discard or delete the identified bits. In the context of FIG. 5, the UE 504 may refrain from processing the bits 514 received on the second downlink channel in the sTTI 524.

At operation 634, the UE may send ACK/NACK feedback associated with the bits received on the second downlink channel based on the refraining from processing of the bits received on the second downlink channel. For example, the UE may generate a NACK message to indicate that the bits received on the second downlink channel were unsuccessfully processed, and the UE may send the NACK message to the base station. In the context of FIG. 5, the UE 504 may send HARQ feedback 560 to the base station 502 based on the refraining from processing of the bits 514 of the second downlink channel.

At operation 636, the UE may process the bits received on the first downlink channel in one or more subframes of the set of subframes. For example, the UE may de-map, demodulate, and/or decode the bits received on the first downlink channel, and the UE may provide at least a portion of those bits to a higher layer (e.g., PDCP layer, RLC layer, etc.). In the context of FIG. 5, the UE 504 may process the bits 512a-c received on the first downlink channel in the n−3, n−2, n−1 subframes.

At operation 638, the UE may generate ACK/NACK feedback associated with the bits received on the first downlink channel in the one or more subframes of the set of subframes based on the processing of the bits. For example, the UE may generate an ACK message for each TB corresponding to the bits that are processed, and the UE may send the ACK message(s) to the base station to indicate which bits (e.g., TBs, REs carrying bits, RBs carrying bits) are successfully processed.

FIG. 6C illustrates various aspects of operation 612, at which the UE may determine whether a bit threshold is surpassed based on the determined number of bits received on the first downlink channel in each subframe of the set of subframes and based on the determined number of bits received on the second downlink channel.

For the aspect illustrated at operation 642, the UE may compare, for each component carrier of the UE, a maximum of the determined number of bits received on the first downlink channel in each subframe of the set of subframes and the bits received on the second downlink channel to a maximum number of DL-SCH bits associated with the component carrier. For example, for a component carrier c, the UE may expect:

$$\max(X_{n-1,c}, X_{n-2,c}, \ldots, X_{W_{DL},c}) + Y_{j,n,c} \leq Z_c, \forall j, W_{DL} \geq 1. \quad \text{Equation 2}$$

Where $X_{i,c}$ may be each of the first downlink channel DL-SCH bits on component carrier c, $Y_{j,n,c}$ may be the number of DL-SCH bits received within an STTI j in subframe n on component carrier c. $Z_c$ may be maximum the number of DL-SCH bits that the UE is capable of receiving within a DL-SCH TTI if only a TTI (e.g., a 1 ms subframe) were scheduled on component carrier C. $W_{DL}$ may be the window size (e.g., as defined by UE capability, HARQ timing rule, etc.). In the context of FIG. 5, the UE 504 may compare, for each component carrier of the UE 504, a maximum of the determined number of bits 512a-c received on the first downlink channel for a component carrier c in each subframe of the n−3, n−2, and n−1 subframes and the bits 514 received on the second downlink channel for a component carrier c to a maximum number of bits associated with the component carrier c.

According to another aspect, illustrated at operation 644, the UE may compare a maximum number of the determined number of bits received on the first downlink channel in each subframe of the set of subframes and the bits received on the second downlink channel to a defined maximum number of bits. For example, the UE may expect:

$$\max(X_{n-1}, X_{n-2}, \ldots, X_{W_{DL}}) + Y_{j,n} \leq Z, \forall j, W_{DL} \geq 1. \quad \text{Equation 1}$$

Here, $X_i$ may a number of DL-SCH bits received within a TTI in subframe i. $Y_{j,n}$ may be the number of DL-SCH bits received within an STTI j in subframe n. Z may be the bit threshold for carrier aggregation, e.g., the maximum number of DL-SCH bits that the UE is capable of receiving within a TTI if only one TTI were scheduled. $W_{DL}$ may be the window size (e.g., as defined by UE capability, HARQ timing rule, etc.). In the context of FIG. 5, the UE 504 may compare a maximum of the determined number of bits 512a-c received on the first downlink channel in each subframe of the n−3, n−2, and n−1 subframes and the bits 514 received on the second downlink channel to a defined maximum number of bits.

According to another aspect, illustrated at operation 646, the UE may compare a maximum of the determined number of bits received on the first downlink channel in each subframe of the set of subframes and the bits received on the second downlink channel to one of: a sum of a maximum of a number of DL-SCH bits associated with each of x configured component carriers; or a sum of a maximum of a number of DL-SCH bits associated with each of y activated component carriers. For example, the UE may expect:

$$\max(X_{n-1}, X_{n-2}, \ldots, X_{W_{DL}}) + Y_{j,n} \leq Z, \forall j, W_{DL} \geq 1. \quad \text{Equation 1}$$

Here, $X_i$ may a number of DL-SCH bits received within a TTI in subframe i. $Y_{j,n}$ may be the number of DL-SCH bits received within an STTI j in subframe n. Z may be the bit threshold, e.g., the maximum number of DL-SCH bits summed over either all x configured component carriers or all y activated component carriers that the UE is capable of receiving within a TTI if only one TTI were scheduled. $W_{DL}$ may be the window size (e.g., as defined by UE capability, HARQ timing rule, etc.). The UE may determine to use either the x configured component carriers or the y activated component carriers based on information stored in the UE or based on information received from the base station (see, e.g., operation 610). In the context of FIG. 5, the UE 504 may compare a maximum of the determined number of bits 512a-c received on the first downlink channel in each of the n−3, n−2, n−1 subframes and the bits 514 received on the second downlink channel to one of: a sum of a maximum of a number of DL-SCH bits associated with each of x configured component carriers; or a sum of a maximum of a number of DL-SCH bits associated with each of y activated component carriers.

Figure 7:
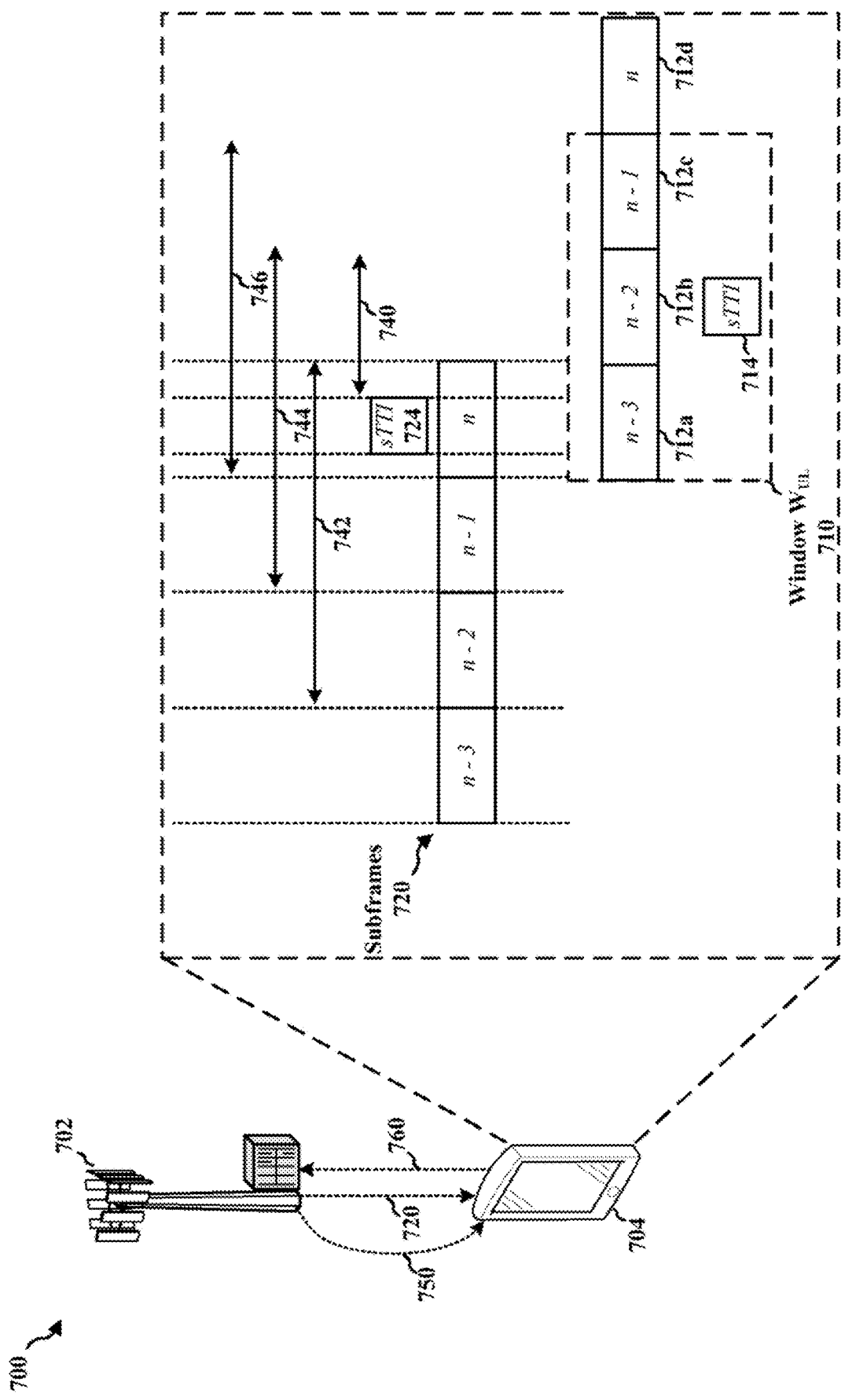
FIG. 7 is a diagram of a wireless communications system.

FIG. 7 is a diagram of a wireless communications system 700. The wireless communications system 700 may include a UE 704 in communication with a base station 702. In an aspect, the UE 704 may be a ULL UE, a delay-sensitive UE, and/or an MiCr UE. In an aspect, the UE 704 may be an aspect of the UE 504 and the base station 702 may be an aspect of the base station 502, as illustrated in FIG. 5.

The base station 702 may be configured to send one or more first uplink channel grants for a first uplink channel in a TTI within a set of subframes 720. In an aspect, the first uplink channel may be a PUSCH. Each of the subframes 720 may be a TTI having a duration corresponding to the PUSCH. For example, each subframes of the subframes may have a duration of 1 ms.

Additionally, the base station 702 may be configured to send at least one second uplink channel grant for a second uplink channel in an sTTI 724. The second uplink channel grant received in the sTTI 724 may be received within the n subframe of the subframes 720. In an aspect, the second uplink channel may be a short PUSCH (sPUSCH). The sTTI 724 may have a duration that is shorter than each of the subframes 720, such as less than 1 ms (e.g., 1 or 2 symbols, 1 slot, 0.5 ms, etc.). In one aspect, the second uplink channel grant may be a grant for ULL data, delay-sensitive data, and/or MiCr data, which may be sent by the UE 704 in an uplink sTTI.

In one aspect, the base station 702 may schedule the uplink data granted to the UE 704 over one or more component carriers (or cells). The component carriers (or cells) with which the UE 704 is configured may correspond to component carriers for which the UE 704 may monitor for control information. However, of those configured component carriers, the UE 704 may monitor for control information on component carriers which are activated for the UE 704. For example, the UE 704 may be configured with a set of 5 component carriers, but a subset of 2 of those 5 component carriers may be activated. The UE 704 may monitor for control information on each component carrier of the subset of 2 activated component carriers. The base station 702 may configure and/or activate the component carriers for the UE 704.

In an aspect, the base station 702 may schedule the UE 704 on all activated component carriers (e.g., for carrier aggregation). In another aspect, the base station 702 may assign the first uplink channel grant for a first component carrier and assign the second uplink channel grant for a second component carrier. Potentially, the first and second component carriers may be the same component carrier; that is, the base station 702 may assign the first uplink channel grant and the second uplink channel grant for one component carrier. This per-component carrier scheduling may prevent the UE 704 from being scheduled with a greater number of bits than the UE 704 can process.

The UE 704 may receive each of the one or more first uplink channel grants for the first uplink channel in a TTI within the set of subframes 720. Similarly, the UE 704 may receive the second uplink channel grant for the second uplink channel in an sTTI 724 within the n subframe that follows the n−3, n−2, n−1 subframes having the one or more first uplink channel grants.

The UE 704 may include a window 710. In some aspects, the window 510 may be referred to as an "exclusion window," although any suitable terminology may be used without departing from the present disclosure. The window 710 may include a processing pipeline during which bits (e.g., TB bits, REs scheduled to carry bits, RBs scheduled to carry bits, or any combination thereof) corresponding to the uplink channel grants may be processed for transmission. Each of the first uplink channel bits 712a-d may correspond to bits granted in the n−3 through n subframes of the set of subframes 720. Therefore, first uplink channel bits 712a may include bits granted in the n−3 subframe of the received subframes 720, first uplink channel bits 712b may include bits granted in the n−2 subframe of the received subframes 720, first uplink channel bits 712c may include bits granted in the n−1 subframe of the received subframes 720, and the first uplink channel bits 712d may include bits granted in the n subframe of the received subframes 720. Similarly, the second uplink channel bits 714 may include bits granted in the received sTTI 724.

According to the uplink channel grants, the UE 704 may have at most a first duration 740 to process the second uplink channel bits 714 granted in the sTTI 724 within the n subframe. The UE 704 may have a second duration 742 (e.g., 3 subframes) to process the first uplink channel bits 712a granted during the n−3 subframe of the subframes 720, for example, so that the uplink data 760 corresponding to the first uplink channel bits 712a may be sent at a time corresponding to an n+1 subframe. Similarly, the UE 704 may have a third duration 744 to process the first uplink channel bits 712b granted in the n−2 subframe of the subframes 720, for example, so that the uplink data 760 corresponding to the first uplink channel bits 712b may be sent at a time corresponding to an n+2 subframe. Similarly, the UE 704 may have a fourth duration 746 to process the first uplink channel bits 712c granted in the n−1 subframe of the subframes 720, for example, so that the uplink data 760 corresponding to the first uplink channel bits 712c may be sent at a time corresponding to an n+3 subframe.

In this example, the window 710 (i.e., $W_{UL}$) may correspond to a duration of 3 subframes so that the UE 704 may adhere to an n+4 uplink scheduling timing. In aspects, a window $W_{UL} \in \{0, \ldots, k-1\}$, where k is the uplink timing (e.g., 1 ms uplink scheduling timing). For example, $W_{UL}$ may be equal to 3 for an uplink scheduling timing of k=4.

In other aspects, the window 710 may have other durations, such as 2 ms, 2.5 ms, 3 ms, 4 ms, etc. In various aspects, a window may be defined based on different UE capabilities and/or UE processing power. In one aspect, the size or length of the window 710 may be based on uplink scheduling information. For example, under a legacy timing rule (e.g., LTE), the UE 704 may operate according to n+4 timing and, therefore, the window 710 may have a duration of 3 subframes (e.g., 3 ms). However, under shortened timing (e.g., 5G NR), the uplink scheduling timing may be n+3 and, therefore, the window 710 may have a maximum duration of 2 ms. The window 710 may depend on other factors. In various aspects, the size or length of the window 710 may vary according to the duration of the sTTI 724 of the second uplink channel. For example, the size or length of the window 710 may be different for different durations of the sTTI 724 (e.g., the window 710 may be of a first length when the sTTI 724 has a duration of two symbols, but may be of a second length when the sTTI 724 has a duration of one slot). In various aspects, the UE 704 may send, to the base station 702, information indicating the size of length of the window 710. Such information may be indicated to the base station 702 by signaling a UE capability of the UE 704 to the base station 702.

In the window 710, the UE 704 may process bits (e.g., TB bits) corresponding to uplink channel grants in subframes 720 and/or sTTI 724. The UE 704 may process bits in the window 710, for example, by mapping, modulating, and/or encoding bits to be carried on the first uplink channel and/or the second uplink channel. The UE 704 may then transmit the uplink data 760 based on the processing. For example, the UE 704 may send data corresponding to the one or more first uplink channel bits 712a-d (granted in the subframes 720) on the first uplink channel in subframes. Once the UE 704 processes the first channel bits 712a-c, the UE 704 may advance the window 710. For example, once the UE 704 processes the first uplink channel bits 712a corresponding to the n−3 subframe, the UE 704 may advance the first uplink channel bits 712a out of the window 710, and the first uplink channel bits 712d corresponding to the uplink channel grant in the n subframe would be advanced into the window 710. The UE 704 may then send uplink data 760 for the first uplink channel bits 712a after the second duration 742 (e.g., at a time corresponding to an n+1 subframe).

In aspects, the UE 704 may be scheduled to receive the uplink channel grants in the subframes 720. However, sTTI traffic may be scheduled at any time. For example, the UE 704 may receive a second uplink channel grant in the sTTI 724 within the n subframe of the subframes 720.

While the sTTI 724 may be received within an n subframe, processing the second uplink channel bits 714 (e.g., granted in the sTTI 724) may overlap in time with processing of one or more first uplink channel bits 712a-c granted in the n−3 to n−1 subframes. The operations of the second uplink channel (e.g., sTTI) may have a relatively faster processing time than the processing time of the operations of the first uplink channel, but processing of the second uplink channel bits 714 may still increase processing overhead in the window 710, e.g., when processing of the second uplink channel bits 714 overlaps with one or more first uplink channel bits 712a-c in the window 710. Consequently, the number of bits processed in the window 710 may be increased when sTTI traffic is introduced into the pipeline.

The UE 704 may support processing of a threshold maximum number of bits, for example, in order to adhere to the uplink scheduling timing and/or due to the capability of the UE 704. Therefore, the number of bits in the window 710 of the UE 704 should not exceed a threshold maximum number of bits at any given time. In various aspects, the threshold maximum number of bits may be based on at least one of a threshold maximum number of TB bits, a threshold maximum number of REs scheduled to carry bits, a threshold maximum number of RBs scheduled to carry bits, or any combination thereof. When the number of bits being processed by the UE 704 at each given time within the window 710 does not exceed the threshold maximum amount of bits, the UE 704 may be able to process bits granted for all uplink channels (e.g., both the first uplink channel bits 712a-c and the second uplink channel bits 714).

In various aspects, the UE 704 may determine a number of bits scheduled in one or more first uplink channel grants received in the n−3, n−2, and n−1 subframes of the set of subframes 720. Further, the UE 704 may determine the number of bits scheduled in the second uplink channel grant received in the sTTI 724, which may be received in the n subframe of the set of subframes 720. As illustrated, the processing of the second uplink channel bits 714 may overlap with the first uplink channel bits 712b in the window 710. The UE 704 may determine whether the threshold maximum number of bits (e.g., a bit threshold, which may be based on at least one of a maximum number of TB bits, a maximum number of REs scheduled to carry bits, a maximum number of RBs scheduled to carry bits, or any combination thereof) is surpassed based on the determined number of bits 712a-c scheduled in each first uplink channel grant of the one or more first uplink channel grants received for the first uplink channel in the n−3, n−2, and n−1 subframes and based on the determined number of bits 714 scheduled in the second uplink channel grant received for the second uplink channel in the sTTI 724.

When the UE 704 is scheduled over all activated component carriers (e.g., for carrier aggregation), the UE may compare a maximum of the determined number of bits 712a-c granted for the first uplink channel in each of the n−3, n−2, n−1 subframes and the bits 714 granted for the second uplink channel in the sTTI 724 to Z (e.g., Z may be maximum the number of UL-SCH bits that the UE 704 is capable of transmitting within a UL-SCH TTI if only a TTI (e.g., a 1 ms subframe) were scheduled). Accordingly, the UE 704 may expect:

$$\max(X_{n-1}, X_{n-2}, \ldots, X_{W_{UL}}) + Y_{j,n} \leq Z, \forall j, W_{DL} \geq 1. \quad \text{Equation 3}$$

Here, $X_i$ may a number of bits (e.g., UL-SCH TB bits, UL-SCH REs scheduled to carry bits, UL-SCH RBs scheduled to carry bits, etc.) scheduled by uplink DCI in subframe i. For example, $X_i$ may be the each of the first uplink channel bits 712a-c respectively granted in the n−3, n−2, and n−1 subframes (e.g., $X_{n-1}$ may be the first uplink channel bits 712c, $X_{n-2}$ may be the first uplink channel bits 712b, and $X_{n-3}$ may be the first uplink channel bits 712a). $Y_{j,n}$ may be the number of bits (e.g., UL-SCH TB bits, UL-SCH REs scheduled to carry bits, UL-SCH RBs scheduled to carry bits, etc.) scheduled by uplink sDCI in an sTTI j in subframe n. For example, $Y_{j,n}$ may be the second uplink channel bits 714, scheduled by uplink short DCI (sDCI) in the sTTI 724 within the n subframe of the received subframes 720. As long as the preceding Equation 3 is satisfied, the UE 704 may process all bits in the window 710 while adhering to the uplink scheduling timing. In an aspect, Z may be defined in one or more standards, such as a 3GPP technical specification (e.g., 3GPP technical specification 36.306, § 4.1 for different UE categories).

In other words, the UE 704 may determine whether a bit threshold Z is surpassed based on the determined number of bits scheduled in each first uplink channel grant in the n−3, n−2, and n−1 subframes and based on the determined number of bits scheduled in the second uplink channel grant received in the sTTI 724.

When the first uplink channel is assigned over a first component carrier and the second uplink channel is assigned over a second component carrier (potentially the same as the first component carrier), a bit threshold $Z_c$ may be correspond to the first and/or second component carriers. For example, for a component carrier, the UE 704 may compare a maximum of the determined number of bits scheduled in each first uplink channel grant of the one or more first uplink channel grants received for the first uplink channel in the n−3, n−2, and n−1 subframes for a component carrier c and the bits scheduled in the second uplink channel grant for the second uplink channel for the component carrier c to $Z_c$ (e.g., the maximum number of UL-SCH bits within a subframe of component carrier c for the UE 704 if only a TTI (e.g., 1 ms TTI) were scheduled). In this per-component carrier aspect, the UE 704 may expect:

$$\max(X_{n-1,c}, X_{n-2,c}, \ldots, X_{W_{UL},c}) + Y_{j,n,c} \leq Z_c, \forall j, W_{UL} \geq 1. \quad \text{Equation 4}$$

Here, $X_{i,c}$ may be the each of the first uplink channel bits 712a-c scheduled by uplink DCI in subframe i on component carrier c (e.g., $X_{n-1,c}$ may be the first uplink channel bits 712c on component carrier c, $X_{n-2,c}$ may be the first uplink channel bits 712b on component carrier c, and $X_{n-3,c}$ may be the first uplink channel bits 712a on component carrier c). $Y_{j,n,c}$ may be the number of bits (e.g., UL-SCH TB bits, UL-SCH REs scheduled to carry bits, UL-SCH RBs scheduled to carry bits, etc.) scheduled by uplink sDCI in an sTTI j within subframe n of component carrier c. For example, $Y_{j,n,c}$ may be the second uplink channel bits 714, scheduled in the sTTI 724 within the n subframe on component carrier c. $Z_c$ may be maximum the number of bits (e.g., UL-SCH TB bits, UL-SCH REs scheduled to carry bits, UL-SCH RBs scheduled to carry bits, or any combination thereof) that the UE 704 is capable of transmitting within a subframe of component carrier c if only a TTI (e.g., a 1 ms subframe) were scheduled. In one aspect, the maximum number of UL-SCH bits associated with the component carrier c may be based on the maximum number of UL-SCH bits for the first uplink channel. As long as the preceding Equation 4 is satisfied, the UE 704 may process all bits in the window 710 while adhering to the uplink scheduling timing for component carrier c. In one aspect, if the UE 704 determines that Equation 3 or Equation 4 (depending on the aspect) is unsatisfied for at least one component carrier c, then the UE 504 may refrain from processing bits of one or more other components carriers (e.g., in addition to refraining from processing at least a portion of the bits 712$a$-$c$ and/or at least a portion of the bits 714).

The bit threshold Z (and $Z_c$) may be different according to different configurations of the UE 704. For example, the UE 704 may be configured with a number x of component carriers (or cells), and a number y of those x configured component carriers may be activated for the UE 704, where y≤x. In one aspect, Z may be a sum of a maximum of a number of bits (e.g., UL-SCH TB bits, UL-SCH REs scheduled to carry bits, UL-SCH RBs scheduled to carry bits, or any combination thereof) that the UE 704 is capable of transmitting within a UL-SCH TTI over all x configured component carriers (or cells) if only a TTI were scheduled. Accordingly, the UE 704 may compare a maximum of the determined number of bits 712$a$-$c$ scheduled by each first uplink channel grant in each of the n−3, n−2, and n−1 subframes and the bits 714 scheduled by the second uplink channel grant in the sTTI 724 to a sum of a maximum of a number of UL-SCH bits associated with each of the x configured component carriers. In another aspect, Z may be the maximum number of bits (e.g., UL-SCH TB bits, UL-SCH REs scheduled to carry bits, UL-SCH RBs scheduled to carry bits, etc.) that the UE 704 is capable of transmitting within an UL-SCH TTI over all y activated component carriers (or cells) if only one TTI were scheduled. Accordingly, the UE 704 may compare a maximum of the determined number of bits 712$a$-$c$ scheduled by each first uplink channel grant in each of the n−3, n−2, and n−1 subframes and the bits 714 scheduled by the second uplink channel grant in the sTTI 724 to a sum of a maximum of a number of UL-SCH bits associated with each of the y activated component carriers.

In an aspect, the UE 704 may receive information 750 from a base station indicating whether the UE 704 is to use the y activated component carriers or x configured component carriers when processing bits in the window 710. For example, the UE 704 may receive, from the base station 702, information 750 indicating that the UE 704 is to use processing capability for all x configured component carriers (or cells) when processing bits in the window 710 and, therefore, Z may be of a first value. Alternatively, the UE 704 may receive, from the base station, information 750 indicating that the UE 704 is to use processing capability for all y activated component carriers (or cells) when processing bits in the window 710 and, therefore, Z may be of a second value. Because the y activated component carriers are a subset of x configured component carriers, the second value may be less than the first value when y≤x or equal to the first value when y=x.

For carrier aggregation, the UE 704 may determine whether a bit threshold Z is surpassed based on the determined number of bits 712$a$-$c$ scheduled by the first uplink channel grants in the n−3, n−2, and n−1 subframes of the set of subframes 720 and based on the determined number of bits 714 scheduled by the second uplink channel grant in the sTTI 724 within the n subframe. That is, the UE 704 may determine whether Equation 3 is satisfied for carrier aggregation. For a per-component carrier aspect, the UE 704 may determine whether a bit threshold is surpassed based on the determined number of bits 712$a$-$c$ scheduled by the first uplink channel grants in the n−3, n−2, and n−1 subframes for component carrier c and based on the determined number of bits 714 scheduled by the second uplink channel grant in the sTTI 724 within the n subframe for component carrier c. That is, the UE 704 may determine whether Equation 4 is satisfied for a per-component carrier aspect. If the UE 704 determines that Equation 3 or Equation 4 is satisfied (depending upon the aspect), then the UE may process all of the first uplink channel bits 712$a$-$c$ and second uplink channel bits 714 in the window 710. The UE 704 may send the uplink data 760 corresponding to both the first uplink channel bits 712$a$-$c$ and second uplink channel bits 714.

However, the UE 704 may determine that the threshold maximum number of bits Z will be surpassed based on the determined number of bits 712$a$-$c$ scheduled in each first uplink grant of the one or more first uplink channel grants received in the n−3, n−2, and n−1 subframes and based on the determined number of bits scheduled in the second uplink channel grant for the second uplink channel in the sTTI 724. When the UE 704 determines that the threshold maximum number of bits Z will be surpassed, the UE 704 may process for transmission at least one of the bits 712$a$-$c$ scheduled by at least one first uplink channel grant of the one or more first uplink channel grants received in the n−3, n−2, and n−1 subframes, or the UE 704 may process for transmission the bits 714 scheduled by the second uplink channel grant in the sTTI 724.

In one aspect, the UE 704 may determine, based on whether the threshold maximum number of bits Z will be surpassed, whether to process for transmission at least one of the first uplink channel bits 712$a$-$c$ or the second uplink channel bits 714. According to one aspect, the determination of whether to process for transmission the first uplink channel bits 712$a$-$c$ or the second uplink channel bits 714 when the threshold maximum number of bits Z will be surpassed may implemented at the UE 704. For example, the UE 704 may have stored information indicating whether to prioritize the first uplink channel or the second uplink channel. In another example, the UE 704 may receive, from the base station 702, information indicating whether to prioritize the first uplink channel or the second uplink channel. The UE 704 may determine to process for transmission the first uplink channel bits 712$a$-$c$ when the first uplink channel is prioritized over the second uplink channel, or may process for transmission the second uplink channel bits 714 when the second uplink channel is prioritized over the first uplink channel.

In one aspect, the UE 704 may determine to process for transmission the second uplink channel bits 714 (e.g., when the second uplink channel is prioritized over the first uplink channel). In such an aspect, the UE 704 may process for transmission the second uplink channel bits 714. The UE 704 may then transmit the uplink data 760 that includes the second uplink channel bits 714 processed for transmission. So that Equation 3 or Equation 4 will not be violated, the UE 704 may refrain from processing for transmission one or more bits (e.g., TBs, REs scheduled to carry bits, RBs scheduled to carry bits) corresponding to the first uplink channel bits 712$a$-$c$ in the window 710. In one aspect, the UE 704 may refrain from processing all bits (e.g., TBs, REs scheduled to carry bits, RBs scheduled to carry bits) corresponding to the first uplink channel bits 712$a$-$c$ in the window 710. In another aspect, the UE 704 may refrain from processing at least a portion of the first uplink channel bits 714$a$-$c$. For example, the UE 704 may refrain from processing the TB corresponding to the first uplink channel bits 712$b$, the processing of which may overlap with the processing of the second uplink channel bits 714 in the window 710. In such an example, the UE 704 may still process the bits (e.g., TBs, REs scheduled to carry bits, RBs scheduled to carry bits) corresponding to the first uplink channel bits 712a and the first uplink channel bits 712c, e.g., because the processing of the first uplink channel bits 712a and the first uplink channel bits 712c may not overlap with the processing of the second uplink channel bits 714 in the window 710. Accordingly, the UE 704 may send the uplink data 760 including the first uplink channel bits 712a and the first uplink channel bits 712c.

In another aspect, the UE 704 may determine to process the first uplink channel bits 712a-c (e.g., when the first uplink channel is prioritized over the second uplink channel). In such an aspect, the UE 704 may process the first uplink channel bits 712a-c. Accordingly, the UE 704 may send the uplink data 760 that includes the first uplink channel bits 712a-c processed for transmission. So that Equation 3 or Equation 4 will not be violated, the UE 704 may refrain from processing the second uplink channel bits 714. Accordingly, the second uplink channel bits 714 may be absent from the uplink data 760.

While the present disclosure describes aspects with respect to a first uplink channel (e.g., PUSCH) and a second uplink channel (e.g., sPUSCH), aspects described herein may be applicable to any number of standards and technologies. For example, in 5G NR, different numerologies may be considered—e.g., different subcarrier spacing values. Examples of different numerologies that may be implemented in 5G NR may include 15 kilohertz (KHz), 30 KHz, 60 KHz, etc. For varying numerologies, a respective TTI (e.g., slot length) may be of a different duration or length. With the standards of 5G NR, different NR component carriers may be configured to operate according to different TTIs. The UE 704 may be configured to concurrently process respective bits scheduled for different component carriers during different TTIs (e.g., shorter TTIs may require faster uplink scheduling timing than legacy uplink scheduling timing). The configuration of different numerologies and different TTIs may be similar to the aforementioned simultaneous processing of first uplink channel bits 712a-d and second uplink channel bits 714. In particular, the threshold maximum number of bits may be defined over all NR component carriers. For example, processing capability of a UE may be defined over all available component carriers, and may be flexibly shared over subsets of component carriers such that simultaneous processing of bits scheduled for different component carriers with different TTIs is possible without exceeding the threshold maximum number of bits.

Figure 8A:
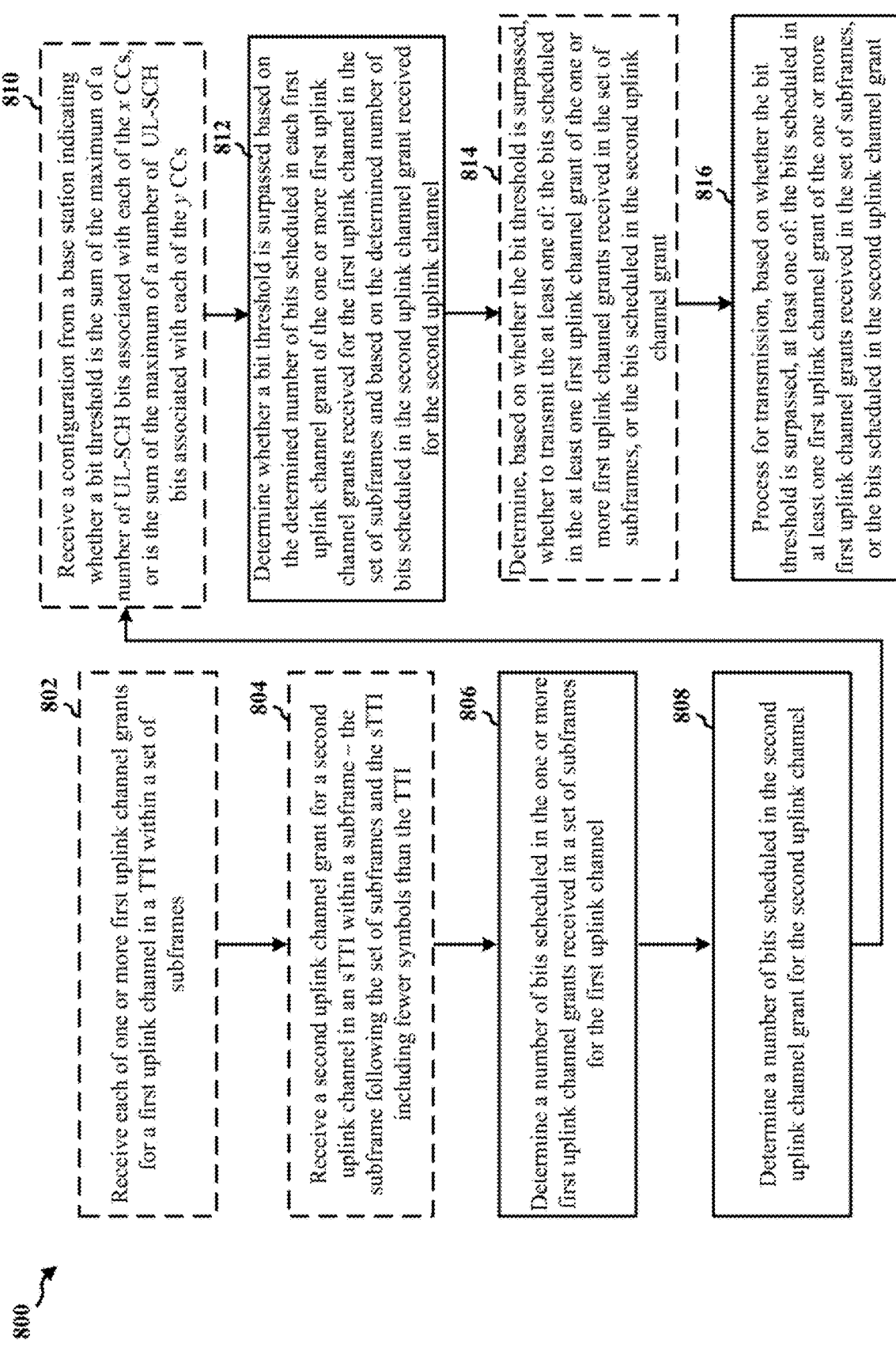
Figure 8B:
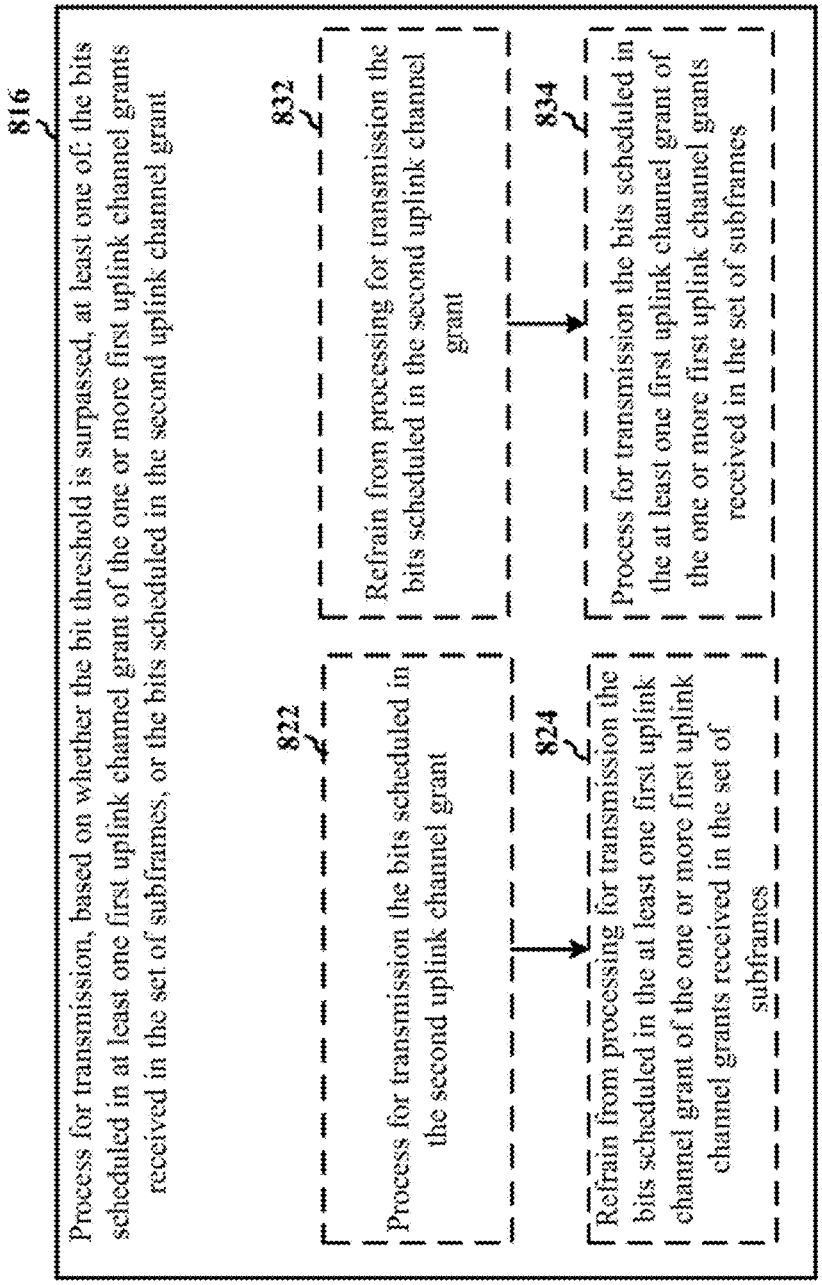

FIGS. 8A-8C illustrate flowcharts of methods 800, 820, 840 of wireless communication. The method may be performed by a UE (e.g., the UE 104, the UE 350, the UE 704, and/or the apparatus 1002/1002'). In various aspects, one or more operations may be omitted, transposed, and/or contemporaneously performed. For example, optional operations may be illustrated with dashed lines.

At operation 802, the UE may receive each of one or more first uplink channel grants for a first uplink channel in a TTI within a set of subframes. In aspects, the first uplink channel may be a PUSCH. In the context of FIG. 7, the UE 704 may one or more first uplink channel grants in a TTI within the n−3, n−2, n−1 subframes.

At operation 804, the UE may receive a second uplink channel grant for a second uplink channel in an sTTI within a subframe. In aspects, the subframe may follow the set of subframes and the sTTI may include fewer symbols than the TTI. In the context of FIG. 7, the UE 704 may receive a second uplink channel grant for a second uplink channel in the sTTI 724 within the n subframe.

At operation 806, the UE may determine a number of bits scheduled in the one or more first uplink channel grants received in the set of subframes for the first uplink channel. For example, the UE may identify scheduling information in the received set of subframes, and the UE may calculate the number of bits granted by each grant in association with the scheduling information. In the context of FIG. 7, the UE 704 may determine the number of bits 712a-c scheduled in the one or more first uplink channel grants in each of the n−3, n−2, n−1 subframes of the set of subframes 720.

At operation 808, the UE may determine a number of bits scheduled in the second uplink channel grant. For example, the UE may identify scheduling information received in the sTTI within the subframe, and the UE may calculate the number of bits granted in association with the scheduling information. In the context of FIG. 7, the UE 704 may determine a number of bits 714 scheduled in the second uplink channel grant for the second uplink channel in the sTTI 724 within the n subframe.

At operation 810, the UE may receive a configuration from a base station indicating whether a bit threshold is the sum of the maximum number of UL-SCH bits associated with each of x configured component carriers or y activated component carriers, y being less than or equal to x. The bit threshold (e.g., Z) may be the maximum number of UL-SCH bits (e.g., UL-SCH TB bits, UL-SCH REs that are to carry bits, UL-SCH RBs that are to carry bits, or any combination thereof) that the UE is capable of transmitting within a TTI if only one TTI were scheduled. In other words, the UE may be configured by the base station with a bit threshold that is the maximum number of UL-SCH bits either summed over all x configured component carriers or over all y activated component carriers that the UE is capable of transmitting within a TTI if only one TTI were scheduled. In the context of FIG. 7, the UE 704 may receive, from the base station 702, the information 750 indicating whether the UE 704 is to use the y activated component carriers or x configured component carriers when processing bits in the window 710.

At operation 812, the UE may determine whether the bit threshold is surpassed based on the determined number of bits scheduled in each first uplink channel grant of the one or more first uplink channel grants received for the first uplink channel in the set of subframes and based on the determined number of bits scheduled in the second uplink channel grant received on the second uplink channel. For example, the UE may add the determined number of bits scheduled in each of the one or more first uplink channel grants and the determined number of bits scheduled in the second uplink channel grant, and the UE may determine whether the sum is greater than the bit threshold. In the context of FIG. 7, the UE 704 may determine whether a bit threshold (e.g., Z or $Z_c$) is surpassed based on the determined number of bits 712a-c scheduled in one or more first uplink channel grants in the n−3, n−2, and n−1 subframes and based on the determined number of bits 714 scheduled in a second uplink channel grant.

At operation 814, the UE may determine, based on whether the bit threshold is surpassed, whether to transmit at least one of: the bits scheduled in the at least one first uplink channel grant of the one or more first uplink channel grants received in the set of subframes, or the bits scheduled in the second uplink channel grant. If the bit threshold is unsurpassed, the UE may determine to transmit both the bits scheduled in the one or more first uplink channel grants and the bits scheduled in the second uplink channel grant. If the bit threshold is surpassed, the UE may identify a first priority of the first uplink channel and a second priority of the second uplink channel, and the UE may determine whether the first priority is higher than the second priority or the second priority is higher than the first priority. The UE may determine that bits of the uplink channel having the higher priority are to be transmitted and the bits of the uplink channel having the lower priority are not to be transmitted. In the context of FIG. 7, the UE 704 may determine, based on whether the bit threshold is surpassed, whether to process at least one of: the bits 712a-c scheduled in one or more first uplink channel grants in each of the n−3, n−2, n−1 subframes, or the bits 714 scheduled in the second uplink channel grant in the sTTI 724.

At operation 816, the UE may process for transmission, based on whether the bit threshold is surpassed, at least one of: the bits scheduled in the at least one first uplink channel grant of the one or more first uplink channel grants received in the set of subframes, or the bits scheduled in the second uplink channel grant. If the bit threshold is unsurpassed, the UE may process for transmission both the bits scheduled in the one or more first uplink channel grants and the bits scheduled in the second uplink channel grant. If the bit threshold is surpassed, the UE may process for transmission the bits scheduled in the at least one first uplink channel grant of the one or more first uplink channel grants received in the set of subframes, or the bits scheduled in the second uplink channel grant, for example, as determined from which uplink channel has the higher priority. In an aspect, the UE may process for transmission the bits by mapping, modulating, and/or encoding the bits, and sending at least a portion of those bits (e.g., over the air to the base station). In the context of FIG. 7, the UE 704 may process for transmission, based on whether the bit threshold is surpassed, at least one of: the bits 712a-c scheduled in one or more first uplink channel grants in each of the n−3, n−2, and n−1 subframes and/or the bits 714 scheduled in an second uplink channel grant in the sTTI 724.

FIG. 8B illustrates various aspects of operation 816, at which the UE may process for transmission, based on whether the bit threshold is surpassed, at least one of: the bits scheduled in at least one first uplink channel grant of the one or more first uplink channel grants received in the set of subframes, or the bits scheduled in the second uplink channel grant.

In one aspect, of operation 816, the UE may perform one or more operations 822, 824, for example, when the second uplink channel is determined to have a higher priority than the first uplink channel and the bit threshold is determined to be surpassed. At operation 822, the UE may process for transmission the bits scheduled in the second uplink channel grant. For example, the UE may map, modulate, and/or encode the bits scheduled in the second uplink channel grant, and the UE may send at least a portion of those bits (e.g., over the air to the base station). In the context of FIG. 7, the UE 704 may process the bits 714 scheduled in the second uplink channel grant in the sTTI 724.

At operation 824, the UE may refrain from processing for transmission the bits scheduled in the one or more first uplink channel grants in one or more subframes of the set of subframes. For example, the UE may identify one or more grants that may cause bits (e.g., TBs, REs scheduled to carry bits, RBs scheduled to carry bits) scheduled for the first uplink channel to overlap with the processing of the bits granted for the second uplink channel, and the UE may discard or delete the one or more identified grants so that no bits (e.g., TBs, REs scheduled to carry bits, RBs scheduled to carry bits) are processed for those grants. In the context of FIG. 7, the UE 704 may refrain from processing for transmission one or more bits (e.g., TBs, REs scheduled to carry bits, RBs scheduled to carry bits) corresponding to the bits 712a-c scheduled in one or more first uplink channel grants in one or more of the n−3, n−2, n−1 subframes. For example, the UE 704 may discard the bits 712b that would overlap with the bits 714 in the window 710.

In another aspect, of operation 816, the UE may perform one or more operations 832, 834, for example, when the first uplink channel is determined to have a higher priority than the second uplink channel and the bit threshold is determined to be surpassed. At operation 832, the UE may refrain from processing for transmission the bits scheduled in the second uplink channel grant. For example, the UE may identify the second uplink channel grant that may cause bits (e.g., TBs, REs scheduled to carry bits, RBs scheduled to carry bits) scheduled for the second uplink channel to overlap with the processing of the bits granted for the first uplink channel, and the UE may discard or delete the one or more identified grants for the second uplink channel so that no bits (e.g., TBs, REs scheduled to carry bits, RBs scheduled to carry bits) are processed for those grants. In the context of FIG. 7, the UE 704 may refrain from processing the bits 714 scheduled in the second uplink channel grant in the sTTI 724.

At operation 834, the UE may process for transmission the bits scheduled in the one or more first uplink channel grants in one or more subframes of the set of subframes. For example, the UE may map, modulate, and/or encode the bits scheduled in the one or more first uplink channel grants, and the UE may send at least a portion of those bits (e.g., over the air to the base station). In the context of FIG. 7, the UE 704 may process for transmission one or more bits (e.g., TBs, REs scheduled to carry bits, RBs scheduled to carry bits, etc.) corresponding to the bits 712a-c scheduled in one or more first uplink channel grants in one or more of the n−3, n−2, n−1 subframes.

FIG. 8C illustrates various aspects of operation 812, at which the UE may determine whether a bit threshold is surpassed based on the determined number of bits scheduled in each first uplink channel grant of the one or more first uplink channel grants received for the first uplink channel in the set of subframes and based on the determined number of bits scheduled in the second uplink channel grant received for the second uplink channel.

For the aspect illustrated at operation 842, the UE may compare, for each component carrier of the UE, a maximum of the determined number of bits scheduled in each first uplink channel grant of the one or more first uplink channel grants received on the first uplink channel in the set of subframes for the component carrier and the bits scheduled in the second uplink channel grant for the second uplink channel to a maximum number of UL-SCH bits associated with the component carrier. For example, for a component carrier c, the UE may expect:

$$\max(X_{n-1,c}, X_{n-2,c}, \ldots, X_{W_{UL},c}) + Y_{j,n,c} \leq Z_c \forall j, W_{UL} \geq 1. \quad \text{Equation 4}$$

Where $X_{i,c}$ may be the each of the first uplink channel UL-SCH bits scheduled in subframe i on component carrier c, $Y_{j,n,c}$ may be the number of UL-SCH bits scheduled within an sTTI j in subframe n on component carrier c. $Z_c$ may be maximum the number of UL-SCH bits that the UE is capable of transmitting within a UL-SCH TTI if only a TTI (e.g., a 1 ms subframe) were scheduled on component carrier C. $W_{UL}$ may be the window size (e.g., as defined by UE capability, uplink scheduling timing, etc.). In the context of FIG. 7, the UE 704 may compare, for each component carrier of the UE 704, a maximum of the determined number of bits 712a-c scheduled in one or more first uplink channel grants for the first uplink channel for a component carrier c in each subframe of the n−3, n−2, and n−1 subframes and the bits 714 scheduled in a second uplink channel grant for a component carrier c to a maximum number of bits associated with the component carrier c.

According to another aspect, illustrated at operation 844, the UE may compare a maximum number of the determined number of bits scheduled in each first uplink channel grant of the one or more first uplink channel grants received on the first uplink channel in the set of subframes and the bits scheduled in the second uplink channel grant for the second uplink channel to a defined maximum number of UL-SCH bits. For example, the UE may expect:

$$\max(X_{n-1}, X_{n-2}, \ldots, X_{W_{UL}}) + Y_{j,n} \leq Z, \forall j, W_{UL} \geq 1. \quad \text{Equation 3}$$

Here, $X_i$ may a number of UL-SCH bits scheduled by uplink DCI in subframe i, $Y_{j,n}$ may be the number of UL-SCH bits scheduled by uplink sDCI in an sTTI j in subframe n. Z may be the bit threshold for carrier aggregation, e.g., the maximum number of UL-SCH bits that the UE is capable of transmitting within a TTI if only one TTI were scheduled. $W_{UL}$ may be the window size (e.g., as defined by UE capability, uplink timing scheduling, etc.). In the context of FIG. 7, the UE 704 may compare a maximum of the determined number of bits 712a-c scheduled in one or more first uplink channel grants in each subframe of the n−3, n−2, and n−1 subframes and the bits 714 scheduled in a second uplink channel grant to a defined maximum number of bits.

According to another aspect, illustrated at operation 846, the UE may compare a maximum of the determined number of bits scheduled in each first uplink channel grant of the one or more first uplink channel grants received on the first uplink channel in the set of subframes and the bits scheduled in the second uplink channel grant for the second uplink channel to one of: a sum of a maximum of a number of UL-SCH bits associated with each of the x configured component carriers; or a sum of a maximum of a number of UL-SCH bits associated with each of the y activated component carriers. For example, the UE may expect:

$$\max(X_{n-1}, X_{n-2}, \ldots, X_{W_{UL}}) + Y_{j,n} \leq Z, \forall j, W_{UL} \geq 1. \quad \text{Equation 4}$$

Here, $X_i$ may a number of UL-SCH bits scheduled by uplink DCI in subframe may be the number of UL-SCH bits scheduled by uplink sDCI in an sTTI j in subframe n. Z may be the bit threshold, e.g., the maximum number of UL-SCH bits summed over either all x configured component carriers or all y activated component carriers that the UE is capable of transmitting within a TTI if only one TTI were scheduled. $W_{UL}$ may be the window size (e.g., as defined by UE capability, uplink scheduling timing, etc.). The UE may determine to use either the x configured component carriers or they activated component carriers based on information stored in the UE or based on information received from the base station (see, e.g., operation 810). In the context of FIG. 7, the UE 704 may compare a maximum of the determined number of bits 712a-c scheduled in one or more first uplink channel grants in each of the n−3, n−2, n−1 subframes and the bits 714 scheduled in a second uplink channel grant to one of: a sum of a maximum of a number of UL-SCH bits associated with each of x configured component carriers; or a sum of a maximum of a number of UL-SCH bits associated with each of y activated component carriers.

Figure 9:
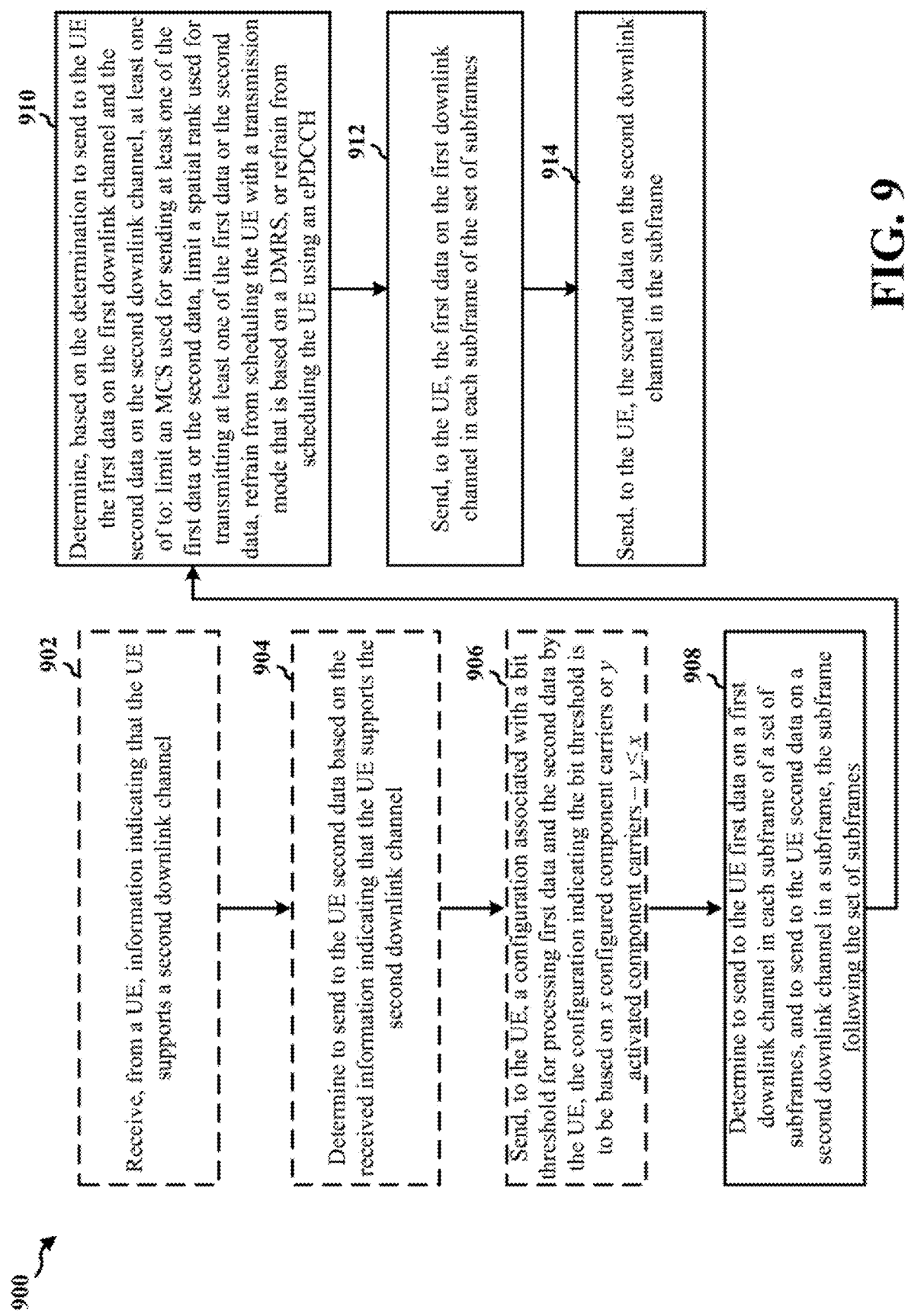
FIG. 9 is a flowchart of a method of wireless communication.

FIG. 9 illustrates a flowcharts of a method 900 of wireless communication. The method may be performed by a base station (e.g., the base station 102, the base station 310, the base station 502, the base station 702, and/or the apparatus 1202/1202'). In various aspects, one or more operations may be omitted, transposed, and/or contemporaneously performed. For example, optional operations may be illustrated with dashed lines.

At operation 902, the base station may receive, from a UE, information indicating that the UE supports a second downlink channel. In aspects, the second downlink channel may be an sPDSCH having an sTTI. In aspects, the information indicating that the UE supports the second downlink channel may be a UE category. In some aspects, the base station may receive, information indicating a UE capability. The UE capability information may indicate one or more of an MCS that may be used for communication with the UE, a maximum number of layers that may be used for communication with the UE (e.g., MIMO layer(s), spatial rank, etc.), or any other information. In some aspects, the UE capability information may indicate, to the base station, a size or duration of a window at the UE for processing downlink bits to be received by the UE and/or a size or duration of a window at the UE for processing uplink bits to be transmitted by the UE to the base station. In the context of FIG. 5, the base station 502 may receive, from the UE 504, information indicating that the UE 504 supports the second downlink channel having the sTTI 524.

At operation 904, the base station may determine to send to the UE second data based on the received information indicating that the UE supports the second downlink channel. For example, the base station may determine that the UE may receive data on the second downlink channel, and the base station may output data (e.g., ULL data, MiCr data, delay-sensitive data, etc.) to be carried on the second downlink channel. In the context of FIG. 5, the base station 502 may determine to send, to the UE 504, second data in the sTTI 524 on the second downlink channel based on the received information indicating that the UE 504 supports the second downlink channel.

At operation 906, the base station may send to the UE a configuration associated with a bit threshold for processing first data carried on a first downlink channel and second data carried on the second downlink channel. The configuration may indicate whether the bit threshold (e.g., Z) is to be based on x configured component carriers or y activated component carriers, where y≤x. In the context of FIG. 5, the base station 502 may send, to the UE 504, the information 550 indicating whether the UE 504 is to use a bit threshold that is based on x configured component carriers or y activated component carriers.

At operation 908, the base station may determine to send to the UE first data on the first downlink channel in each subframe of a set of subframes, and to send to the UE the second data on the second downlink channel in a subframe that follows the set of subframes. For example, the base station may identify first data to be carried on a PDSCH and second data to be carried on an sPDSCH, and the base station may output the first data and the second data for processing and transmission to the UE. In the context of FIG. 5, the base station 502 may determine to send to the UE 504 first data on the first downlink channel in each of the n−3, n−2, n−1 subframes, and to send to the UE 504 the second data on the second downlink channel in the sTTI 524 within the n subframe.

At operation 910, the base station may determine, based on the determination to send to the UE the first data on the first downlink channel and the second data on the second downlink channel, at least one of to: limit an MCS used for sending at least one of the first data or the second data, limit a spatial rank used for transmitting at least one of the first data or the second data, refrain from scheduling the UE with a transmission mode that is based on a DMRS, or refrain from scheduling the UE using an ePDCCH. For example, the base station select an MCS for communication with the UE, and may configure communication with the UE to use the selected MCS. In another example, the base station may select a spatial rank to be used with the UE, and may configure communication with the UE to use the selected spatial rank. In another example, the base station may select a transmission mode for communication with the UE that is not based on a DMRS, and the base station may configure communication with the UE to use the selected transmission mode. In another example, the base station may schedule the UE on a channel other than an ePDCCH, and the base station may send scheduling information to the UE on the channel that is other than the ePDCCH. In some aspects, the determination, based on the determination to send to the UE the first data on the first downlink channel and the second data on the second downlink channel, at least one of to limit an MCS used for sending at least one of the first data or the second data, to limit a spatial rank used for transmitting at least one of the first data or the second data, to refrain from scheduling the UE with a transmission mode that is based on a DMRS, or to refrain from scheduling the UE using an ePDCCH may be based on a UE capability of the UE, which may be received by the base station from the UE. In the context of FIG. 5, the base station 502 may determine, based on the determination to send to the UE 504 the first data on the first downlink channel and the second data on the second downlink channel, at least one of to: limit an MCS used for sending at least one of the first data or the second data, limit a spatial rank used for transmitting at least one of the first data or the second data, refrain from scheduling the UE 504 with a transmission mode that is based on a DMRS, or refrain from scheduling the UE 504 using an ePDCCH.

At operation 912, the base station may send, to the UE, the first data on the first downlink channel in each subframe of the set of subframes. In the context of FIG. 5, the base station 502 may send, to the UE 504, the first data on the first downlink channel in each of the n−3, n−2, n−1 subframes of the set of subframes 520.

At operation 914, the base station may send to the UE, the second data on the second downlink channel in an sTTI within a subframe. In the context of FIG. 5, the base station 502 may send, to the UE 504, the second data on the second downlink channel in the sTTI 524 within the n subframe.

Figure 10:
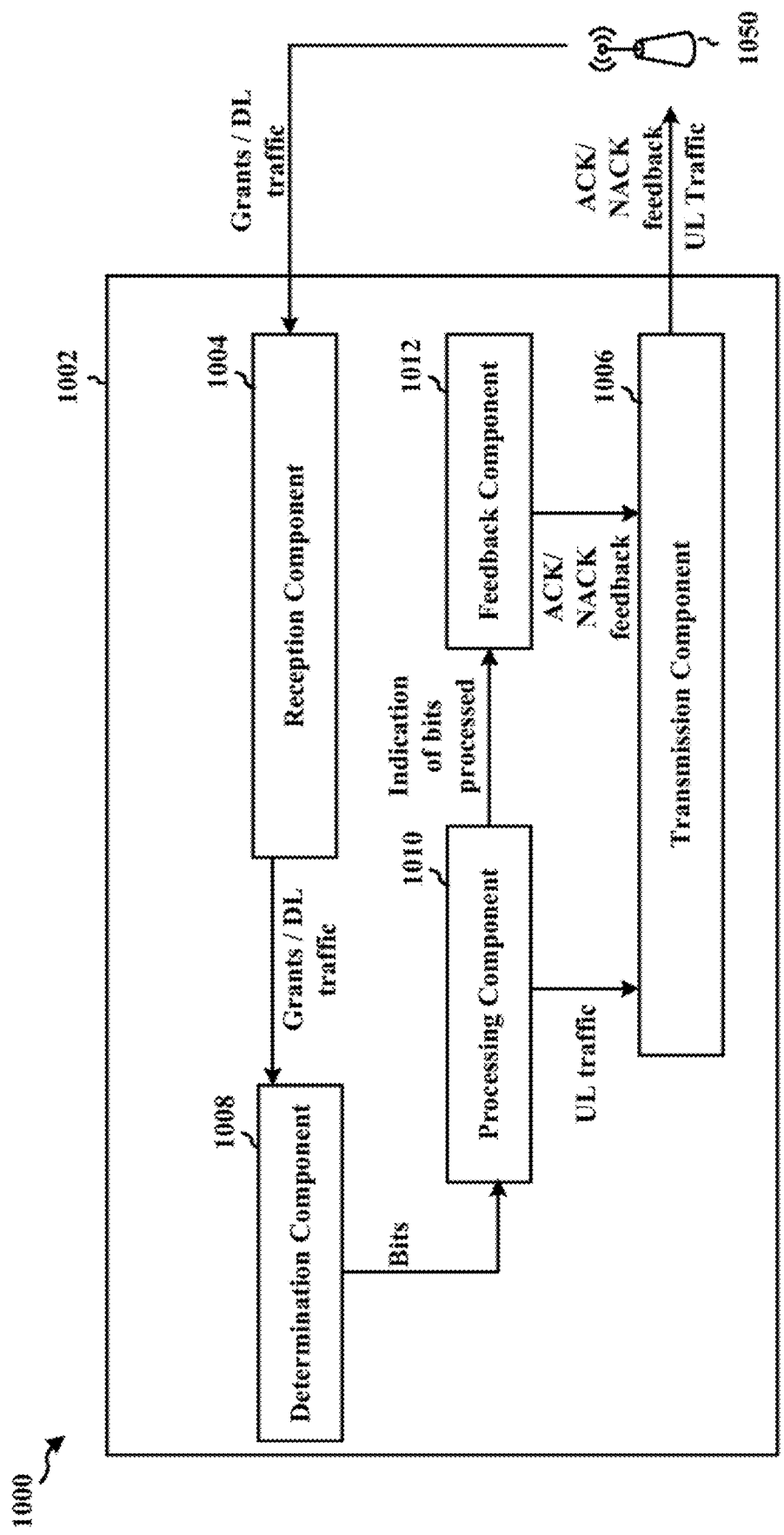
FIG. 10 is a conceptual data flow diagram illustrating the data flow between different means/components in an exemplary apparatus.

FIG. 10 is a conceptual data flow diagram 1000 illustrating the data flow between different means/components in an exemplary apparatus 1002. The apparatus may be a UE. The apparatus 1002 depicts exemplary connections and/or data between different modules/means/components. One of ordinary skill will appreciate that such connections and/or data flow are to be regarded in as illustrative and, therefore, different and/or additional connections and/or data flow may be present in different aspects.

The apparatus 1002 may include a reception component 1004. The reception component 1004 may receive signals from a base station (e.g., the base station 1050). The apparatus 1002 may further include a transmission component 1006. The transmission component 1006 may be configured to transmit signals to a base station (e.g., the base station 1050).

In an aspect, the transmission component 1006 may be configured to send, to the base station 1050, information indicating that the apparatus 1002 supports second downlink channel having an sTTI. In an aspect, the information indicating that the apparatus 1002 supports the second downlink channel having the sTTI includes a UE category. In another aspect, the transmission component 1006 may be configured to send, to the base station 1050, uplink data in an sTTI.

In one aspect, the reception component 1004 may receive bits on a first downlink channel (e.g., PDSCH) within a TTI in each subframe of a set of subframes. Further, the reception component 1004 may receive bits on a second downlink channel (e.g., sPDSCH) in an sTTI within a subframe, the subframe may follow the set of subframes and the sTTI may include fewer symbols than the TTI.

In an aspect, the determination component 1008 may determine a number of bits received on the first downlink channel in each subframe of the set of subframes. The determination component 1008 may determine a number of bits received on the second downlink channel. The determination component 1008 may determine whether a bit threshold is surpassed based on the determined number of bits received on the first downlink channel in each subframe of the set of subframes and based on the determined number of bits received on the second downlink channel. For example, for a per-component carrier aspect, the determination component 1008 may compare, for each component carrier c of the apparatus 1002, a maximum of the determined number of bits received on the first downlink channel in each subframe of the set of subframes and the bits received on the second downlink channel to a maximum number of downlink shared channel DL-SCH bits associated with the component carrier c. For example, for a carrier aggregation aspect, the determination component 1008 may compare a maximum of the determined number of bits received on the first downlink channel in each subframe of the set of subframes and the bits received on the second downlink channel to a defined maximum number of DL-SCH bits.

In another aspect, apparatus 1002 may have x configured component carriers and y active component carriers, where y≤x. The determination component 1008 may determine whether the bit threshold is surpassed by comparing a maximum of the determined number of bits received on the first downlink channel in each subframe of the set of subframes and the bits received on the second downlink channel to one of: a sum of a maximum of a number of DL-SCH bits associated with each of the x component carriers, or a sum of a maximum of a number of DL-SCH bits associated with each of the y component carriers. In one aspect, the reception component 1004 may receive a configuration from the base station 1050 indicating whether the bit threshold is the sum of the maximum of a number of DL-SCH bits associated with each of the x component carriers, or is the sum of the maximum of a number of DL-SCH bits associated with each of the y component carriers.

In an aspect, the determination component 1008 may determine, based on whether the bit threshold is surpassed, whether to process at least one of the bits received on the first downlink channel in each subframe of the set of subframes, or the bits received on the second downlink channel. For example, the determination component 1008 may indicate, to the processing component 1010, that both the bits received on the first downlink channel in each subframe of the set of subframes and the bits received on the second downlink channel are to be processed when the bit threshold is not surpassed. If the bit threshold is surpassed, the determination component 1008 may determine whether the first downlink channel has a higher priority than the second downlink channel, or whether the second downlink channel has a higher priority than the first downlink channel. The determination component may indicate, to the processing component 1010, that the data of the downlink channel having the higher priority is to be processed and the data of the downlink channel having the lower priority it to be unprocessed.

Based on the indication of data to be processed from the determination component 1008, the processing component may process at least one of the bits received on the first downlink channel in each subframe of the set of subframes, or the bits received on the second downlink channel. For example, if the determination component 1008 indicates that the bit threshold is unsurpassed, then the processing component 1010 may process the bits received on the first downlink channel in each subframe of the set of subframes and the bits received on the second downlink channel. If the bit threshold is surpassed and the second downlink channel has a higher priority than the first downlink channel, then processing component 1010 may refrain from processing the bits received on the first downlink channel in each subframe of the set of subframes, and process the bits received on the second downlink channel. If the bit threshold is surpassed and the first downlink channel has a higher priority than the second downlink channel, then processing component 1010 may process the bits received on the first downlink channel in each subframe of the set of subframes, and refrain from processing the bits received on the second downlink channel.

The feedback component 1012 may provide ACK/NACK feedback for processed and unprocessed bits. For example, the feedback component 1012 may generate ACK feedback for processed bits. Therefore, when the processing component 1010 processes bits of the first downlink channel, then the feedback component 1012 may send ACK feedback associated with the bits received on the first downlink channel to the base station 1050. Similarly, when the processing component 1010 processes bits of the second downlink channel, then the feedback component 1012 may send ACK feedback associated with bits received on the second downlink channel to the base station 1050. The feedback component 1012 may generate NACK feedback for unprocessed bits. Therefore, when the processing component 1010 refrains from processing bits of the first downlink channel, then the feedback component 1012 may send NACK feedback associated with the bits received on the first downlink channel to the base station 1050. Similarly, when the processing component 1010 refrains from processing bits of the second downlink channel, then the feedback component 1012 may send NACK feedback associated with bits received on the second downlink channel to the base station 1050.

In another aspect, the reception component 1004 may receive each of one or more first uplink channel grants for a first uplink channel in a TTI within the set of subframes, and receive a second uplink channel grant for a second uplink channel in an sTTI within a subframe that follows the set of subframes. The sTTI including fewer symbols than the TTI. In various aspects, the first uplink channel is a PUSCH and each of the one or more first uplink channel grants is for an uplink transmission on the PUSCH, and the second uplink channel is a sPUSCH and the second uplink channel grant is for an uplink transmission on the sPUSCH in an sTTI.

In an aspect, the determination component 1008 may determine a number of bits scheduled in the one or more first uplink channel grants received in the set of subframes for the first uplink channel, and determine a number of bits scheduled in the second uplink channel grant for the second uplink channel. The determination component 1008 may determine whether a bit threshold is surpassed based on the determined number of bits scheduled in each first uplink channel grant of the one or more first uplink channel grants received for the first uplink channel in the set of subframes and based on the determined number of bits scheduled in the second uplink channel grant received for the second uplink channel. For example, for a per-component carrier aspect, the determination component 1008 may compare, for each component carrier c of the UE, a maximum of the determined number of bits scheduled in each first uplink channel grant of the one or more first uplink channel grants received for the first uplink channel in the set of subframes for the component carrier c and the bits scheduled in the second uplink channel grant for the second uplink channel for the component carrier c to a maximum number of UL-SCH bits associated with the component carrier c. In an aspect, the maximum number of UL-SCH bits associated with the component carrier c is based on a maximum number of UL-SCH bits for the first uplink channel. For example, for a carrier aggregation aspect, the determination component 1008 may compare a maximum of the determined number of bits scheduled in each first uplink channel grant of the one or more first uplink channel grants received for the first uplink channel in the set of subframes and the bits scheduled in the second uplink channel grant for the second uplink channel to a defined maximum number of UL-SCH bits.

In another aspect, apparatus 1002 may have x configured component carriers and y active component carriers, where y≤x. The determination component 1008 may determine whether the bit threshold is surpassed by comparing a maximum of the determined number of bits scheduled in each first uplink channel grant of the one or more first uplink channel grants received on the first uplink channel in the set of subframes and the bits scheduled in the second uplink channel grant for the second uplink channel to one of: a sum of a maximum of a number of UL-SCH bits associated with each of the x component carriers, or a sum of a maximum of a number of UL-SCH bits associated with each of the y component carriers. In one aspect, the reception component 1004 may receive a configuration from the base station 1050 indicating whether the bit threshold is the sum of the maximum of a number of UL-SCH bits associated with each of the x component carriers, or is the sum of the maximum of a number of UL-SCH bits associated with each of the y component carriers.

In an aspect, the determination component 1008 may determine, based on whether the bit threshold is surpassed, whether to transmit the at least one of: the bits scheduled in the at least one first uplink channel grant of the one or more first uplink channel grants received in the set of subframes, or the bits scheduled in the second uplink channel grant. For example, the determination component 1008 may indicate, to the processing component 1010, that both the bits scheduled in the at least one first uplink channel grant of the one or more first uplink channel grants received in the set of subframes and the bits scheduled in the second uplink channel grant when the bit threshold is not surpassed. If the bit threshold is surpassed, the determination component 1008 may determine whether the first uplink channel has a higher priority than the second uplink channel, or whether the second uplink channel has a higher priority than the first uplink channel. The determination component 1008 may indicate, to the processing component 1010, that the data of the uplink channel having the higher priority is to be processed for transmission and the data of the uplink channel having the lower priority it to be unprocessed.

Based on the indication of data to be processed from the determination component 1008, the processing component may process at least one of the bits scheduled in the at least one first uplink channel grant of the one or more first uplink channel grants received in the set of subframes, or the bits scheduled in the second uplink channel grant. For example, if the determination component 1008 indicates that the bit threshold is unsurpassed, then the processing component 1010 may process the bits scheduled in the at least one first uplink channel grant of the one or more first uplink channel grants received in the set of subframes and the bits scheduled in the second uplink channel grant. If the bit threshold is surpassed and the first uplink channel has a higher priority than the second uplink channel, then processing component 1010 may process for transmission the bits scheduled in the at least one first uplink channel grant of the one or more first uplink channel grants received in the set of subframes, and refrain from processing for transmission the bits scheduled in the second uplink channel grant. The transmission component 1006 may then transmit the bits scheduled in the one or more first uplink channel grants. the bit threshold is surpassed and the second uplink channel has a higher priority than the first uplink channel, then processing component 1010 may refrain from processing for transmission the bits scheduled in the at least one first uplink channel grant of the one or more first uplink channel grants received in the set of subframes, and process for transmission the bits scheduled in the second uplink channel grant. The transmission component 1006 may then transmit the bits scheduled in the second uplink channel grant.

The apparatus may include additional components that perform each of the blocks of the algorithm in the aforementioned flowcharts of FIGS. 6A-6C, 8A-8C. As such, each block in the aforementioned flowcharts of FIGS. 6A-6C, 8A-8C may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 11:
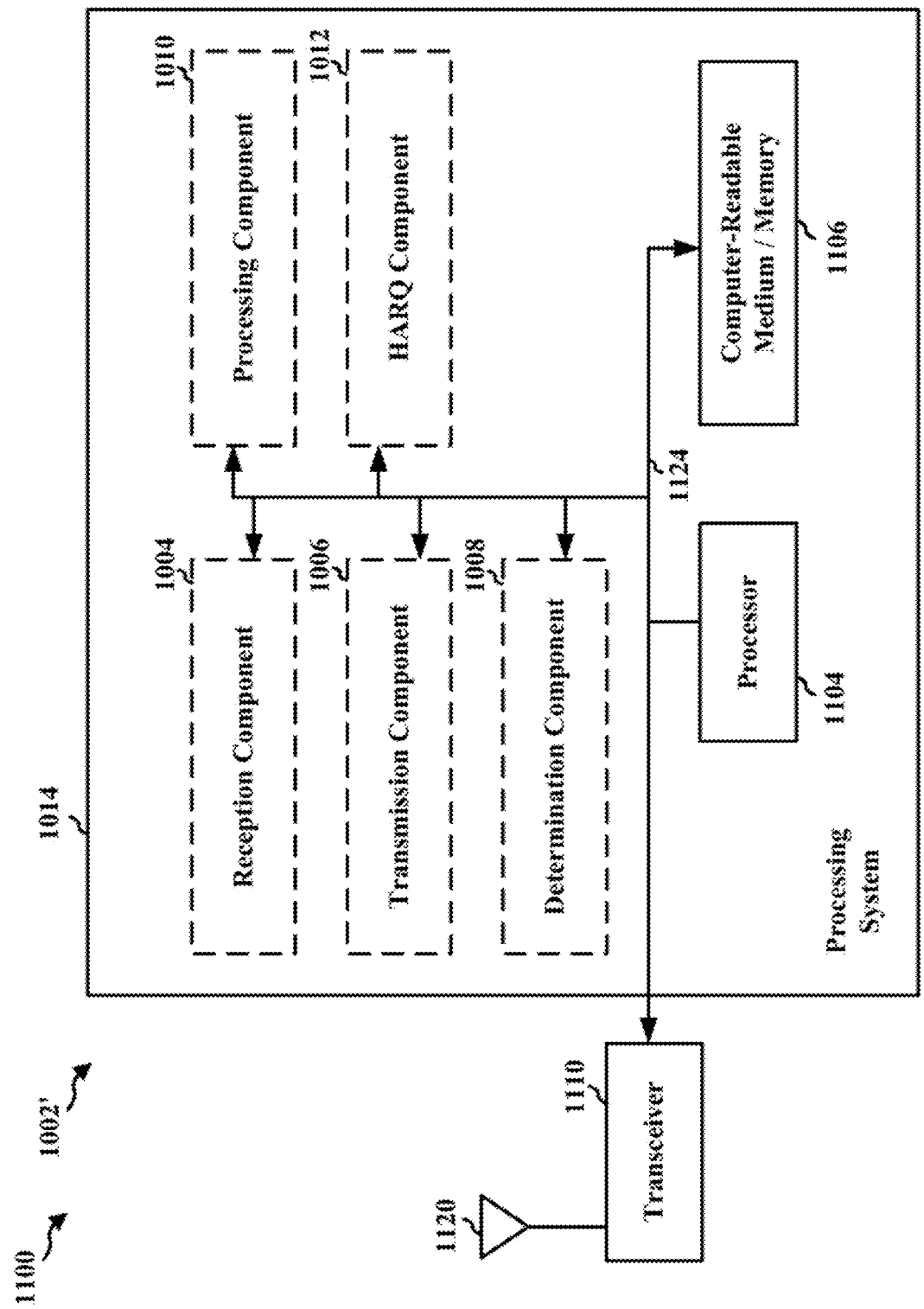
FIG. 11 is a diagram illustrating an example of a hardware implementation for an apparatus employing a processing system.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, represented by the processor 1104, the components 1004, 1006, 1008, 1010, 1012 and the computer-readable medium/memory 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the reception component 1004. In addition, the transceiver 1110 receives information from the processing system 1114, specifically the transmission component 1006, and based on the received information, generates a signal to be applied to the one or more antennas 1120. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system 1114 further includes at least one of the components 1004, 1006, 1008, 1010, 1012. The components may be software components running in the processor 1104, resident/stored in the computer readable medium/memory 1106, one or more hardware components coupled to the processor 1104, or some combination thereof. The processing system 1114 may be a component of the UE 350 and may include the memory 360 and/or at least one of the TX processor 368, the RX processor 356, and the controller/processor 359.

In one configuration, the apparatus 1002/1002' for wireless communication includes means for determining a number of bits scheduled in one or more first uplink channel grants received in a set of subframes for a first uplink channel. The apparatus 1002/1002' may include means for determining a number of bits scheduled in a second uplink channel grant for a second uplink channel. The apparatus 1002/1002' may include means for determining whether a bit threshold is surpassed based on the determined number of bits scheduled in each first uplink channel grant of the one or more first uplink channel grants received for the first uplink channel in the set of subframes and based on the determined number of bits scheduled in the second uplink channel grant received for the second uplink channel. The apparatus 1002/1002' may include means for processing for transmission, based on whether the bit threshold is surpassed, at least one of: the bits scheduled in at least one first uplink channel grant of the one or more first uplink channel grants received in the set of subframes, or the bits scheduled in the second uplink channel grant. In an aspect, the apparatus 1002/1002' may include means for receiving each of the one or more first uplink channel grants for the first uplink channel in a TTI within the set of subframes. The apparatus 1002/1002' may include means for receiving the second uplink channel grant for the second uplink channel in an sTTI within a subframe, the subframe following the set of subframes, the sTTI including fewer symbols than the TTI. In an aspect, the apparatus 1002/1002' may include means for determining, based on whether the bit threshold is surpassed, whether to transmit the at least one of: the bits scheduled in the at least one first uplink channel grant of the one or more first uplink channel grants received in the set of subframes, or the bits scheduled in the second uplink channel grant. In an aspect, the first uplink channel is a PUSCH; each of the one or more first uplink channel grants is for an uplink transmission on the PUSCH; the second uplink channel is a sPUSCH; and the second uplink channel grant is for an uplink transmission on the sPUSCH in an sTTI. In an aspect, the means for processing for transmission, based on whether the bit threshold is surpassed, the at least one of: the bits scheduled in at least one first uplink channel grant of the one or more first uplink channel grants received in the set of subframes, or the bits scheduled in the second uplink channel grant is configured to: process for transmission the bits scheduled in the second uplink channel grant; and refrain from processing for transmission the bits scheduled in the at least one first uplink channel grant of the one or more first uplink channel grants received in the set of subframes. In an aspect, the means for processing for transmission, based on whether the bit threshold is surpassed, the at least one of: the bits scheduled in at least one first uplink channel grant of the one or more first uplink channel grants received in the set of subframes, or the bits scheduled in the second uplink channel grant is configured to: refrain from processing for transmission the bits scheduled in the second uplink channel grant; and process for transmission the bits scheduled in the at least one first uplink channel grant of the one or more first uplink channel grants received in the set of subframes. In an aspect, the means for determining whether the bit threshold is surpassed is configured to compare, for each component carrier of the UE, a maximum of the determined number of bits scheduled in each first uplink channel grant of the one or more first uplink channel grants received for the first uplink channel in the set of subframes for the component carrier and the bits scheduled in the second uplink channel grant for the second uplink channel for the component carrier to a maximum number of UL-SCH bits associated with the component carrier. In an aspect, the maximum number of UL-SCH bits associated with the component carrier is based on a maximum number of UL-SCH bits for the first uplink channel. In an aspect, the means for determining whether the bit threshold is surpassed is configured to compare a maximum of the determined number of bits scheduled in each first uplink channel grant of the one or more first uplink channel grants received for the first uplink channel in the set of subframes and the bits scheduled in the second uplink channel grant for the second uplink channel to a defined maximum number of UL-SCH bits. In an aspect, the apparatus 1002/1002' has x configured component carriers and y active component carriers, where y≤x, and the means for determining whether the bit threshold is surpassed is configured to compare a maximum of the determined number of bits scheduled in each first uplink channel grant of the one or more first uplink channel grants received on the first uplink channel in the set of subframes and the bits scheduled in the second uplink channel grant for the second uplink channel to one of: a sum of a maximum of a number of UL-SCH bits associated with each of the x component carriers; or a sum of a maximum of a number of UL-SCH bits associated with each of the y component carriers. In an aspect, the apparatus 1002/1002' includes means for receiving a configuration from a base station indicating whether the bit threshold is the sum of the maximum of a number of UL-SCH bits associated with each of the x component carriers, or is the sum of the maximum of a number of UL-SCH bits associated with each of the y component carriers. In an aspect, the at least one of the bits scheduled in the at least one first uplink channel grant of the one or more first uplink channel grants, or the bits scheduled in the second uplink channel grant are processed for transmission based on whether the bit threshold is surpassed within a processing window comprising a number of subframes in the set of subframes. In an aspect, a length of the processing window is based on at least one of a UE capability of the UE, uplink scheduling information, or a duration of an sTTI associated with the second uplink channel. In an aspect, the apparatus 1002/1002' may include means for sending, to a base station, information indicative the length of the processing window.

In another aspect, the apparatus 1002/1002' may include means for determining a number of bits received on a first downlink channel in each subframe of a set of subframes. The apparatus 1002/1002' may include means for determining a number of bits received on a second downlink channel. The apparatus 1002/1002' may include means for determining whether a bit threshold is surpassed based on the determined number of bits received on the first downlink channel in each subframe of the set of subframes and based on the determined number of bits received on the second downlink channel. The apparatus 1002/1002' may include means for processing, based on whether the bit threshold is surpassed, at least one of: the bits received on the first downlink channel in each subframe of the set of subframes, or the bits received on the second downlink channel. The apparatus 1002/1002' may include means for receiving the bits on the first downlink channel within a TTI in each subframe of the set of subframes; and means for receiving the bits on the second downlink channel in a sTTI within a subframe, the subframe following the set of subframes, the sTTI including fewer symbols than the TTI. The apparatus 1002/1002' may include means for determining, based on whether the bit threshold is surpassed, whether to process at least one of: the bits received on the first downlink channel in each subframe of the set of subframes, or the bits received on the second downlink channel. In an aspect, the first downlink channel is a PDSCH and the second downlink channel is a sPDSCH. In an aspect, the means for processing, based on whether the bit threshold is surpassed, at least one of: the bits received on the first downlink channel in each subframe of the set of subframes or the bits received on the second downlink channel is configured to: process the bits received on the second downlink channel; send ACK/NACK feedback associated with the bits received on the second downlink channel based on the processing of the bits received on the second downlink channel; refrain from processing the bits received on the first downlink channel in one or more subframes of the set of subframes; and send NACK feedback associated with the bits received on the first downlink channel in the one or more subframes of the set of subframes based on the refraining from the processing of the bits received on the first downlink channel in the one or more subframes of the set of subframes. In an aspect, the means for processing, based on whether the bit threshold is surpassed, at least one of: the bits received on the first downlink channel in each subframe of the set of subframes or the bits received on the second downlink channel is configured to: refrain from processing the bits received on the second downlink channel; send NACK feedback associated with the bits received on the second downlink channel based on the refraining from the processing of the bits received on the second downlink channel; process the bits received on the first downlink channel in each subframe of the set of subframes; and send ACK/NACK feedback associated with the bits received on the first downlink channel in each subframe of the set of subframes based on the processing of the bits received on the first downlink channel in each subframe of the set of subframes. In an aspect, the means for determining whether the bit threshold is surpassed is configured to compare, for each component carrier of the UE, a maximum of the determined number of bits received on the first downlink channel in each subframe of the set of subframes and the bits received on the second downlink channel to a maximum number of DL-SCH bits associated with the component carrier. In an aspect, the means for determining whether the bit threshold is surpassed is configured to compare a maximum of the determined number of bits received on the first downlink channel in each subframe of the set of subframes and the bits received on the second downlink channel to a defined maximum number of DL-SCH bits. In an aspect, the apparatus 1002/1002' has x configured component carriers and y active component carriers, where y≤x, and the means for determining whether the bit threshold is surpassed is configured to compare a maximum of the determined number of bits received on the first downlink channel in each subframe of the set of subframes and the bits received on the second downlink channel to one of: a sum of a maximum of a number of DL-SCH bits associated with each of the x component carriers; or a sum of a maximum of a number of DL-SCH bits associated with each of the y component carriers. In an aspect, the apparatus 1002/1002' may include means for receiving a configuration from a base station indicating whether the bit threshold is the sum of the maximum of a number of DL-SCH bits associated with each of the x component carriers, or is the sum of the maximum of a number of DL-SCH bits associated with each of the y component carriers. In an aspect, the at least one of the bits received on the first downlink channel, or the bits received on the second downlink channel are processed based on whether the bit threshold is surpassed within a processing window comprising a number of subframe in the set of subframes. In an aspect, a length of the processing window is based on at least one of a UE capability of the UE, a HARQ timing rule, or a duration of an sTTI associated with the second downlink channel. The apparatus 1002/1002' may include means for sending, to a base station, information indicative of the length of the processing window.

The aforementioned means may be one or more of the aforementioned components of the apparatus 1002 and/or the processing system 1114 of the apparatus 1002' configured to perform the functions recited by the aforementioned means. As described supra, the processing system 1114 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 12:
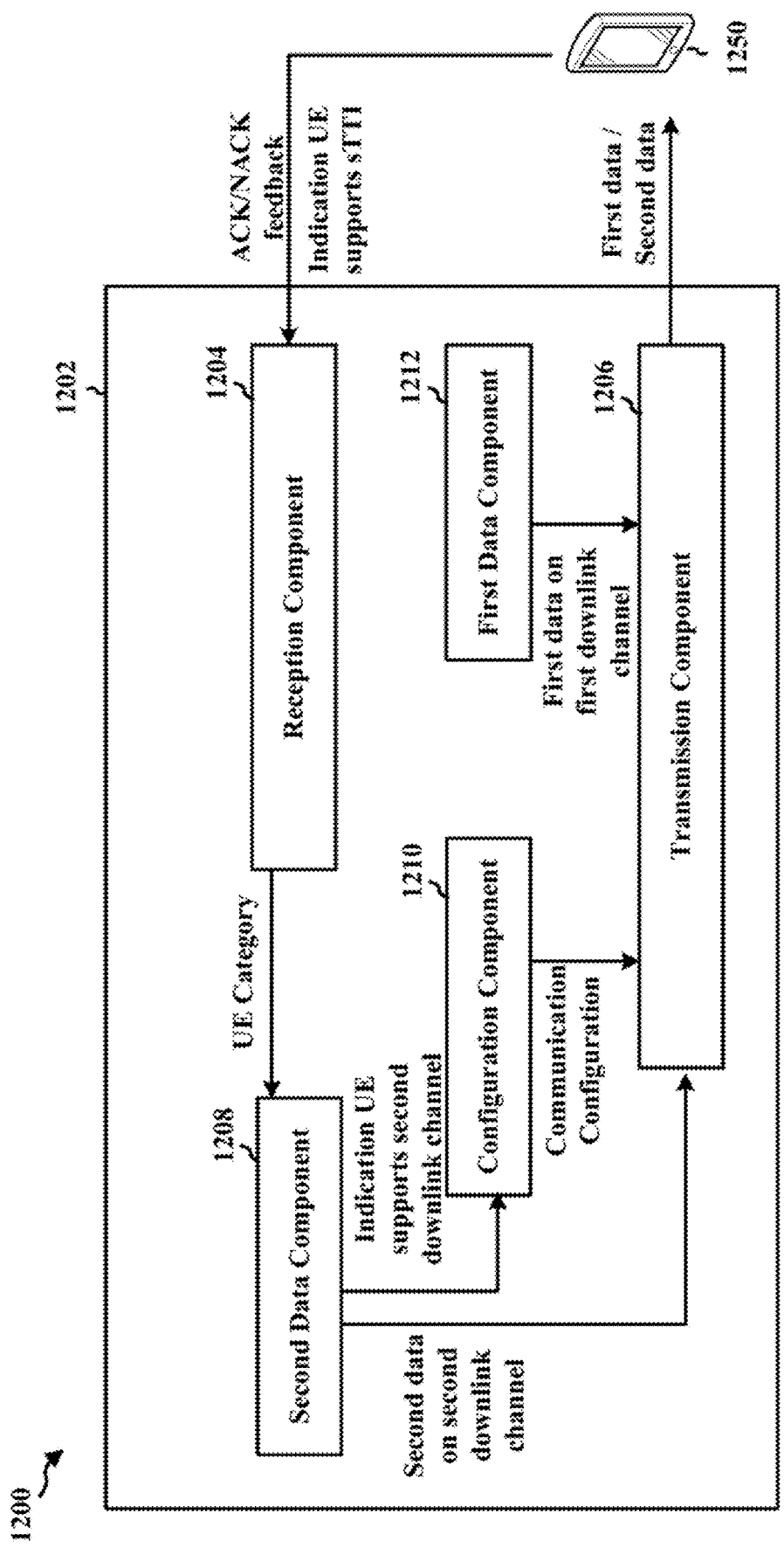
FIG. 12 is a conceptual data flow diagram illustrating the data flow between different means/components in an exemplary apparatus.

FIG. 12 is a conceptual data flow diagram 1200 illustrating the data flow between different means/components in an exemplary apparatus 1202. The apparatus may be a base station. The apparatus 1202 depicts exemplary connections and/or data between different modules/means/components. One of ordinary skill will appreciate that such connections and/or data flow are to be regarded in as illustrative and, therefore, different and/or additional connections and/or data flow may be present in different aspects.

The apparatus 1202 may include a reception component 1204. The reception component 1204 may receive signals from a UE (e.g., the UE 1250). The apparatus 1202 may further include a transmission component 1206. The transmission component 1206 may be configured to transmit signals to a UE (e.g., the UE 1250).

The apparatus 1202 may include a first data component 1212. The first data component 1212 may determine to send, to the UE 1250, first data on a first downlink channel in each subframe of a set of subframes. The first downlink channel may be a PDSCH.

The apparatus 1202 may include a second data component 1208. The second data component 1208 may receive, from the UE 1250, information indicating that the UE supports the second downlink channel. The second data component 1208 may determine to send to the UE 1250 the second data based on the received information indicating that the UE 1250 supports the second downlink channel. The second data component may determine to send to the UE 1250 second data on a second downlink channel in a subframe, the subframe following the set of subframes. The second downlink channel may be an sPDSCH.

The apparatus 1202 may include a configuration component 1210. The configuration component 1210 may determine, based on the determination to send to the UE 1250, the first data on the first downlink channel and the second data on the second downlink channel, at least one of to: limit an MCS used for sending at least one of the first data or the second data, limit a spatial rank used for transmitting at least one of the first data or the second data, refrain from scheduling the UE 1250 with a transmission mode that is based on a DMRS, or refrain from scheduling the UE using an ePDCCH.

The transmission component 1206 may send, to the UE 1250, a configuration associated with a bit threshold for processing the first data and the second data by the UE 1250. The configuration may indicate the bit threshold is to be based on ay indicate configured component carriers or y activated component carriers, and y≤x).

The transmission component 1206 may send, to the UE 1250, the first data on the first downlink channel in each subframe of the set of subframes. The transmission component 1206 may send, to the UE 1250, the second data on the second downlink channel in the subframe. In an aspect, the first data on the first downlink channel in each subframe of the set of subframes is sent on a first component carrier, and the second data on the second downlink channel in the subframe is sent on a second component carrier. In an aspect, the first component carrier is the same component carrier as the second component carrier.

The apparatus may include additional components that perform each of the blocks of the algorithm in the aforementioned flowcharts of FIG. 9. As such, each block in the aforementioned flowcharts of FIG. 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 13:
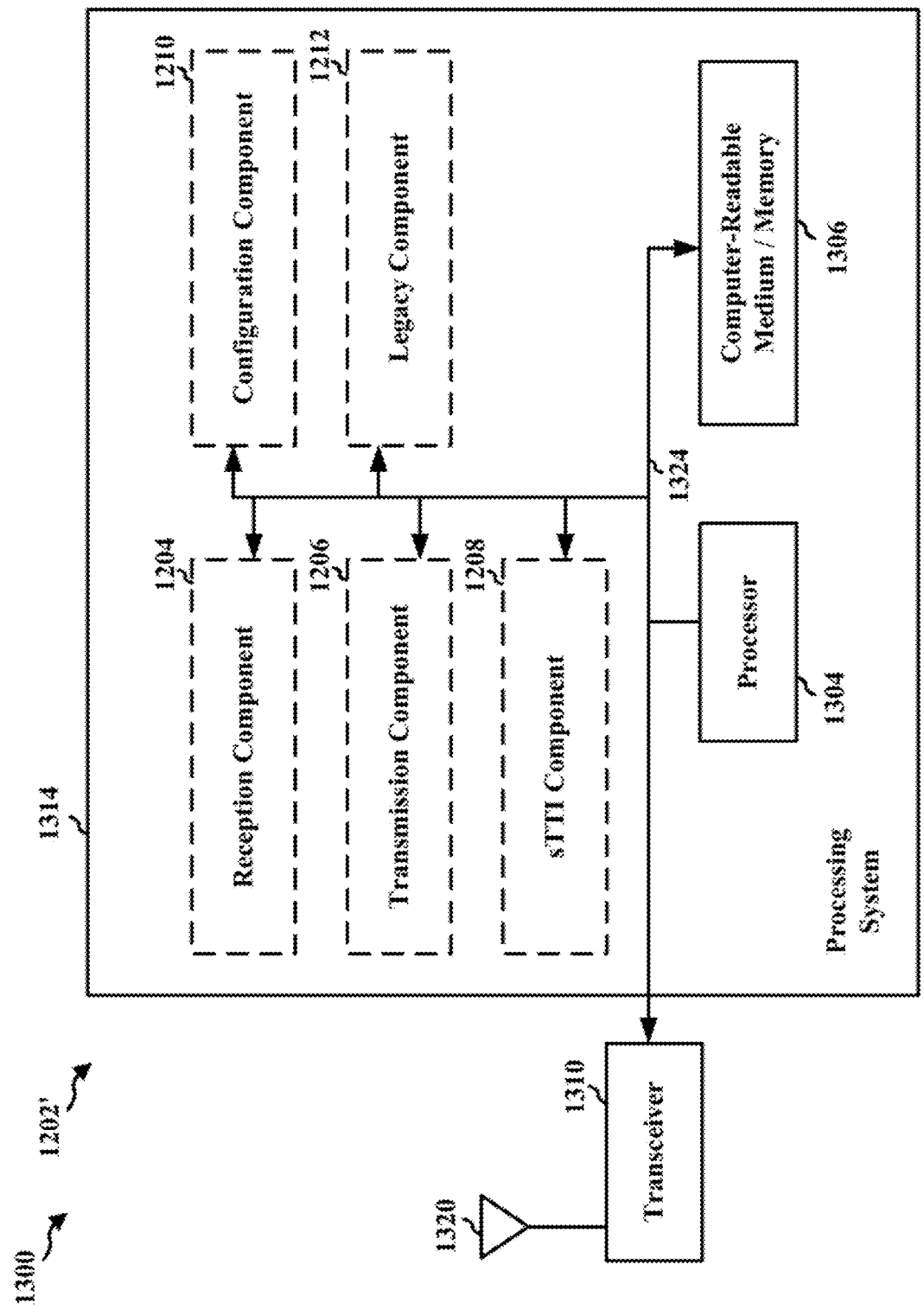
FIG. 13 is a diagram illustrating an example of a hardware implementation for an apparatus employing a processing system.

FIG. 13 is a diagram 1300 illustrating an example of a hardware implementation for an apparatus 1202' employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware components, represented by the processor 1304, the components 1204, 1206, 1208, 1210, 1212 and the computer-readable medium/memory 1306. The bus 1324 may also link various other circuits such as timing sources, peripherals, voltage regulators, and power management circuits, which are well known in the art, and therefore, will not be described any further.

The processing system 1314 may be coupled to a transceiver 1310. The transceiver 1310 is coupled to one or more antennas 1320. The transceiver 1310 provides a means for communicating with various other apparatus over a transmission medium. The transceiver 1310 receives a signal from the one or more antennas 1320, extracts information from the received signal, and provides the extracted information to the processing system 1314, specifically the reception component 1204. In addition, the transceiver 1310 receives information from the processing system 1314, specifically the transmission component 1206, and based on the received information, generates a signal to be applied to the one or more antennas 1320. The processing system 1314 includes a processor 1304 coupled to a computer-readable medium/memory 1306. The processor 1304 is responsible for general processing, including the execution of software stored on the computer-readable medium/memory 1306. The software, when executed by the processor 1304, causes the processing system 1314 to perform the various functions described supra for any particular apparatus. The computer-readable medium/memory 1306 may also be used for storing data that is manipulated by the processor 1304 when executing software. The processing system 1314 further includes at least one of the components 1204, 1206, 1208, 1210, 1212. The components may be software components running in the processor 1304, resident/stored in the computer readable medium/memory 1306, one or more hardware components coupled to the processor 1304, or some combination thereof. The processing system 1314 may be a component of the base station 310 and may include the memory 376 and/or at least one of the TX processor 316, the RX processor 370, and the controller/processor 375.

In one configuration, the apparatus 1202/1202' for wireless communication includes means for determining to send to a UE first data on a first downlink channel in each subframe of a set of subframes, and to send to the UE second data on a second downlink channel in a subframe, the subframe following the set of subframes. The apparatus 1202/1202' may include means for determining, based on the determination to send to the UE the first data on the first downlink channel and the second data on the second downlink channel, at least one of to: limit a MCS used for sending at least one of the first data or the second data, limit a spatial rank used for transmitting at least one of the first data or the second data, refrain from scheduling the UE with a transmission mode that is based on a DMRS, or refrain from scheduling the UE using an ePDCCH. The apparatus 1202/1202' may include means for sending, to the UE, the first data on the first downlink channel in each subframe of the set of subframes; and sending, to the UE, the second data on the second downlink channel in the subframe. In an aspect, the first downlink channel is a PDSCH and the second downlink channel is a sPDSCH. In an aspect, the apparatus 1202/1202' includes means for receiving, from the UE, information indicating that the UE supports the second downlink channel. In an aspect, the apparatus 1202/1202' includes means for determining to send to the UE the second data based on the received information indicating that the UE supports the second downlink channel. In an aspect, the first data on the first downlink channel in each subframe of the set of subframes is sent on a first component carrier, and the second data on the second downlink channel in the subframe is sent on a second component carrier. In an aspect, the first component carrier is a same component carrier as the second component carrier.

In an aspect, the apparatus 1202/1202' includes means for sending, to the UE, a configuration associated with a bit threshold for processing the first data and the second data by the UE, the configuration indicating the bit threshold is to be based on x configured component carriers or y activated component carriers, wherein y≤x. In an aspect, the apparatus 1202/1202' may include means for receiving, from the UE, information indicating a UE capability of the UE, and the determination, based on the determination to send to the UE the first data on the first downlink channel and the second data on the second downlink channel, the at least one of to limit the MCS used for sending at least one of the first data or the second data, limit the spatial rank used for transmitting at least one of the first data or the second data, refrain from scheduling the UE with a transmission mode that is based on the DMRS, or refrain from scheduling the UE using the ePDCCH is based on the information indicating the UE capability. In an aspect, the information indicating the UE capability is associated with a duration of an sTTI of the second downlink channel.

The aforementioned means may be one or more of the aforementioned components of the apparatus 1202 and/or the processing system 1314 of the apparatus 1202' configured to perform the functions recited by the aforementioned means. As described supra, the processing system 1314 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication of a user equipment (UE), comprising:
   determining a number of bits scheduled in one or more first uplink channel grants received in a set of subframes for a first uplink channel;
   determining a number of bits scheduled in a second uplink channel grant for a second uplink channel;
   determining whether a bit threshold is surpassed based on the determined number of bits scheduled in each first uplink channel grant of the one or more first uplink channel grants received for the first uplink channel in the set of subframes and based on the determined number of bits scheduled in the second uplink channel grant received for the second uplink channel, wherein the determining whether the bit threshold is surpassed is further based on one of: a sum of a maximum of a number of uplink shared channel (UL-SCH) bits associated with each of a number of configured component carriers of the UE, or a sum of a maximum of a number of UL-SCH bits associated with each of a number of active component carriers of the UE; and
   processing for transmission, based on whether the bit threshold is surpassed, at least one of: the bits scheduled in at least one first uplink channel grant of the one or more first uplink channel grants received in the set of subframes, or the bits scheduled in the second uplink channel grant.

2. The method of claim 1, wherein the at least one of the bits scheduled in the at least one first uplink channel grant of the one or more first uplink channel grants, or the bits scheduled in the second uplink channel grant are processed for transmission based on whether the bit threshold is surpassed within a processing window comprising a number of subframes in the set of subframes.

3. The method of claim 2, wherein a length of the processing window is based on at least one of a UE capability of the UE, uplink scheduling information, or a duration of a short transmission time interval (TTI) (sTTI) associated with the second uplink channel.

4. The method of claim 3, further comprising:
   sending, to a base station, information indicative of the length of the processing window for the UE.

5. The method of claim 1, further comprising:
   receiving each of the one or more first uplink channel grants for the first uplink channel in a transmission time interval (TTI) within the set of subframes; and
   receiving the second uplink channel grant for the second uplink channel in a short transmission time interval (sTTI) within a subframe, the subframe following the set of subframes, the sTTI including fewer symbols than the TTI.

6. The method of claim 1, further comprising:
   determining, based on whether the bit threshold is surpassed, whether to transmit the at least one of: the bits scheduled in the at least one first uplink channel grant of the one or more first uplink channel grants received in the set of subframes, or the bits scheduled in the second uplink channel grant.

7. The method of claim 1, wherein:
   the first uplink channel is a physical uplink shared channel (PUSCH);
   each of the one or more first uplink channel grants is for an uplink transmission on the PUSCH;
   the second uplink channel is a short PUSCH (sPUSCH); and
   the second uplink channel grant is for an uplink transmission on the sPUSCH in a short transmission time interval (sTTI).

8. The method of claim 1, wherein the processing for transmission, based on whether the bit threshold is surpassed, the at least one of: the bits scheduled in at least one first uplink channel grant of the one or more first uplink channel grants received in the set of subframes, or the bits scheduled in the second uplink channel grant comprises:
   processing for transmission the bits scheduled in the second uplink channel grant; and
   refraining from processing for transmission the bits scheduled in the at least one first uplink channel grant of the one or more first uplink channel grants received in the set of subframes.

9. The method of claim 1, wherein the processing for transmission, based on whether the bit threshold is surpassed, the at least one of: the bits scheduled in at least one first uplink channel grant of the one or more first uplink channel grants received in the set of subframes, or the bits scheduled in the second uplink channel grant comprises:
   refraining from processing for transmission the bits scheduled in the second uplink channel grant; and
   processing for transmission the bits scheduled in the at least one first uplink channel grant of the one or more first uplink channel grants received in the set of subframes.

10. The method of claim 1, wherein the determining whether the bit threshold is surpassed comprises comparing, for each component carrier of the UE, a maximum of the determined number of bits scheduled in each first uplink channel grant of the one or more first uplink channel grants received for the first uplink channel in the set of subframes for the component carrier and the bits scheduled in the second uplink channel grant for the second uplink channel for the component carrier to a maximum number of uplink shared channel (UL-SCH) bits associated with the component carrier.

11. The method of claim 10, wherein the maximum number of UL-SCH bits associated with the component carrier is based on a maximum number of UL-SCH bits for the first uplink channel.

12. The method of claim 1, wherein the determining whether the bit threshold is surpassed comprises comparing a maximum of the determined number of bits scheduled in each first uplink channel grant of the one or more first uplink channel grants received for the first uplink channel in the set of subframes and the bits scheduled in the second uplink channel grant for the second uplink channel to a defined maximum number of uplink shared channel (UL-SCH) bits.

13. The method of claim 1, wherein the UE has x configured component carriers and y active component carriers, where y≤x, and the determining whether the bit threshold is surpassed comprises comparing a maximum of the determined number of bits scheduled in each first uplink channel grant of the one or more first uplink channel grants received on the first uplink channel in the set of subframes and the bits scheduled in the second uplink channel grant for the second uplink channel to one of:
   the sum of the maximum of a number of uplink shared channel (UL-SCH) bits associated with each of the x configured component carriers; or the sum of the maximum of a number of UL-SCH bits associated with each of they active component carriers.

14. The method of claim 13, further comprising:
receiving a configuration from a base station indicating whether the bit threshold is the sum of the maximum of a number of UL-SCH bits associated with each of the x configured component carriers, or is the sum of the maximum of a number of UL-SCH bits associated with each of they active component carriers.

15. A user equipment (UE), the UE comprising:
a memory; and
at least one processor coupled to the memory and configured to:
determine a number of bits scheduled in one or more first uplink channel grants received in a set of subframes for a first uplink channel;
determine a number of bits scheduled in a second uplink channel grant for a second uplink channel;
determine whether a bit threshold is surpassed based on the determined number of bits scheduled in each first uplink channel grant of the one or more first uplink channel grants received for the first uplink channel in the set of subframes and based on the determined number of bits scheduled in the second uplink channel grant received for the second uplink channel, wherein the determining whether the bit threshold is surpassed is further based on one of: a sum of a maximum of a number of uplink shared channel (UL-SCH) bits associated with each of a number of configured component carriers of the UE, or a sum of a maximum of a number of UL-SCH bits associated with each of a number of active component carriers of the UE; and
process for transmission, based on whether the bit threshold is surpassed, at least one of: the bits scheduled in at least one first uplink channel grant of the one or more first uplink channel grants received in the set of subframes, or the bits scheduled in the second uplink channel grant.

16. The UE of claim 15, wherein the at least one of the bits scheduled in the at least one first uplink channel grant of the one or more first uplink channel grants, or the bits scheduled in the second uplink channel grant are processed for transmission based on whether the bit threshold is surpassed within a processing window comprising a number of subframes in the set of subframes.

17. The UE of claim 16, wherein a length of the processing window is based on at least one of a UE capability of the UE, uplink scheduling information, or a duration of a short transmission time interval (TTI) (sTTI) associated with the second uplink channel.

18. The UE of claim 17, wherein the at least one processor is further configured to:
send, to a base station, information indicative of the length of the processing window for the UE.

19. The UE of claim 15, wherein the at least one processor is further configured to:
receive each of the one or more first uplink channel grants for the first uplink channel in a transmission time interval (TTI) within the set of subframes; and
receive the second uplink channel grant for the second uplink channel in a short transmission time interval (sTTI) within a subframe, the subframe following the set of subframes, the sTTI including fewer symbols than the TTI.

20. The UE of claim 15, wherein the at least one processor is further configured to:

determine, based on whether the bit threshold is surpassed, whether to transmit the at least one of: the bits scheduled in the at least one first uplink channel grant of the one or more first uplink channel grants received in the set of subframes, or the bits scheduled in the second uplink channel grant.

21. The UE of claim 15, wherein:
the first uplink channel is a physical uplink shared channel (PUSCH);
each of the one or more first uplink channel grants is for an uplink transmission on the PUSCH;
the second uplink channel is a short PUSCH (sPUSCH); and
the second uplink channel grant is for an uplink transmission on the sPUSCH in a short transmission time interval (sTTI).

22. The UE of claim 15, wherein: to process for transmission, based on whether the bit threshold is surpassed, the at least one of: the bits scheduled in at least one first uplink channel grant of the one or more first uplink channel grants received in the set of subframes, or the bits scheduled in the second uplink channel grant comprises to:
process for transmission the bits scheduled in the second uplink channel grant; and
refrain from processing for transmission the bits scheduled in the at least one first uplink channel grant of the one or more first uplink channel grants received in the set of subframes.

23. The UE of claim 15, wherein: to process for transmission, based on whether the bit threshold is surpassed, the at least one of: the bits scheduled in at least one first uplink channel grant of the one or more first uplink channel grants received in the set of subframes, or the bits scheduled in the second uplink channel grant comprises to:
refrain from processing for transmission the bits scheduled in the second uplink channel grant; and
process for transmission the bits scheduled in the at least one first uplink channel grant of the one or more first uplink channel grants received in the set of subframes.

24. The UE of claim 15, wherein the determination whether the bit threshold is surpassed comprises comparing, for each component carrier of the UE, a maximum of the determined number of bits scheduled in each first uplink channel grant of the one or more first uplink channel grants received for the first uplink channel in the set of subframes for the component carrier and the bits scheduled in the second uplink channel grant for the second uplink channel for the component carrier to a maximum number of uplink shared channel (UL-SCH) bits associated with the component carrier.

25. The UE of claim 24, wherein the maximum number of UL-SCH bits associated with the component carrier is based on a maximum number of UL-SCH bits for the first uplink channel.

26. The UE of claim 15, wherein the determination whether the bit threshold is surpassed comprises comparing a maximum of the determined number of bits scheduled in each first uplink channel grant of the one or more first uplink channel grants received for the first uplink channel in the set of subframes and the bits scheduled in the second uplink channel grant for the second uplink channel to a defined maximum number of uplink shared channel (UL-SCH) bits.

27. The UE of claim 15, wherein the UE has x configured component carriers and y active component carriers, where y≤x, and the determination whether the bit threshold is surpassed comprises comparing a maximum of the determined number of bits scheduled in each first uplink channel grant of the one or more first uplink channel grants received on the first uplink channel in the set of subframes and the bits scheduled in the second uplink channel grant for the second uplink channel to one of:
- the sum of the maximum of a number of uplink shared channel (UL-SCH) bits associated with each of the x configured component carriers; or
- the sum of the maximum of a number of UL-SCH bits associated with each of they active component carriers.

28. The UE of claim 27, wherein the at least one processor is further configured to:
- receive a configuration from a base station indicating whether the bit threshold is the sum of the maximum of a number of UL-SCH bits associated with each of the x configured component carriers, or is the sum of the maximum of a number of UL-SCH bits associated with each of they active component carriers.

29. A user equipment (UE), the UE comprising:
- means for determining a number of bits scheduled in one or more first uplink channel grants received in a set of subframes for a first uplink channel;
- means for determining a number of bits scheduled in a second uplink channel grant for a second uplink channel;
- means for determining whether a bit threshold is surpassed based on the determined number of bits scheduled in each first uplink channel grant of the one or more first uplink channel grants received for the first uplink channel in the set of subframes and based on the determined number of bits scheduled in the second uplink channel grant received for the second uplink channel, wherein the determining whether the bit threshold is surpassed is further based on one of: a sum of a maximum of a number of uplink shared channel (UL-SCH) bits associated with each of a number of configured component carriers of the UE, or a sum of a maximum of a number of UL-SCH bits associated with each of a number of active component carriers of the UE; and
- means for processing for transmission, based on whether the bit threshold is surpassed, at least one of: the bits scheduled in at least one first uplink channel grant of the one or more first uplink channel grants received in the set of subframes, or the bits scheduled in the second uplink channel grant.

30. A non-transitory computer-readable medium storing computer-executable code for wireless communication by a user equipment (UE), comprising code to:
- determine a number of bits scheduled in one or more first uplink channel grants received in a set of subframes for a first uplink channel;
- determine a number of bits scheduled in a second uplink channel grant for a second uplink channel;
- determine whether a bit threshold is surpassed based on the determined number of bits scheduled in each first uplink channel grant of the one or more first uplink channel grants received for the first uplink channel in the set of subframes and based on the determined number of bits scheduled in the second uplink channel grant received for the second uplink channel, wherein the determining whether the bit threshold is surpassed is further based on one of: a sum of a maximum of a number of uplink shared channel (UL-SCH) bits associated with each of a number of configured component carriers of the UE, or a sum of a maximum of a number of UL-SCH bits associated with each of a number of active component carriers of the UE; and
- process for transmission, based on whether the bit threshold is surpassed, at least one of: the bits scheduled in at least one first uplink channel grant of the one or more first uplink channel grants received in the set of subframes, or the bits scheduled in the second uplink channel grant.

\* \* \* \* \*